United States Patent
Zhang et al.

(10) Patent No.: US 12,550,004 B2
(45) Date of Patent: Feb. 10, 2026

(54) CROSS-LAYER AND CROSS-ACCESS TECHNOLOGY TRAFFIC SPLITTING AND RETRANSMISSION MECHANISMS

(71) Applicant: Intel Corporation, Santa Clara, CA (US)

(72) Inventors: Menglei Zhang, Portland, OR (US); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 968 days.

(21) Appl. No.: 17/358,994

(22) Filed: Jun. 25, 2021

(65) Prior Publication Data

US 2021/0400537 A1    Dec. 23, 2021

(51) Int. Cl.
*H04W 24/08* (2009.01)
*H04L 1/1867* (2023.01)
*H04L 43/0888* (2022.01)
*H04L 47/52* (2022.01)
(Continued)

(52) U.S. Cl.
CPC .......... *H04W 28/14* (2013.01); *H04L 1/189* (2013.01); *H04L 43/0888* (2013.01); *H04L 47/52* (2013.01); *H04L 47/56* (2013.01); *H04W 24/08* (2013.01)

(58) Field of Classification Search
CPC ..... H04W 28/14; H04W 24/08; H04W 48/18; H04W 88/06; H04W 88/10; H04L 1/189; H04L 43/0888; H04L 47/52; H04L 47/56; H04L 47/28; H04L 47/30
See application file for complete search history.

(56) References Cited

U.S. PATENT DOCUMENTS

| | | | |
|---|---|---|---|
| 6,957,212 B2 | 10/2005 | Peng | |
| 8,949,501 B1 | 2/2015 | Akhter et al. | |
| 9,398,121 B1 | 7/2016 | Brandwine | |

(Continued)

FOREIGN PATENT DOCUMENTS

| | | | |
|---|---|---|---|
| EP | 3414932 A1 | 12/2018 | |
| WO | WO 2015-152787 A1 | 10/2015 | |

(Continued)

OTHER PUBLICATIONS

International Preliminary Report on Patentability mailed Oct. 13, 2022 for International Patent Application PCT/US2020/066969, 8 pages.

(Continued)

*Primary Examiner* — Kevin T Bates
*Assistant Examiner* — Hector Reyes
(74) *Attorney, Agent, or Firm* — Schwabe, Williamson & Wyatt, P.C.

(57) ABSTRACT

The present disclosure is related to Multi-Access Management Services (MAMS), which is a programmable framework that provides mechanisms for the flexible selection of network paths in a multi-access (MX) communication environment, based on an application's needs. The present disclosure discusses dynamic traffic splitting mechanisms, cross-layer and cross access technology traffic splitting mechanisms and retransmission mechanisms, multi-link packet reordering mechanisms, and link-aware packet duplication mechanisms. Generic Multi-Access (GMA) data plane functions are also integrated into the MAMS framework.

20 Claims, 31 Drawing Sheets

(51) Int. Cl.
    *H04L 47/56*     (2022.01)
    *H04W 28/14*     (2009.01)

(56) References Cited

U.S. PATENT DOCUMENTS

| | | | |
|---|---|---|---|
| 11,785,497 B2* | 10/2023 | Puente Pestaña | H04L 41/16 |
| | | | 370/236 |
| 2003/0091054 A1 | 5/2003 | Futenma | |
| 2006/0168336 A1 | 7/2006 | Koyanagi | |
| 2010/0202323 A1 | 8/2010 | Nishida | |
| 2013/0246672 A1 | 9/2013 | Saputra | |
| 2014/0307593 A1 | 10/2014 | Zhao et al. | |
| 2015/0029879 A1 | 1/2015 | Chou et al. | |
| 2015/0078359 A1 | 3/2015 | Scahill et al. | |
| 2015/0215835 A1 | 7/2015 | Sirotkin | |
| 2016/0112896 A1 | 4/2016 | Karampatsis | |
| 2016/0270145 A1 | 9/2016 | Srinivasa Gopalan et al. | |
| 2016/0381491 A1 | 12/2016 | Watfa et al. | |
| 2017/0019830 A1 | 1/2017 | Lindoff et al. | |
| 2017/0093541 A1 | 3/2017 | Pan et al. | |
| 2018/0018385 A1 | 1/2018 | Katayama et al. | |
| 2018/0027508 A1 | 1/2018 | Tanaka | |
| 2018/0077022 A1 | 3/2018 | Van Oost et al. | |
| 2018/0092085 A1 | 3/2018 | Shaheen et al. | |
| 2018/0270742 A1 | 9/2018 | Bergstrom et al. | |
| 2019/0036841 A1 | 1/2019 | Nolan | |
| 2019/0306749 A1 | 10/2019 | Bergstrom et al. | |
| 2019/0306752 A1* | 10/2019 | Lai | H04W 28/0925 |
| 2019/0394833 A1 | 12/2019 | Talebi Fard et al. | |
| 2020/0045612 A1 | 2/2020 | Stauffer et al. | |
| 2020/0053018 A1 | 2/2020 | White et al. | |
| 2020/0178196 A1 | 6/2020 | Wang et al. | |
| 2020/0229035 A1* | 7/2020 | Kim | H04W 8/08 |
| 2021/0051104 A1 | 2/2021 | He | |
| 2021/0058936 A1 | 2/2021 | Gordaychik | |
| 2021/0100047 A1 | 4/2021 | Chiba et al. | |
| 2021/0144590 A1 | 5/2021 | Li | |
| 2021/0211914 A1 | 7/2021 | De La Oliva et al. | |
| 2021/0306900 A1 | 9/2021 | Mehta | |
| 2021/0385865 A1 | 12/2021 | Mueck | |
| 2021/0400537 A1 | 12/2021 | Zhang et al. | |
| 2021/0409335 A1 | 12/2021 | Zhu et al. | |
| 2021/0410010 A1* | 12/2021 | Salkintzis | H04W 76/15 |
| 2022/0191733 A1 | 6/2022 | Ali et al. | |
| 2023/0056442 A1 | 2/2023 | Ly et al. | |
| 2023/0189368 A1 | 6/2023 | Zhou | |
| 2023/0276483 A1 | 8/2023 | Xu et al. | |

FOREIGN PATENT DOCUMENTS

| | | |
|---|---|---|
| WO | WO2017/139699 A1 | 8/2017 |
| WO | WO 2017-189176 A2 | 11/2017 |
| WO | WO 2019-076440 A1 | 4/2019 |
| WO | WO 2019-192528 A1 | 10/2019 |
| WO | WO 2020/232404 A1 | 11/2020 |
| WO | WO2021/257974 A1 | 12/2021 |
| WO | WO2022005917 A1 | 1/2022 |
| WO | WO2022005918 A1 | 1/2022 |

OTHER PUBLICATIONS

Extended European Search Report issued Jun. 14, 2024 for EP Application No. 21825017.3, 4 pages.
Deutsche Bahn AG, "Exemplary Mapping of 3GPP Building Blocks to FRMCS Logical Architecture Draft," ETSI Draft RT(19)075028r3, ETSI, Dec. 12, 2019, 13 pages.
Extended European Search Report mailed Apr. 14, 2023 for European Patent Application No. 22203400.1, 13 pages.
Office Action mailed Sep. 18, 2024 for U.S. Appl. No. 17/797,661, 72 pages.
G. Dommety, "Key and Sequence Number Extensions to GRE", Internet Engineering Task Force (IETF) RFC 2890, 7 pages (Sep. 2000).
A. Huttunen et al., "UDP Encapsulation of IPsec ESP Packets", Internet Engineering Task Force (IETF) RFC 3984, 15 pages (Jan. 2005).
A. Ford et al., "TCP Extensions for Multipath Operation with Multiple Addresses", Internet Engineering Task Force (IETF) RFC 6824, 64 pages (Jan. 2013).
N. Leymann et al., "Huawei's GRE Tunnel Bonding Protocol", Internet Engineering Task Force (IETF) RFC 81557, 44 pages (May 2017).
S. Kanugovi et al., "Multi-Access Management Services (MAMS)", Internet Engineering Task Force (IETF) RFC 8743, 143 pages (Mar. 2020).
J. Zhu et al., "Generic Multi-Access (GMA) Encapsulation Protocol", Internet Engineering Task Force (IETF) RFC 9188, 15 pages (Feb. 2022).
International Search Report and Written Opinion mailed Apr. 15, 2021 for International Patent Application PCT/US2020/066969, 13 pages.
J. Zhu et al., "Generic Multi-Access (GMA) Encapsulation Protocol draft-zhu-intarea-gma-07", May 14, 2020, 13 pages.
S. Kanugovi et al., "RFC 8743: Multi-Access Management Services (MAMS)", Mar. 2020, 143 pages.
International Search Report and Written Opinion mailed Oct. 6, 2021 for International Patent Application No. PCT/US2021/038063, 14 pages.
"3GPP; TSG SA; Study on enhanced support of Industrial Internet of Things (IIoT) in 5G System (Release 17)", 3GPP TR 23.700-20 V0.3.0, Jan. 28, 2020.
Han-Chuan Hsieh et al., "5G Virtualized Multi-access Edge Computing Platform for IoT Applications", In: Journal of Network and Computer Applications 115 (2018) 94-102, May 10, 2018.
Sangeetha Bangolae et al., "Performance Study of Fast BSS Transition using IEEE 802.11r", Proceedings of the 2006 Int'l Conference on Wireless Comm. and Mobile Computing (IWCMC '06), pp. 737-742 (Jul. 3, 2006), https://dl.acm.org/doi/pdf/10.1145/1143549.1143696.
"Wi-Fi Roaming Aggressiveness Setting", Intel Corporation, Article ID 000005546, 2 pages (Oct. 28, 2021).
Yordan, "Oppo and vivo announce Dual Wi-Fi for their flagships", GSMArena.com, 3 pages (Jul. 18, 2019), https://www.gsmarena.com/oppo_vivo_dual_wifi-news-38203.php.
Q. De Coninck et al., "Multipath Extensions for QUIC (MP-QUIC)", IETF, draft-deconinck-quic-multipath-07, 36 pages (May 3, 2021), https://datatracker.ietf.org/doc/html/draft-deconinck-quic-multipath-07.
J. Zhu et al., "Generic Multi-Access (GMA) Encapsulation Protocol", IETF, draft-zhu-intarea-gma-14, 17 pages (Nov. 24, 2021), https://datatracker.ietf.org/doc/html/draft-zhu-intarea-gma-14.
J. Zhu et al., "User-Plane Protocols for Multiple Access Management Service", IETF, draft-zhu-intarea-mams-user-protocol-09, 8 pages (Mar. 4, 2020).
"3rd Generation Partnership Project; Technical Specification Group Core Network and Terminals; 5G System; Access Traffic Steering, Switching and Splitting (ATSSS); Stage 3 (Release 17)", 3GPP TS 24.193 v17.2.0 (Sep. 24, 2021), 71 pages.
"3rd Generation Partnership Project; Technical Specification Group Core Network and Terminals; Access Network Discovery and Selection Function (ANDSF) Management Object (MO) (Release 16)", 3GPP TS 24.312 v16.0.0 (Jul. 9, 2020), 394 pages.
"3rd Generation Partnership Project; Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 16)", 3GPP TS 36.361 v16.0.0 (Jul. 24, 2020), 10 pages.
Office Action mailed Jun. 21, 2024 for U.S. Appl. No. 17/437,711, 96 pages.
Notice of Allowance mailed Aug. 2, 2024 for U.S. Appl. No. 17/923,170, 71 pages.
Notice of Allowance mailed Aug. 20, 2024 for U.S. Appl. No. 17/469,331, 21 pages.
Nikc Mckeown et al., "Tiny Tera: A Packet Switch Core", IEEE Micro, IEEE Service Center, Los Alamitos, CA, US deel 17, nr.1, (Jan. 1, 1997), 8 pages.

(56) References Cited

OTHER PUBLICATIONS

S. Kanugovi et al., "Multi-Access Management Services (MAMS)", rtc8743.txt, Multi-Access Management Services (MAMS); RFC8743. TXT, Internet Engineering Task Force, IETF; Standard, Internei Society (ISOC) 4, Rue Des Falaises CH-1205 Geneva, Switzerland, (Mar. 25, 2020), 73 pages.

Office Action mailed Mar. 6, 2024 for U.S. Appl. No. 17/469,331, 96 pages.

Extended European Search Report mailed May 10, 2023 for European Patent Application No. 20806061.6, 11 pages.

S. Kanugovi Nokia e al., "Multiple Access Management Services; Draft-Kanugovi-intarea-mams-fraaework-03", (Feb. 28, 2019), 141 pages.

3GPP, "3rd Generation Partnership Project; Technical Specification Group Services and System Aspects; Study on access traffic steering, switch and splitting support in the 5G system architecture (Release 16)", 3GPP TR 23.793 V16.0.0 (Dec. 2018), 114 pages.

International Search Report and Written Opinion mailed Aug. 31, 2020 for International Patent Application No. PCT/US2020/033261, 14 pages.

International Preliminary Report on Patentability mailed Nov. 25, 2021 for International Patent Application No. PCT/US2020/033261, 10 pages.

"3rd Generation Partnership Project; Technical Specification Group Services and System Aspects; Study on access traffic steering, switch and splitting support in the 5G system architecture (Release 16)", 3GPP TR 23.793 v16.0.0, 115 pages (Dec. 19, 2018).

S. Kanugovi et al., "Multiple Access Management Services", draft-kanugovi-intarea-mams-framework-03, Internet Engineering Task Force (IETF), 156 pages (Feb. 28, 2019), https://tools.ietf.org/search/draft-kanugovi-intarea-mams-framework-03.

S. Kanugovi et al., Multiple Access Management Services, draft-kanugovi-intarea-mams-framework-04, Internet Engineering Task Force (IETF), 122 pages (May 31, 2019), https://datatracker.ietf.org/doc/html/draft-kanugovi-intarea-mams-framework-04.

J. Zhu et al., "User-Plane Protocols for Multiple Access Management Service", draft-zhu-intarea-mams-user-protocol-07, Internet Engineering Task Force (IETF), 14 pages (Apr. 3, 2019), https://datatracker.ietf.org/doc/html/draft-zhu-intarea-mams-user-protocol-07.

"3rd Generation Partnership Project; Technical Specification Group Services and System Aspects; System Architecture for the 5G System; Stage 2 (Release 16)", 3GPP TS 23.501 v16.1.0, 368 pages (Jun. 11, 2019).

"3rd Generation Partnership Project; Technical Specification Group Core Network and Terminals; 5G System; Access and Mobility Management Services; Stage 3 (Release 16)", 3GPP TS 29.518 V16.0.0, 199 pages (Jun. 13, 2019).

"Multi-access Edge Computing (MEC); Framework and Reference Architecture", ETSI GS MEC 003 V2.1.1, 21 pages (Jan. 2019).

"Multi-access Edge Computing (MEC); Phase 2: Use Cases and Requirements", ETSI GS MEC 002 V2.1.1, 66 pages (Oct. 2018).

"Mobile Edge Computing(MEC); Bandwidth Management Api", ETSI GS MEC 015 V1.1.1, 20 pages (Oct. 2017).

"3rd Generation Partnership Project; Technical Specification Group Core Network and Terminals; 5G System; Network Exposure Function Northbound APIs; Stage 3 (Release 16)", 3GPP TS 29.522 V16.0.0, 43 pages (Jun. 18, 2019).

"Multi-access Edge Computing (MEC); General principles for MEC Service APIs Disclaimer", ETSI GS MEC 009 V2.1.1, 64 pages (Jan. 2019).

"3rd Generation Partnership Project; Technical Specification Group Services and System Aspects; System Architecture for the 5G System; Stage 2 (Release 16)" 3GPP TS 23.501 v16.0.2, 317 pages (Apr. 1, 2019).

"3rd Generation Partnership Project; Technical Specification Group Core Network and Terminals; 5G System; Access and Mobility Management Services; Stage 3 (Release 15)", 3GPP TS 29.518 V15.3.0, 195 pages (Mar. 24, 2019).

"Mobile Edge Computing (MEC); Radio Network Information API", ETSI GS MEC 012 V1.1.1, 57 pages (Jul. 2017).

Nádas et al., "Per Packet Value: A Practical Concept for Network Resource Sharing", 2016 IEEE Global Communications Conference (Globecom), pp. 1-7 (Dec. 4, 2016).

Laki et al., "Take your own share of the PIE", Proceedings of the Applied Networking Research Workshop, pp. 27-32 (Jul. 15, 2017).

Nádas et al., "Towards a congestion control-independent core-stateless AQM", Proceedings of the Applied Networking Research Workshop, pp. 84-90 (Jul. 16, 2018).

Laki et al., "Scalable Per Subscriber QoS with Core-Stateless Scheduling", ACM SIGCOMM Industrial Demos, 2 pages (2018).

Nádas et al., "Stateless resource sharing in networks with multi-layer virtualization", 2019 IEEE International Conference on Communications (ICC), pp. 1-7 (May 20, 2019).

Nádas et al., "Towards core-stateless fairness on multiple timescales", Proceedings of the Applied Networking Research Workshop, pp. 30-36 (Jul. 22, 2019).

Fejes et al., "Decoupling delay and resource sharing targets with efficient core-stateless AQM", Proceedings of the ACM SIGCOMM 2019 Conference Posters and Demos, pp. 128-130 (Aug. 19, 2019).

Fejes et al., "Who will Save the Internet from the Congestion Control Revolution?", Proceedings of the 2019 Workshop on Buffer Sizing, Stanford University, 6 pages (2019), http://ppv.elte.hu/buffer-sizing/.

Fejes et al., "On the Incompatibility of Scalable Congestion Controls over the Internet", 2020 IFIP Networking Conference (Networking), IEEE, pp. 749-754 (Jun. 22, 2020), http://ppv.elte.hu/scalable-cc-comp/.

Nádas et al., A congestion control independent LAS scheduler. InProceedings of the Applied Networking Research Workshop, pp. 45-51 (Jul. 27, 2020).

Laki et al., "Core-Stateless Forwarding With QoS Revisited: Decoupling Delay and Bandwidth Requirements", IEEE/ACM Transactions on Networking 29, No. 2, pp. 503-516 (Dec. 9, 2020).

Fejes et al., "A Core-Stateless LAS Scheduler for P4-enabled hardware switches with emulated HQoS", IEEE Infocom 2021 Demo (Virtual), 2 pages (2021), http://ppv.elte.hu/ic21/.

Bemten et al., "Network Calculus: A Comprehensive Guide", Technical Report No. 201603, 57 pages (Oct. 8, 2016).

Charny et al., "Delay Bounds in a Network with Aggregate Scheduling", International Workshop on Quality of Future Internet Services 2000 (QoFIS'2000), Springer Berlin, Heidelberg, pp. 1-13 (Sep. 25, 2000).

Zhu et al., "Generic Multi-Access (GMA) Encapsulation Protocol", draft-zhu-intarea-gma-07, 13 pages (May 14, 2020).

Feng et al., "The BLUE active queue management algorithms", 19 pages, (Sep. 2002), http://www.researchgate.net/publication/3334841.

Mustafa Maad Hamdi et al., "A review on Queue Management Algorithms in Large Networks", IOP Conference Series: Materials Science and Engineering, vol. 1076, No. 1, p. 012034, 13 pages (Feb. 1, 2021), https://iopscience.iop.org/article/10.1088/1757-899X/1076/1/012034/pdf.

Nichols et al., "Definition of the Differentiated Services Field (DS Field) in the IPV4 and IPV6 Headers", IETF RFC 2474, 20 pages (Dec. 1998).

Ramakrishnan et al., "The Addition of Explicit Congestion Notification (ECN) to IP", IETF RFC 3168, 63 pages (Sep. 2001).

Amante et al., "IPv6 Flow Label Specification", IETF RFC 6437, 15 pages (Nov. 2011).

D. Black, "Relaxing Restrictions on Explicit Congestion Notification (ECN) Experimentation", IETF RFC 8311, 20 pages (Jan. 2018).

G. Fairhurst, "Update to IANA Registration Procedures for Pool 3 Values in the Differentiated Services Field Codepoints (DSCP) Registry", IETF RFC 8436, 7 pages (Aug. 2018).

Zhu et al., "Improving QoE for Skype Video Call in Mobile Broadband Network", 2012 IEEE Global Communications Conference (Globecom), pp. 1938-1943 (Dec. 3, 2012).

International Preliminary Report on Patentability mailed Dec. 29, 2022 for International Patent Application PCT/US2021/038063, 10 pages.

(56) References Cited

OTHER PUBLICATIONS

International Search Report and Written Opinion mailed Oct. 8, 2021 for International Patent Application No. PCT/US2021/039253, 12 pages.
"3rd Generation Partnership Project; Technical Specification Group Services and System Aspects; Study on access traffic steering, switch and splitting support in the 5G system architecture (Release 16)", 3GPP TR 23.793 V16.0.0 (Dec. 19, 2018), 114 pages.
"3rd Generation Partnership Project; Technical Specification Group Services and System Aspects; Study on Access Traffic Steering, Switch and Splitting support in the 5G system architecture Phase 2 (Release 17)", 3GPP TR 23.700-93 V0.1.1 (Jun. 23, 2020), 43 pages.
International Preliminary Report on Patentability mailed Jan. 12, 2023 for International Patent Application No. PCT/US2021/039253, 7 pages.
International Search Report and Written Opinion mailed Nov. 19, 2021 for International Patent Application No. PCT/US2021/039252, 13 pages.
International Preliminary Report on Patentability mailed Jan. 12, 2023 for International Patent Application No. PCT/US2021/039252, 8 pages.
U.S. Appl. No. 63/025,086 "Dynamic Traffic Management in Next Generation Multi-Access Management Service Frameworks", filed May 14, 2020, 78 pages.
U.S. Appl. No. 17/922,947 "RAN-Aware Traffic Distribution Rules and RAN Measurements for Enhanced Access Traffic Steering Switching and Splitting", filed Nov. 2, 2022, 92 pages.
U.S. Appl. No. 17/925,430 "Wireless Local Area Network Enhancements for Access Traffic Steering Switching Splitting", filed Nov. 15, 2022, 64 pages.
"3rd Generation Partnership Project; Technical Specification Group Services and System Aspects; System architecture for the 5G System (5GS); Stage 2 (Release 15)", 3GPP TS 23.501 V15.9.0 (Mar. 27, 2020), 248 pages.
A. Ford et al., "RFC 8684 TCP Extensions for Multipath Operation with Multiple Addresses": http://tools.ietf.org/html/draft-ietf-mptcp-multiaddressed-09, 6 pages (Mar. 2020).
"3rd Generation Partnership Project; Technical Specification Group Services and System Aspects; Management and orchestration; 5G performance measurements (Release 16)", 3GPP TS 28.552 V16.5.0 (Mar. 27, 2020), 173 pages.
"3rd Generation Partnership Project; Technical Specification Group Radio Access Network; Evolved Universal Terrestrial Radio Access (E-UTRA); Layer 2—Measurements (Release 15)", 3GPP TS 36.314 V15.2.0 (Jan. 11, 2019), 28 pages.
"IEEE Standard for Information technology—Telecommunications and information exchange between systems Local and metropolitan area networks—Specific requirements—Part 11: Wireless LAN Medium Access Control (MAC) and Physical Layer (PHY) Specifications," IEEE Std 802.11-2016, 3534 pages (Dec. 14, 2016).
Wi-Fi Alliance, "Wi-Fi Agile Multiband Technical Specification", Version 1.5, 32 pages (2020).
Wi-Fi Alliance, "Optimized Connectivity Specification", Version 1.1.6, 26 pages (2020).
Kanugovi et al., "Control Plane Protocols and Procedures for Multiple Access Management Services", IETF, draft-zhu-intarea-mams-control-protocol-02 (Jul. 3, 2017), 31 pages.
Li et al., "Multipath Transmission for Internet: A Survey", 39 pages, IEEE Communications Surveys & Tutorials, vol. 18, No. 4, Fourth Quarter 2016, pp. 2887-2925 (Jun. 29, 2016).
"TCP Keep-Alives" in Braden, "Requirements for Internet Hosts—Communication Layers", IETF RFC 1122, section 4.2.3.6, pp. 101-102 (Oct. 1, 1989), 2 pages.
Boyd et al., "Convex Optimization", Cambridge University Press, Cambridge, UK, ISBN: 978-0-521-83378-3, 730 pages (Mar. 2004).
"Multi-access Edge Computing (MEC); Radio Network Information API", ETSI GS MEC 012 V2.1.1, 66 pages (Dec. 2019).
Ford et al., "TCP Extensions for Multipath Operation with Multiple Addresses", Internet Engineering Task Force (IETF), Internet Draft, draft-ietf-mptcp-multiaddressed-09, 62 pages (Jun. 6, 2012), https://datatracker.ietf.org/doc/html/draft-ietf-mptcp-multiaddressed-09.
"Intel® Network Edge Virtualization (NEV) Software Development Kit", Intel Corp., Intel® Network Edge Virtualization Product Brief, 3 pages (Aug. 16, 2015), https://networkbuilders.intel.com/docs/Intel_Wireless_Product_Brief_for_IDF_v8.pdf.
"Simplify Application Development for the Network Edge", Intel Corp., Service Provider NFV, White Paper, 5 pages (Sep. 26, 2018), https://www.intel.com/content/dam/www/public/us/en/documents/white-papers/nev-sdk-white-paper.pdf.
"O-RAN Architecture Description", O-RAN Alliance, O-RAN-WG1-O-RAN Architecture Description, v01.00.00, 24 pages (Feb. 2020).
"O-RAN Working Group 2, AI/ML workflow description and requirements", O-RAN Alliance, ORAN-WG2.AIML, v01.00, 34 pages (Dec. 2019).
Singh et al., "Optimal Traffic Aggregation in Multi-RAT Heterogeneous Wireless Networks", IEEE ICC2016-Workshops: W09-Workshop on 5G RAN Design, 6 pages (Mar. 7, 2016).
Zhu et al., "Generic Multi-Access (GMA) Convergence Encapsulation Protocols", INTAREA/Network Working Group, Internet Draft, draft-zhu-intarea-gma-04, 10 pages (Sep. 30, 2019), https://datatracker.ietf.org/doc/pdf/draft-zhu-intarea-gma-04.
Zhu et al., "Generic Multi-Access (GMA) Convergence Encapsulation Protocols", INTAREA/Network Working Group, Internet Draft, draft-zhu-intarea-gma-05, 12 pages (Dec. 16, 2019), https://datatracker.ietf.org/doc/pdf/draft-zhu-intarea-gma-05.

* cited by examiner

CROSS-LAYER AND CROSS-ACCESS TECHNOLOGY TRAFFIC SPLITTING AND RETRANSMISSION MECHANISMS

TECHNICAL FIELD

The present application is generally related to Edge computing, network communication, and communication system implementations, and in particular, to Multiple Access Management Services (MAMS) systems/networks, Generic Multi-Access (GMA), and/or Edge computing systems and networks.

BACKGROUND

Internet of Things (IoT) devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated. The deployment of IoT devices and Edge computing services, such as Multi-access Edge Computing (MEC), have introduced a number of advanced use cases and scenarios occurring at or otherwise involving the Edge of the network. However, these advanced use cases have also introduced a number of corresponding technical challenges related to security, processing/computing resources, network resources, service availability and efficiency, among many other issues.

Multiple Access Management Services (MAMS) is a programmable framework that provides mechanisms for flexible selection of network paths in a multi-connection (access) communication environment based on application needs and/or requirements. The MAMS framework can be supported by an Edge computing system/network, such as ETSI MEC or the like. Additionally, the Third Generation Partnership Project (3GPP) Fifth Generation (5G) system architecture has been extended to support functionality similar to MAMS, which is referred to as Access Traffic Switching, Steering, and Splitting (ATSSS).

BRIEF DESCRIPTION OF THE DRAWINGS

In the drawings, which are not necessarily drawn to scale, like numerals may describe similar components in different views. Like numerals having different letter suffixes may represent different instances of similar components. Some implementations are illustrated by way of example, and not limitation, in the figures of the accompanying drawings in which.

GMA.

DETAILED DESCRIPTION

Figure 1:
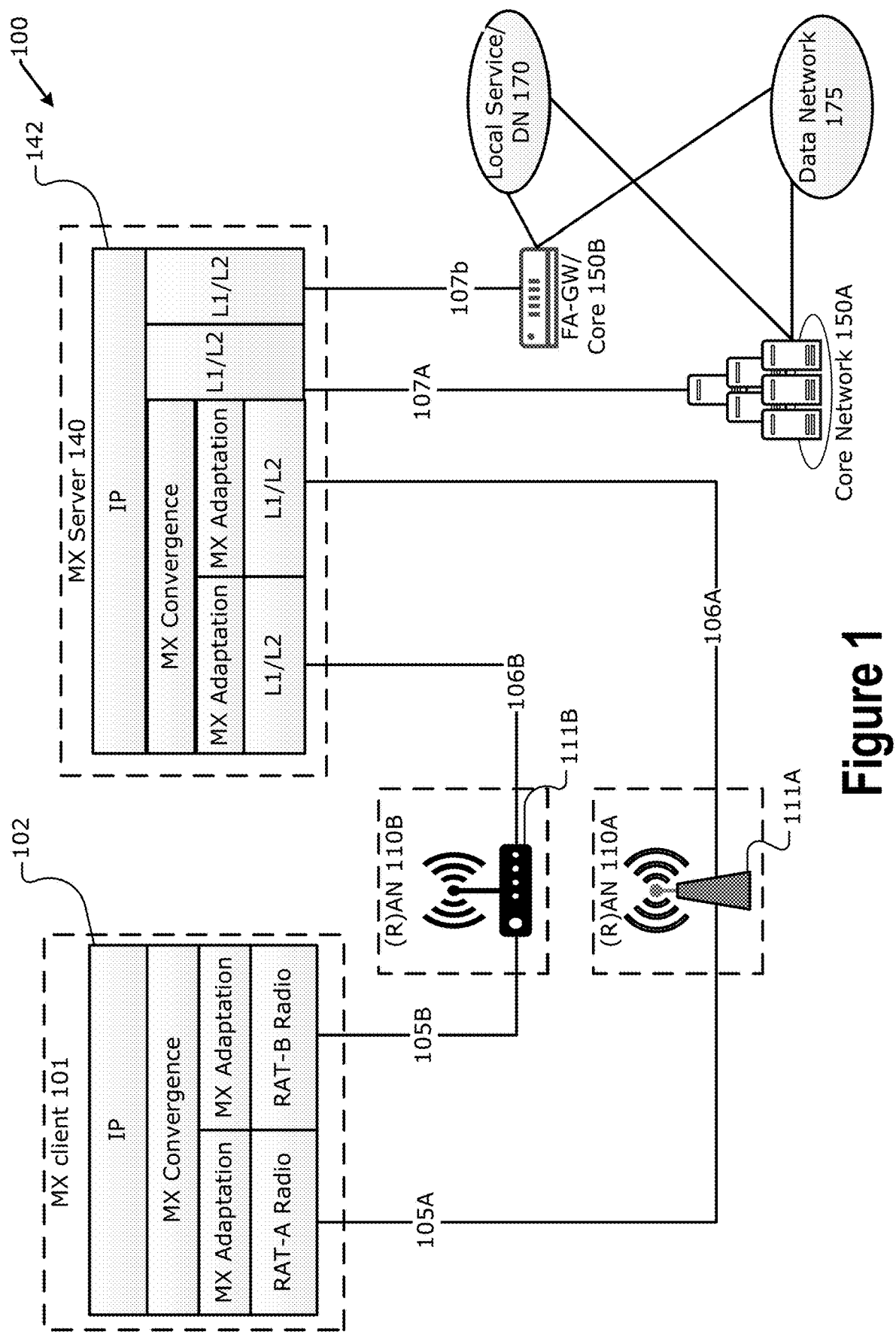
FIG. 1 depicts an example multi-access network utilizing Multiple Access Management Services (MAMS).

The present specification generally relates to data processing, service management, resource allocation, compute management, network communication, application partitioning, and communication system implementations, and in particular, to techniques and configurations for adapting various Edge computing devices and entities to dynamically support multiple entities (e.g., multiple tenants, users, stakeholders, service instances, applications, etc.) in a distributed Edge computing environment. The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the present disclosure. However, it will be apparent to those skilled in the art having the benefit of the present disclosure that the various aspects of the present disclosure may be practiced in other ways that depart from the specific details discussed herein. In certain instances, descriptions of well-known devices, circuits, and methods are omitted so as not to obscure the description with unnecessary detail.

1. Multi-Access Management Services (MAMS) and Generic Multi-Access (GMA)

Today, a device (e.g., mobile stations, user equipment (UEs), etc.) can be simultaneously connected to multiple communication networks based on different technology implementations (including different Radio Access Technologies (RATs)) and network architectures. In such multi-connectivity scenarios, it may be desirable to combine multiple access networks or select the best one to improve quality of experience (QoE) for a user and improve overall network utilization and efficiency. An access network is the segment in a network that delivers user data packets to a client via an access link such as a WiFi airlink, an cellular airlink, or DSL. The overall QoE perceived by the end users as well as utilization of the resources can be optimized with smart selection and combination of the paths used for the user plane (UP). In an advanced solution, the network paths can be dynamically selected based on knowledge of current conditions in the relevant access networks. The Multiple Access Management Services (MAMS) framework enables the smart selection and flexible combination of access and core network paths based on defined policies. By use of up-to-date information from available access networks, the best possible network efficiency and end user QoE perception based on application needs can be guaranteed. The MAMS framework can be used to flexibly select the combination of uplink (UL) and downlink (DL) access and core network paths having an optimal performance, and UP treatment for improving network utilization and efficiency and enhanced QoE for user applications (apps). With the MAMS framework, the optimal network paths can selected on UP level without any impact on the control plane signaling of the underlying access networks. Additional aspects of the MAMS framework are discussed in Kanugovi et al., "Multi-Access Management Services (MAMS)", Internet Engineering Task Force (IETF), Request for Comments (RFC) 8743 (March 2020) ("[RFC8743]"), and an example multi-access (MA) network implementing the MAMS framework is shown by FIGS. 1 and 2.

Figure 2:
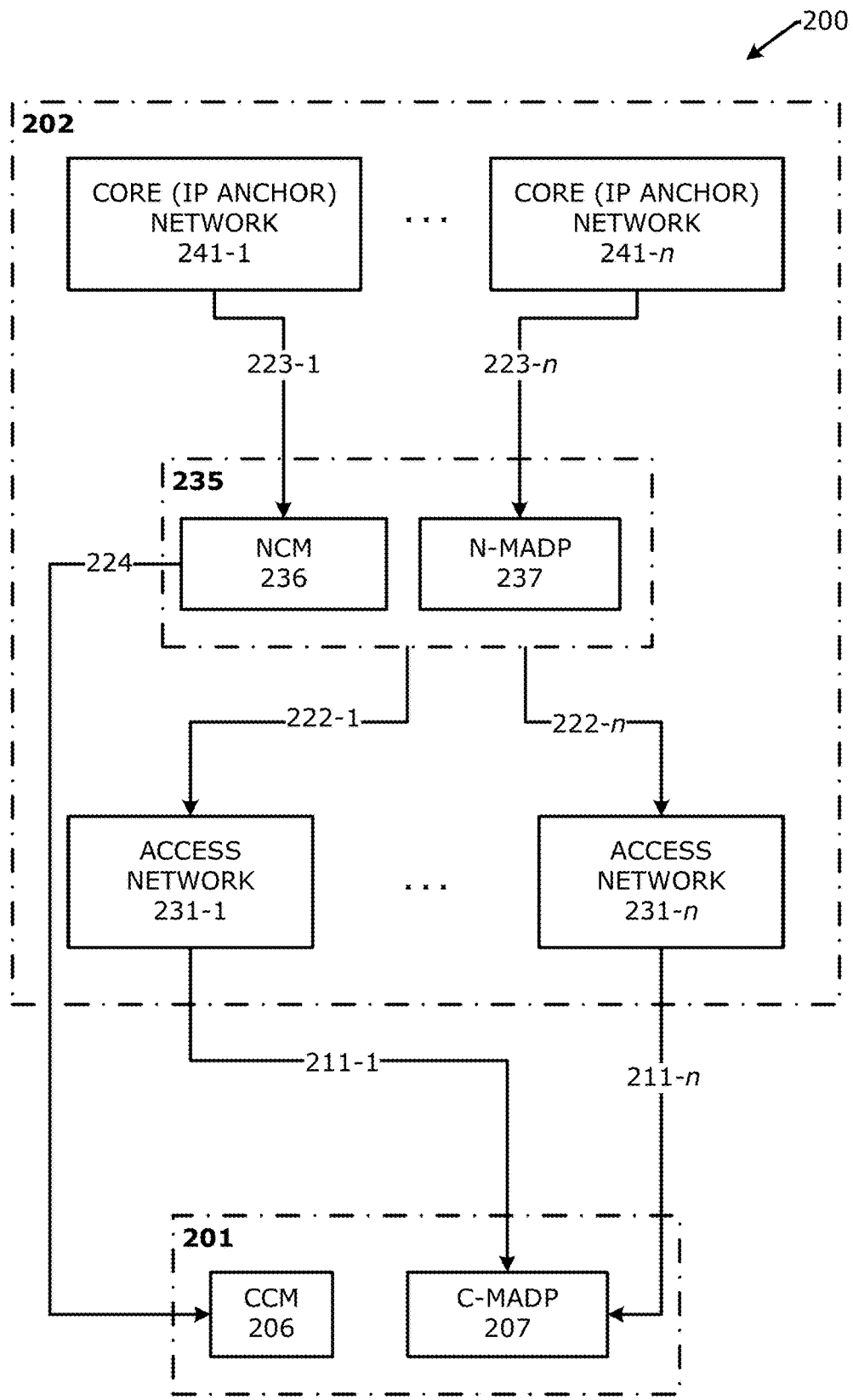
FIG. 2 illustrates a MAMS reference architecture.

FIG. 1 depicts an example multi-access ("MX" or "MA") network 100 utilizing MAMS technology. In particular, FIG. 1B shows a MAMS e2e UP protocol stack in the MX network 100, which includes both WiFi and 3GPP-based access. In this example, an MX client 101 includes a UP protocol stack 102 and a server 140 includes a UP protocol stack 142.

The MX client 101 is an end-user device that supports connections with one or more access nodes, possibly over different access technologies (or RATs), and is also referred to as a user station, user device, user equipment (UE), or multi-radio UE 101. The client 101 may be a Multiconnectivity client 101 that has, or supports, multiple network connections.

The MX server 140 (or "MAMS server 140") provides MAMS-related user-plane (UP) functionalities and/or optimizations in the network 100. The MX server 140 handles aggregation of multiple network paths 105, 106, 107, and/or the forwarding of user data traffic across multiple network paths 105, 106, 107. The MX server 140 may also be referred to as an MX gateway and/or a Network Multi Access Data Proxy (N-MADP) (see e.g., N-MADP 237 in FIG. 2). When the client 101 transmits packets to the server 140, the client 101 may be referred to as a "MAMS transmitter," "MX transmitter," or the like, and the server 140 may be referred to as a "MAMS receiver," "MX receiver," or the like. When the client 101 receives packets from the server 140, the client 101 may be referred to as a "MAMS receiver," "MX receiver," or the like, and the server 140 may be referred to as a "MAMS transmitter," "MX transmitter," or the like.

In one implementation, the MX server 140 is, or is operated by, one or more Edge compute nodes (see e.g., FIGS. 28-29 and 30-31). Additionally or alternatively, the MX server 140 is, or is operated by a MEC host (or MEC server), or is one or more MEC applications (apps) operated by a MEC server/host (see e.g., FIGS. 28-29). A MEC host/server is an entity that contains a MEC platform (e.g., MEC platform 2832 of FIG. 28) and a virtualization infrastructure (e.g., VI 282 of FIG. 28) to provide compute, storage and network resources to MEC apps. A MEC platform is a collection of functionality (including hardware and software elements) that is required to run MEC apps on a specific MEC host's virtualization infrastructure and to enable them to provide and consume MEC services, and that can provide itself a number of MEC services. MEC apps are applications that can be instantiated on a MEC host 140 within the MEC system and can potentially provide or consume MEC services, and MEC services are services provided via a MEC platform either by the MEC platform itself or by a MEC app. Various aspects of MEC hosts and MAMS servers are discussed in more detail infra. Throughout the present disclosure, the server 140 may be referred to as a MAMS server 140, a MEC host 140, MAMS-MEC system 140, or similar. In another implementation, the MAMS server 140 runs in an Edge computing system/platform/network and/or a cloud computing system/service/platform, and can deliver traffic between client server over multiple connections or paths.

The MX UE 101 (or "multi-radio UE 101") accesses or otherwise communicates with a data network (DN) 175 or local service 170 (also referred to as a local DN 170) via one or more (radio) access networks ("(R)ANs") 110 and the server 140. Each (R)AN 110 is a segment in a network that delivers user data packets to the client 101 and/or server 140 via access link(s) 105, which may be a wired connection (e.g., Ethernet, DSL, Coax, USB, and/or the like) or a wireless (radio) connection (e.g., WiFi airlink, 5G/NR airlink, LTE airlink, and/or the like). Each of the (R)ANs 110 implement an access technology ("AT"), which is the underlying mechanism(s) used to access a corresponding network.

In some implementations, the AT is a fixed access (wired) technology such as Ethernet, digital subscriber line technologies (DSL or xDSL); G·hn; coaxial cable access ("coax") such as Multimedia over Coax Alliance (MoCA), Data Over Cable Service Interface Specification (DOCSIS), and/or the like; powerline communication ("PLC" or "powerline") such as high definition (HD)-PLC and/or the like; Fiber to the x (FTTX; also referred to as "fiber in the loop"); Passive Optical Network (PON); and/or the like. Here, (R)AN node 111 may be a broadband modem (e.g., cable modem, DSL modem, an Optical Network Terminal (ONT) or an Optical Network Unit (ONU), G·hn semiconductor device, etc.), which may be used in combination with customer premises equipment (e.g., home/enterprise router(s), residential/enterprise gateway(s), mesh network device(s), WiFi access point(s), etc.). The fixed AN node 111 connects the client 101 to the access network 110 via an access connection 105 that operates according to an access protocol (e.g., Ethernet, V.35, Universal Serial Bus (USB) and/or Ethernet over USB, Point-to-Point Protocol over Ethernet (PPPoE), Internet Protocol over Ethernet (IPoE), G·hn, DOCSIS, and/or the like). Here, the access connection 105 may include one or more wires (e.g., telephone wiring, coax, power lines, plastic and/or glass optical fibers, and/or the like), and the particular wires used may depend on the underlying AT and/or infrastructure.

In other implementations, the AT may be a radio access technology (RAT) such as 3GPP Long Term Evolution (LTE), 3GPP Fifth Generation (5G)/New Radio (NR), MulteFire, ETSI Global System for Mobile Communications (GSM), WiFi®, Worldwide Interoperability for Microwave Access (WiMAX) (sometimes referred to as "wireless broadband" or "WiBro"), and/or the like. (R)ANs 110 could also encompass personal area network technologies such as Bluetooth® or Bluetooth Low Energy (BLE), IEEE 802.15.4 based protocols (e.g., 6LoWPAN, WirelessHART, MiWi, Thread, etc.), WiFi-direct, and/or the like. Each (R)AN 110 includes one or more (R)AN nodes 111, which may be macro cell base stations, remote radio heads (RRHs), small and/or micro cell base stations, access points (APs), home gateways (HGs), and/or other like network elements. A collection of (R)AN nodes 111 may also be referred to as an "access level edge network" or "access level edge." The (R)AN nodes 111 are configurable or operable to perform setup of transport resources, (e.g., for CDN services and/or other application level services) as well as scheduling signaling resources for providing network service of the underlying access network/RAT. Here, the access connection 105 may include wireless or air interfaces based on the underlying RAT (e.g., Uu-interface for LTE or 5G/NR RATs, PC5 interface for LTE or 5G/NR RATs, WiFi air interface for WLAN RATs, millimeter wave (mmWave) interface, Visible Light Communication (VLC) interface, and/or the like).

Each (R)AN 110a, 110b includes one or more respective network access nodes (NANs) 111a, 111b, which is/are communicatively coupled with/to a respective back-end network. One way to implement this service model is to use a multi-path Layer-4 (transport) solution such as Multi-Path TCP (see e.g., IETF RFC 6824 (January 2013)("[rfc6824]")) or MultiPath QUIC (MPQUIC) (see e.g., De Coninck et al., "Multipath Extensions for QUIC (MP-QUIC)," draft-deconinck-quic-multipath-07, IETA, QUIC Working Group (3 May 2021) ("[MPQUIC]")). Such solution is usually OS dependent and only applicable to specific application/traffic. Moreover, it operates at the individual flow level and offer suffers from high complexity & low efficiency. Recently, a new Layer-3 solution (see e.g., Zhu et al., "User-Plane Protocols for Multiple Access Management Service," draft-zhu-intarea-mams-user-protocol-09, IETA, INTAREA (4 Mar. 2020) ("[UPMAMS]")) has been proposed to support multi-path management without such limitations and drawback. In this implementation, the addition control information for multi-path management (e.g., sequence number, etc.) is appended as a trailer at the end of IP packet.

In the example of FIG. 1, the (R)AN 110A is a 3GPP-based access network such as an LTE E-UTRAN where the one or more (R)AN nodes 111A are evolved NodeBs (eNBs) or a next generation RAN (NG-RAN) where the one or more (R)AN nodes 111 are Next Generation NodeBs (gNBs) and/or NG Evolved Node-Bs (NG-eNBs). Additionally, in the example of FIG. 1, the (R)AN 110A is a WiFi-based access network where the (R)AN nodes 111B are WiFi Access Points (APs). The APs may be, for example, wireless routers, roadside ITS stations or roadside units, gateway appliances, central hubs, or the like. The multi-radio UE 101 is capable of establishing a 3GPP access link 105A with the eNB/gNB 111A (e.g., Uu interface or the like), and capable of establishing a WiFi access link 105B with the AP 111B. The eNB/gNB 111A communicates with the server 140 via a 3GPP backhaul link 106A and the AP 111B communicates with the server 140 via a WiFi backhaul link 106B. The 3GPP backhaul link 106A and the WiFi backhaul link 106B may be a suitable wired connection such as Ethernet, USB, Data Highway Plus (DH+), PROFINET, or the like. Furthermore, the MX server 140 is also communicatively coupled with a core network 150A via backhaul interface 107A and communicatively coupled with a Fixed Access (FA) gateway (GW) and/or FA-Core network 150B via the backhaul link 107B. In this example, the core network 150A may be a 3GPP core network such as a 5G core network (5GC) or an LTE Evolved Packet Core (EPC). Additionally or alternatively, the FA-GW may be a broadband network gateway (BNG) and/or the FA-Core may be broadband core that provides transport, and various resources provide content (provider data center, video head end, and so on). Additionally or alternatively, the FA-GW/Core may be a residential gateway (RG), a 5G-RG, a Fixed Network (FN) RG (FN-RG), an FN Broadband RG (FN-BRG), an FN Cable RG (FN-CRG), a Wireline 5G Access Network (W-5GAN), a Wireline 5G Cable Access Network (W-5GCAN), a Wireline Access Gateway Function (W-AGF), and/or some other suitable element/entity.

For purposes of the present disclosure, individual links 105, 106, or 107 may be referred to as access network connections (ANCs) or access network paths (ANPs). For example, an ANC or ANP may comprise a radio link 105 between client 101 and (R)AN node 111 in one or both directions. Additionally or alternatively, an ANC or ANP may refer to a combination of a link 105 and link 106 between client 101 and MX server 140 in one or both directions. Additionally or alternatively, an ANC or ANP may refer to a combination of a of links/paths 105, 106 and 107 between client 101 and local service 170 or data network 175 in one or both directions. Unless stated otherwise, the terms ANC, ANP, "link," "channel," "path," "connection," and the like may be used interchangeably throughout the present disclosure.

Additionally, the client 101 is configured provide radio information to one or more NANs 111 and/or one or more other entities/elements (e.g., Edge server(s), (R)AN(s) 110, core network function(s) (NF(s)), application function(s) (AF(s)), app server(s), cloud service(s), and/or the like). The radio information may be in the form of one or more measurement reports, and/or may include, for example, signal strength measurements, signal quality measurements, and/or the like. Each measurement report is tagged with a timestamp and the location of the measurement (e.g., the current location of the client 101). As examples, the measurements collected by the client 101 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio ($E_b/N_0$), energy per bit to interference power density ratio ($E_c/I_0$), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021 Mar. 31) ("[TS36214]"), 3GPP TS 38.215 v16.4.0 (2020 December) ("[TS38215]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26) ("[IEEE80211]"), and/or the like. Additionally or alternatively, any of the aforementioned measurements (or combination of measurements) may be collected by one or more NANs 111.

Additionally or alternatively, any of the aforementioned measurements (or combination of measurements) may be collected by one or more NANs 111 and provided to a suitable entity/element (e.g., Edge server(s), (R)AN(s) 110, NF(s), AF(s), app server(s), cloud service(s), and/or the like). The radio information may be reported either at a low periodicity or a high periodicity depending on a data transfer that is to take place, and/or other information about the data transfer. Additionally or alternatively, the element/entity may request the measurements from the NANs 111 at low or high periodicity, or the NANs 111 may provide the measurements to the element/entity at low or high periodicity. Additionally or alternatively, the element/entity may obtain other relevant data (e.g., Key Performance Indicators (KPIs), Key Quality Indicators, (KQIs), and/or the like) from other same or similar elements/entities with the measurement reports or separately from the measurement reports.

MAMS is a programmable framework that provides mechanisms for the flexible selection of network paths in an MX communication environment 100, based on the application needs and/or requirements, as well as adapt to dynamic network conditions when multiple network connections serve a client device 101. The MAMS framework leverages network intelligence and policies to dynamically adapt traffic distribution across selected paths and UP treatments (e.g., encryption needed for transport over WiFi, or tunneling needed to overcome a network address translation (NAT) between client 101 and a multi-path proxy) to changing network/link conditions. Network path selection and configuration messages are carried as UP data between the functional elements in the MX network 100B and the client 101, and thus, with little or no impact on the control plane (CP) signaling schemes of the underlying access networks (e.g., WiFi and 3GPP access networks in FIGS. 1A-1B). For example, in MX network 100B with 3GPP and WiFi technologies existing LTE and WiFi signaling procedures will be used to set up the LTE and WiFi connections, respectively, and MAMS-specific CP messages are carried as LTE or WiFi UP data. The MAMS framework defined in this document provides the capability to make a smart selection of a flexible combination of access paths and core network paths, as well as to choose the UP treatment when the traffic is distributed across the selected paths. Thus, it is a broad programmable framework that provides functions beyond the simple sharing of network policies such as those provided by the Access Network Discovery and Selection Function (ANDSF) discussed in 3GPP TS 24.312 v15.0.0 (2018 Jun. 21) ("[TS24312]"), which offers policies and rules for assisting 3GPP clients to discover and select available access networks. Further, it allows the choice and configuration of UP treatment for the traffic over the paths, depending on the application's needs The MAMS framework mechanisms are not dependent on any specific access network types or UP protocols (e.g., TCP, UDP, Generic Routing Encapsulation (GRE), QUIC, Multipath TCP (MPTCP), SCTP, MultiPath QUIC (MPQUIC), etc.). The MAMS framework coexists and complements the existing protocols by providing a way to negotiate and configure those protocols to match their use to a given MA scenario based on client and network capabilities, and the specific needs of each access network path. Further, the MAMS framework allows load balancing of the traffic flows across the selected access network paths, and the exchange of network state information to be used for network intelligence to optimize the performance of such protocols.

The MAMS framework is based on principles of UP interworking, which can be deployed as an overlay without impacting the underlying networks. MAMS co-exists and complements existing communication protocols by providing a way to negotiate and configure the protocols based on client and network capabilities. Further it allows exchange of network state information and leveraging network intelligence to optimize the performance of such communication protocols. MAMS has minimal or no dependency on the actual access technology of the participating links, which allows MAMS to be scalable for addition of newer access technologies and for independent evolution of the existing access technologies.

FIG. 1 also depicts a MAMS Data Plane Protocol Stack (DPPS) for transporting user payloads, for example, an IP Protocol Data Unit (PDU) carried via the IP layer and/or the like. The DPPS 102 and 142 includes the client-side MAMS DPPS 102 implemented by the client 101 and the server-side MAMS DPPS 142 implemented by the server 140. For devices equipped with multiple radio link technologies (or multiple RAT circuitries), such as 5G/NR, LTE, WiFi, etc., MAMS [RFC8743] provides a programmable framework to dynamically select and transmit data simultaneously over multiple radio links for high throughput, low latency, and improved reliability. The MAMS DPPS 102, 142 includes the following two (sub)layers: the convergence (sub)layer and the adaptation (sub)layer. The MX adaptation (sub)layer is added to (or on top of) each RAT circuitry, and the MX convergence (sub)layer connects the IP and MX adaptation (sub)layers.

The MX convergence layer is configurable or operable to perform MX-specific tasks in the UP. The MX convergence layer performs multi-access specific tasks/functions such as, for example, access (path) selection, multi-link (path) aggregation, splitting/reordering, lossless switching, keep-alive, probing, fragmentation, and/or concatenation. The MX convergence layer can be implemented by using existing UP protocols such MPTCP, Multipath QUIC (MPQUIC), or by adapting encapsulating header/trailer schemes such as GRE or Generic Multi-Access (GMA). In some implementations, the MX convergence supports GMA, MPTCP Proxy, GRE Aggregation Proxy, and MPQUIC. As discussed in more detail infra, the GMA protocol may be used to encode additional control information (e.g., Key, Sequence Number, Timestamp, etc.) at this (sub)layer.

The MX adaptation layer is configurable or operable to address and/or handle transport-network-related aspects such as, for example, tunneling, network-layer reachability and/or security, and NAT. The MX Adaptation Layer can be implemented using existing protocols (e.g. TCP, UDP, IPSec, QUIC, etc.). Additionally or alternatively, the MX Adaptation Layer can be implemented using UDP tunneling, IPsec, DTLS (see e.g., Rescorla et al., "Datagram Transport Layer Security Version 1.2", IETF, RFC 6347 (January 2012) and/or Moriarty et al., "Deprecating TLS 1.0 and TLS 1.1", IETF, RFC 8996 (March 2021) (collectively "[DTLS]"), or a Client NAT (e.g., a source NAT at the client with inverse mapping at the server 140 and/or Network Multi Access Data Proxy (N-MADP) 237 of FIG. 2). Additionally or alternatively, the adaptation method of the MX Adaptation Layer is UDP without DTLS, UDP with DTLS, IPsec (see e.g., Huttunen et al., "UDP Encapsulation of IPsec ESP Packets", IETF, Network Working Group, RFC 3948 (January 2005) ("[RFC3948]")), or Client NAT.

The MX Adaptation Layer can be independently configured for each of the access links 105A and 105B. In particular, UP packets of the anchor connection can be encapsulated in a UDP tunnel of a delivery connection between the N-MADP and C-MADP (see e.g., N-MADP 237 and C-MADP 207 in FIG. 2), an IPsec tunnel can be established between the N-MADP and C-MADP (see e.g., N-MADP 237 and C-MADP 207 in FIG. 2) on the network path that is considered untrusted, and/or DTLS can be used if UDP tunneling is used on the network path that is considered "untrusted". For example, in FIG. 1 including 3GPP (R)AN 110A (assumed secure) and WiFi (R)AN 110B (assumed to not be secure), the MX adaptation layer can be omitted for the 3GPP link 105A, but is configured with IPsec to secure the WiFi link 105B.

The MX convergence layer operates on top of the MX adaptation sublayer in the protocol stack. From the transmitter (Tx) perspective, a user payload (e.g., IP PDU) is processed by the MX convergence layer first, and then by the MX adaptation layer before being transported over a delivery access connection, From the receiver (Rx) perspective, an IP packet received over a delivery connection is processed by the MX adaptation sublayer first, and then by the MX convergence sublayer.

Where GMA is used, the MX convergence layer may be replaced with a "GMA convergence layer" or "GMA convergence sublayer." Here, multiple access networks 110 are combined into a single IP connection. If the NCM (see e.g., NCM 236 of FIG. 2) determines that N-MADP (see e.g., N-MADP 237 of FIG. 2) is to be instantiated with GMA as the MX Convergence Protocol, it exchanges the support of GMA convergence capability in the discovery and capability exchange procedures.

Where MPTCP is used, the MX convergence layer may be replaced with an MPTCP layer on top of individual TCP layers, where each TCP layer is onto of a respective MX adaption layer. Here, MPTCP is reused as the "MX Convergence Sublayer" protocol, and multiple access networks are combined into a single MPTCP connection. Hence, no new UP protocol or PDU format is needed in this case. If the NCM 236 determines that the N-MADP is to be instantiated with MPTCP as the MX Convergence Protocol, it exchanges the support of MPTCP capability during discovery and capability exchange procedures. MPTCP proxy protocols may be used to manage traffic steering and aggregation over multiple delivery connection.

Where GRE is used, the MX convergence layer may be replaced with a GRE layer on top of a GRE Delivery Protocol (e.g., IP) layer. Here, GRE is reused as the "MX Convergence sub-layer" protocol, and multiple access networks are combined into a single GRE connection. Hence, no new UP protocol or PDU format is needed in this case. If the NCM 236 determines that N-MADP is to be instantiated with GRE as the MX Convergence Protocol, it exchanges the support of GRE capability in the discovery and capability exchange procedures.

The MAMS framework can be supported by an Edge computing system/network, such as ETSI Multi-access Edge Computing (MEC) (see e.g., FIGS. 28-29), which defines the technical requirements for the implementation of MEC platforms. MEC is a technology that allows applications to be instantiated at the Edge of an access network, and provides a low-latency and a close proximity environment to user equipment (UEs). As a result, vertical industries are expected to significantly benefit from the deployment of MEC infrastructure together with the deployment of (R)ANs 110. These RANs 110 may be operated by different mobile network operations (MNOs) and/or operate different RATs. MEC systems are access agnostic, and thus, can support MAMS. In some implementations, MAMS can be a MEC service which provides services to MEC applications over the Mp1 interface. Meanwhile, the MEC platform can consume services provided by NFs in 3GPP network via an NEF or PCF if the AF is in the trust domain. Moreover, the 3GPP 5G system architecture has been extended to support functionality similar to MAMS, which is referred to as ATSSS.

FIG. 2 illustrates an example MAMS reference architecture 200 for a scenario of a client served by n networks (where n is a number). The MAMS framework allows for dynamic selection and flexible combination of access and core network paths as UL and DL for a device connected to multiple communication networks. The multiple communication networks interwork at the UP. The architecture is extendable to combine any number of networks, as well as any choice of participating network/access types (e.g., LTE, WLAN, MuLTEfire, DSL, 5G/NR, etc.) and deployment architectures (e.g., with UP gateway function at the access Edge, and/or the like).

FIG. 2 illustrates a scenario of a client 201 served by multiple (1 to n) core networks 241-1 to 241-n (where n is a number). The client 201 may be the same or similar as the client 101 of FIGS. 1A-1D. The MAMS architecture 200 includes the following functional elements: a client 201 including a Client Connection Manager (CCM) 206 and a Client Multi Access Data Proxy (C-MADP) 207; multiple (1 to n) access networks (ANs) 231 (including AN 231-1 to AN 231-n); a MAMS system 235 including a Network Connection Manager (NCM) 236 and a Network Multi Access Data Proxy (N-MADP) 237; and the multiple (1 to n) core networks 241-1 to 241-n. The CCM 206 and NCM 236 handle CP aspects, and the C-MADP 207 and N-MADP 237 handle UP aspects. The core networks (or simply "cores") 241-1 to 241-n are elements that anchor the client's 201 network address (e.g., IP address or the like) used for communication with applications via the network. One or more of the cores 241-1 to 241-n may correspond to cloud computing service(s), 5G core network(s) (5GCs), LTE core network(s) (e.g., evolved packet core (EPC)), a DSL/FIXED core, WLAN core, data center(s), and/or other like back-end system.

The client 201 is an end-user device supporting connections with multiple access nodes (e.g., (R)ANs 110 and/or (R)AN nodes 111 in FIG. 1), possibly over different access technologies. When the client 201 is capable of handling multiple network connections, the client 201 may be referred to as a "multiconnectivity client" or the like. The client 201 may be the same or similar as client 101 depicted by FIG. 1.

The ANs 231 are network elements in the network that deliver user data packets to the client 201 via respective point-to-point access links 211-1 to **211-*n*, which may include, for example, WiFi links, LTE cellular links, 5G/NR cellular links, DSL (fixed access) connections, and/or the like. In some implementations, the point-to-point access links 211-1 to 211-*n* may additionally or alternatively include short-range radio links such as, for example, Bluetooth® or BLE, IEEE 802.15.4 based protocols (e.g., 6LoWPAN, WirelessHART, MiWi, Thread, etc.), WiFi-direct, and/or the like. The ANs 231 may correspond to (R)ANs 110 and/or (R)AN nodes 111 of FIG. 1**.

A server manager (e.g., NCM 236) is a functional entity in a network 202 (e.g., network element, network appliance, gateway, Edge node(s), cloud node(s), etc.) that handles control messages from a client manager (e.g., CCM 206) and configures multi-access operations on the server side 202. Additionally or alternatively, the NCM 236 is a functional element in the network that handles MAMS control messages from the client 201 and configures the distribution of data packets over the available access and core network paths, and manages the UP treatment (e.g., tunneling, encryption, etc.) of the traffic flows. Additionally or alternatively, the NCM 236 provides the intelligence in the network to configure network paths and UP protocols based on client negotiation. The NCM 236 also acts as a common MA gateway for network policy input and interface to application platforms. One or more NCM 236 instances can be hosted at the access Edge (e.g., in one or more access networks 110, at individual access network nodes 111, and/or in one or more Edge compute nodes) and/or core network gateways.

The NCM 236 configures the network (N-MADP 237) and client (C-MADP 207) UP functions, such as negotiating with the client 201 for the use of available AN paths 221-1 to **221-*n*, protocols, and rules for processing the UP traffic, as well as link-monitoring procedures. The CP messages between the NCM 236 and the CCM 206 are transported as an overlay on the UP, without any impact on the underlying access networks. The NCM 236 handles MAMS CP messages from the client 201 and configures distribution of data packets over the multiple available access paths 221-1 to 221-*n*, delivery paths 222-1 to 222-*n*, and/or core network paths 223-1 to 223-*n*, as well as UP treatment of traffic flows. The CP messages exchanged between the NCM 236 and CCM 206 are transported as an overlay on the UP, without any impact to the underlying ANs 231**.

The CP path 224 may be overlaid over any access UP path. A "path" may be a UDP flow between two hosts, which may be denoted by a 4-tuple (e.g., IP source address, IP destination address, source port, destination port). Additionally or alternatively, WebSocket is used for transporting management and control messages between the NCM 236 and CCM 206, wherein MX Control Message are carried over (or encapsulated in) a WebSocket, and the WebSocket is carried over (or encapsulated in) TCP/TLS.

A client manager (e.g., CCM 206) is a functional entity in the client device 201 (e.g. desktop, workstation, laptop, smartphone, smart appliance, IoT device, etc.) that exchanges control messages with a server manager (e.g., NCM 236) to configure multi-access operations on the client side 201. Additionally or alternatively, the CCM 206 is a functional entity in the client 201 that exchanges MAMS signaling messages with the NCM 236, and which configures the network paths at the client 201 for the transport of user data.

The CCM 206 is a peer functional element in the client 201 for handling MAMS CP procedures. The CCM 206 manages multiple network connections 221-1 to **221-*n* at the client 201, and configures the multiple network paths 221-1 to 221-*n* at the client 201 for transport of user data. The CCM 206 exchanges MAMS signaling with the NCM 236 to support such functions as the configuration of the UL and DL user network path for transporting user data packets and the adaptive selection of network path by the NCM 236 by reporting on the results of link probing. Link probing and reporting may be used to support adaptive network path selection by the NCM 236. In the DL for user data received by the client 201, the CCM 206 configures C-MADP 207 such that application data packet received over any of the accesses to reach the appropriate application on the client 201. In the UL for the data transmitted by the client 201, the CCM 206 configures the C-MADP 207 to determine the best access links 221 to be used for UL data based on a combination of local policy and network policy delivered by the NCM 236 over link 224**.

The C-MADP 207 is a functional entity in the client 201 that handles user data traffic forwarding across multiple network paths. The C-MADP 207 is responsible for MAMS-specific UP functionalities in the client 201 such as encapsulation, fragmentation, concatenation, reordering, retransmissions, etc. The C-MADP 207 is configured by the CCM 206 based on signaling exchange with the NCM 236 and local policies at the client 201. The CCM 206 configures the selection of delivery connections 222-1 to **222-*n* and the UP protocols to be used for UL user data traffic based on the signaling exchanged with the NCM 236**.

The N-MADP 237 is a functional entity in the network 202 that handles the forwarding of user data traffic across multiple network paths. The N-MADP 237 is responsible for MAMS-related UP functionalities in the network 202. Such as encapsulation, fragmentation, concatenation, reordering, retransmission, etc. The N-MADP 237 is the distribution node that routes the UL UP traffic to the appropriate anchor connection 223-1 to **223-*n* towards a respective core network 241-1 to 241-*n*, and the DL user traffic to the client 201 over the appropriate delivery connection(s) 222-1 to 222-*n*. The anchor connections 223-1 to 223-*n* are network paths from the N-MADP 237 to the UP gateway (IP anchor) that has assigned an network address to the client 201, and the delivery connections 222-1 to 222-*n* are network paths from the N-MADP 237 to the client 201. One or more The N-MADP 237 instances can be hosted at the Access Edge (e.g., in one or more access networks 110 and/or at individual access network nodes 111) and/or Core Gateways. The N-MADP 237 instances may be hosted with or separate from the NCM 236** instances.

In the DL, the NCM 236 configures the use of delivery connections 222-1 to **222-*n*, and UP protocols at the N-MADP 237 for transporting user data traffic. The N-MADP 237 may implement Equal-Cost Multi-Path routing (ECMP) support for the down link traffic. Additionally or alternatively, the N-MADP 237** may be connected to a router or other like network element (e.g., AP XE136 of FIG. XE1) with ECMP functionality. The NCM 236 configures the N-MADP 237 with a load balancing algorithm based on static and/or dynamic network policies. These network policies may include assigning access and core paths for specific user data traffic type, data volume based percentage distribution, link availability and feedback information from exchange of MAMS signaling with the CCM 206 at the client 201, and/or the like. The N-MADP 237 can be configured with appropriate UP protocols to support both per-flow and per-packet traffic distribution across the delivery connections.

In the UL, the N-MADP 237 selects the appropriate anchor connection 223-1 to 223-$n$ over which to forward the user data traffic, received from the client 201 via one or more delivery connections 222-1 to 222-$n$. The forwarding rules in the UL at the N-MADP 237 are configured by the NCM 236 based on application requirements (e.g., enterprise hosted application flows via a LAN or WLAN anchor 241 (e.g., WiFi, cloud, and/or Edge network), Mobile Operator hosted applications via a cellular core network 241, and/or the like).

The NCM 236 and the N-MADP 237 can be either collocated with one another or instantiated on different network nodes. The NCM 236 can setup multiple N-MADP 237 instances in the network. The NCM 236 controls the selection of an individual N-MADP 237 instance by the client and the rules for distribution of user traffic across the N-MADP 237 instances. In this way, different N-MADP 237 instances may be used to handle different sets of clients for load balancing across clients. Additionally, the different N-MADP 237 instances may be used for different address deployment topologies (e.g., N-MADP 237 hosted at the UP node at the access Edge or in the core network, while the NCM 236 hosted at the access edge node), as well as address access network technology architecture. For example, an N-MADP 237 instance at a CN node 241 may be used to manage traffic distribution across LTE and DSL networks, and another N-MADP 237 instance at a (R)AN node 231-1, 231-$n$ may be used to manage traffic distribution across LTE and WiFi traffic. Furthermore, a single client 201 can be configured to use multiple N-MADP 237 instances, which may be used for addressing different application requirements. For example, individual N-MADP 237 instances may be used to handle TCP and UDP transport based traffic.

The CCM 206 and NCM 236 exchange signaling messages to configure the UP functions, C-MADP 207 and N-MADP 237, at the client and network respectively. The CCM 206 may obtain the CCM 236 credentials (FQDN or network address) for sending the initial discovery messages. As an example, the client 201 can obtain the NCM 236 credentials using methods like provisioning, DNS query. Once the discovery process is successful, the (initial) NCM 236 can update and assign additional NCM 236 addresses, for example, based on MCC/MNC tuple information received in the MX Discovery Message, for sending subsequent CP messages.

The CCM 206 discovers and exchanges capabilities with the NCM 236. The NCM 236 provides the credentials of the N-MADP 237 end-point and negotiates the parameters for UP with the CCM 206. CCM 206 configures C-MADP 207 to setup the UP path (e.g., MPTCP/UDP Proxy Connection) with the N-MADP 237 based on the credentials (e.g., (MPTCP/UDP) Proxy network address (e.g., IP address and port), Associated Core Network Path), and the parameters exchanged with the NCM 236. Further, NCM 236 and CCM 206 exchange link status information to adapt traffic steering and UP treatment with dynamic network conditions. The key procedures are described in details in the following subsections.

A UDP (or QUIC) connection may be configured between the C-MADP 207 and the N-MADP 237 to exchange control messages. The control messages may be or include, for example, keep-alive, probe request (REQ)/acknowledgement (ACK), Packet Loss Report (PLR), First Sequence Number (FSN), Coded MX SDU (CMS), Traffic Splitting Update (TSU), Traffic Splitting ACK (TSA) messages, and/ or path quality estimation information. The N-MADP 237 end-point network address (e.g., IP address or the like) and port number (e.g., UDP port number of the UDP connection) is used to identify MX control PDUs.

The various elements depicted in the example of FIG. 2 may be implemented using a variety of different physical and/or virtualized components. For example, the elements within MAMS network 202 may be implemented using one or more components of an Edge node, such as one or more LTE or 5G RANs, or the MEC system 2800 of FIG. 28 or the like. Additionally or alternatively, the MAMS system 235 may be implemented in or by an individual RAN node, such as one or more of the RAN nodes 111 in FIGS. 1A-1C. In one example, the MAMS system 235 is implemented as part of the layer 3 (L3) protocol stack (e.g., the RRC layer or the like). In another example, the MAMS system 235 is implemented as part of a layer above L3 such as the network layer (e.g., IP, UDP, QUIC, GTP-U, etc.) data plane protocol stack of the RAN nodes. In another example, the MAMS system 235 may be is implemented as a separate layer between the L3 and upper layers. In another example, the MAMS system 235 may be implemented in or by a gNB-CU of a CU/DU split architecture. In another example, the MAMS system 235 may be implemented in or by a vBBU pool, or a cloud RAN (C-RAN). Additionally or alternatively, the functional elements within MAMS network 202 may be implemented by one or more network functions (or as a VNF) of CN 150A in FIG. 1. For example, the N-MADP 237 may run on an S-GW or P-GW when CN 150A is an EPC, or the N-MADP 237 may run on a User Plane Function (UPF) when CN 150A is a 5GC.

In MEC-based implementations (see e.g., FIGS. 28-29), the MAMS system 235 may be implemented in or by a MEC host/server (e.g., MEC host 2802 in FIG. 28) that is located in, or co-located with, a RAN 110 or RAN node 111. The functions that are located in the network side (e.g., the NCM 236 and N-MADP 237) can be hosted either at a centralized location or at the Edge cloud (see e.g., Edge cloud 3163 of FIG. 31). They can be deployed either as MEC application (e.g., MEC app(s) 2826 of FIG. 28) or co-located with other functions (e.g., MEC platform 2832 of FIG. 28). Additionally or alternatively, up-to-date information from the access networks may be provided to the NCM 236 for intelligent network path selection over APIs by the MEC platform (e.g., MEC platform 2832 of FIG. 28) the same way as it exposes RNI over RNI API, TMS over a TMS API, and/or BWMS over BWM API. Additionally or alternatively, similar levels of information may be defined for 3GPP access networks as well as for WiFi, MulteFire, DSL, etc., either by amending the existing RNI/BWM APIs or by defining new APIs specific for the new access technologies.

Figure 28:
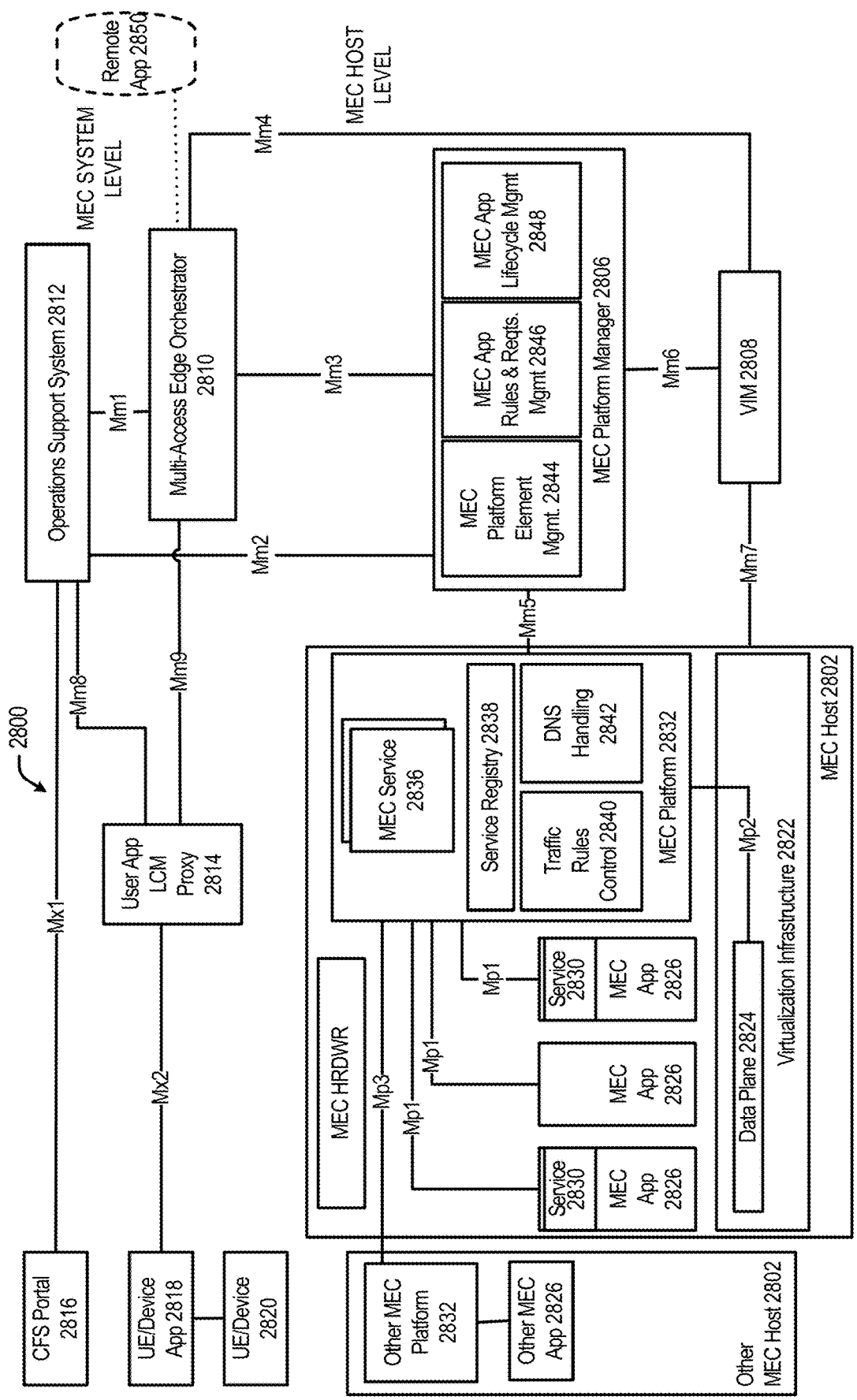
FIG. 28 illustrates a MEC system reference architecture.

In additional or alternative MEC-based implementations (see e.g., FIGS. 28-29), the NCM 236 can be hosted on a MEC cloud server (e.g., MEC host 2802 and/or MEC app(s) 2826 in FIG. 28) that is located in the UP path at the Edge of the multi-technology access network. The NCM 236 and CCM 206 can negotiate the network path combinations based on an application's needs and the necessary UP protocols to be used across the multiple paths. The network conditions reported by the CCM 206 to the NCM 236 can be complemented by a Radio Analytics application (see e.g., [MEC012]) residing at the MEC cloud server to configure the UL and DL access paths according to changing radio and congestion conditions. Additionally or alternatively, the UP functional element (e.g., the N-MADP 237) can either be collocated with the NCM 236 at the MEC cloud server (e.g., MEC-hosted applications, etc.) or placed at a separate network element like a common UP gateway across the multiple networks. Also, even in scenarios where an N-MADP 237 is not deployed, the NCM 206 can be used to augment the traffic steering decisions at the client 201. These enhancements is to improve the end user's QoE by leveraging the best network path based on an application's needs and network conditions, and building on the advantages of significantly reduced latency and the dynamic and real-time exposure of radio network information available at the MEC.

As used herein a "GMA receiver" may be an N-MADP 237 instance or C-MADP 207 instance (see e.g., FIG. 2) instantiated with GMA as the convergence protocol that receives packets encapsulated or otherwise generated according to GMA procedures, and processes the received packets per the procedures discussed in Zhu et al., "Generic Multi-Access (GMA) Convergence Encapsulation Protocols," draft-zhu-intarea-gma-09, IETA, INTAREA/Network Working Group (1 Apr. 2021) ("[GMA09]"), which is hereby incorporated by reference in its entirety. Additionally, as used herein a "GMA transmitter" may be an N-MADP 237 instance or C-MADP 207 instance instantiated with GMA as the convergence protocol that processes and/or encapsulates or otherwise generates packets/PDUs according to GMA procedures discussed in [GMA09].

As mentioned previously, MAMS is a programmable framework that provides mechanisms for flexible selection of network paths in a multi-connection (access) communication environment, based on application needs. It leverages network intelligence and policies to dynamically adapt traffic distribution across selected paths and user plane treatment to changing network/link conditions. The network path selection and configuration messages are carried as user plane data between the functional elements in the network and the end-user device, and thus without any impact to the control plane signaling schemes of the individual access network. Today's MAMS solutions require deploying MAMS control and data plane network functions in the network [RFC8743]. The present disclosure extends the MAMS framework to support OTT MAMS (e.g., lossless switching, aggregation, etc.) without any change or dependency in network. The OTT MAMS can run as part of MAMS hosted on a cloud computing service/platform, an Edge computing platform/service (e.g., ETSI MEC, and/or the like), and/or using suitable Virtual Machines (VMs) and/or containers provided by such a cloud computing service/platform and/or Edge computing platform/service.

Furthermore, as the mobile and/or wireless access technologies and networks continue to evolve, it is becoming clear that no single radio technology will be able to meet the variety of requirements for human and machine communications. On the other hand, driving more data through a scarce and finite radio spectrum becomes a real challenge, and spectrum efficiency is approaching a plateau and will not deliver the needed increase in bandwidth improvement itself. For example, 3GPP 5G cellular technology is likely to utilize frequencies below 6 Gigahertz (GHz) as well as millimeter wave ("mmWave" or "MMW"), in both licensed and unlicensed bands. The present disclosure also provides a Software-Defined, Access-Agnostic, and High-Performance solution to such issues, which is referred to herein as Generic Multi-Access (GMA) to enable integration of multiple (heterogeneous or homogeneous) radio access networks and RATs at the Edge, without impacting existing RAT protocol stacks (e.g. PDCP, RRC, Ethernet, etc.) or existing network protocols (e.g., internet protocol (IP), transmission control protocol (TCP), user datagram protocol (UDP), Quick UDP Internet Connections (QUIC), etc.). GMA may be considered a Layer 2.5 protocol. The present disclosure describes various GMA e2e network architecture, protocols, procedures, algorithms, and system functionalities as well as deployment implementations.

Figure 3:
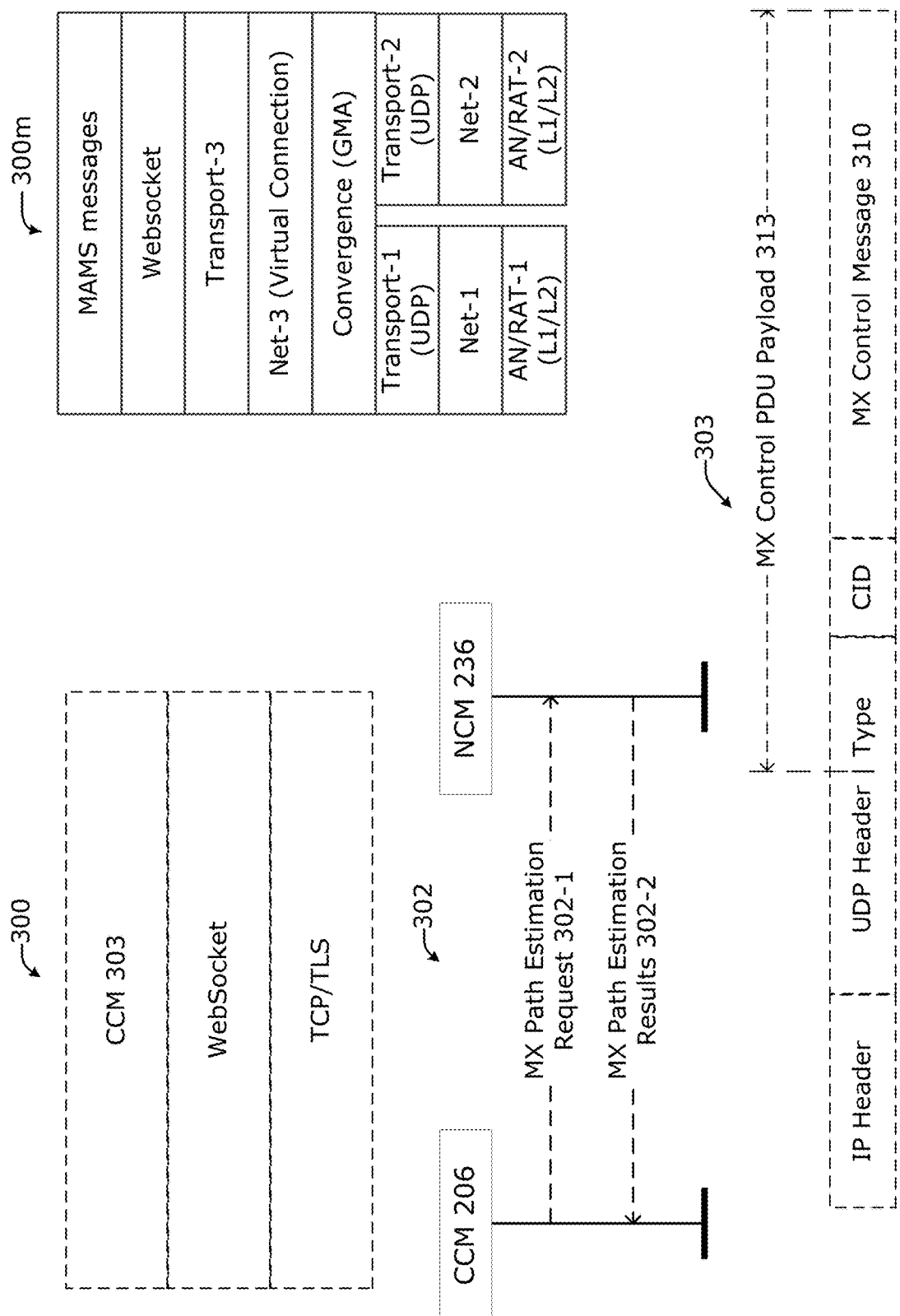
FIG. 3 illustrates an example MX control plane protocol and MX control message.

FIG. 3 depicts an example MAMS Control-Plane Protocol Stack (CPPS) 300. The CPPS 300 includes an Multi-Access (MX) Control Message layer 303, a WebSocket layer, and a Transport Control Protocol (TCP)/Transport Layer Security (TLS) layer. Here, WebSocket (see e.g., IETF RFC 6455 (December 2011) and IETF RFC 8441 (September 2018)) is used for transporting management and control messages (e.g., MX Control Messages 303) between the NCM 236 and the CCM 206. Each MAMS control message 3003 may include one or more of the following fields: Version (indicates the version of the MAMS control protocol); Message Type (indicates the type of the message, e.g., MX Discover, MX Capability Request (REQ)/Response (RSP)); and Sequence Number (SN) (Auto-incremented integer to uniquely identify a particular message exchange (e.g., MX Capability Request/Response).

FIG. 3 shows a MAMS management protocol stack 300m. Here, a secure websocket is established over a third transport layer (e.g., TCP, UDP, IP Security Protocol (IPSec), etc.) tunnel that is established over a virtual network layer (anchor) connection (e.g., IP or some other suitable network layer protocol) for sending MAMS management messages between the CCM 206 and the NCM 236. The virtual (anchor) connection is on top of a convergence layer that implements a convergence protocol (e.g., GMA or the like), which encapsulates the MAMS management messages in the virtual (anchor) connection packet(s) (e.g., IP packets). The convergence (GMA) layer resides on top of respective transport (e.g., UDP or IPSec) tunneling layers for respective access networks (ANs) 1 and 2, which is on top of respective network layers (e.g., IP or the like), which are on top of layer 2 (L2) and Layer 1 (L1) of the respective access networks/RATs 1 and 2.

In some implementations, when the virtual connection has not been set up, the CCM 206 can only establish the secure websocket over one of the delivery IP connections first (e.g., RAT-1). After the virtual IP connection is up, the CCM 206 will close it and establish a new one over the (anchor) virtual IP connection, and the corresponding (virtual) IP packets (carrying one or more MAMS messages) are encapsulated in a same or similar way as data packets (see e.g., FIG. 25).

FIG. 3 also shows a MAMS Control-Plane (CP) Procedure 302 for Path Quality Estimation. Path quality estimations can be done either passively or actively. Traffic measurements in the network can be performed passively by comparing real-time data throughput of the client 201 with the capacity available in the network. In special deployments where the NCM 236 has interfaces 222 with access nodes 231, 111, the direct interfaces can be used to gather information regarding path quality. For example, the utilization of an LTE access node (eNB), to which the client 201 is attached, could be used as data for the estimation of path quality without creating any extra traffic overhead. Active measurements by the client 201 provide an alternative way to estimate path quality.

Procedure 302 begins at operation 302-1 where the NCM 236 sends an MX Path Estimation Request to the CCM 206. At operation 302-2, the CCM 206 sends an MX Path Estimation Results message to the NCM 236. The NCM 236 may send one or more of the following configuration parameters in the MX Path Estimation Request (operation 302-1) to the CCM 206: Connection ID (of the delivery connection 222 whose path quality needs to be estimated); Init Probe Test Duration (ms); Init Probe Test Rate (Mbps); Init Probe Size (bytes); Init Probe-ACK Required (0→No/1→Yes); Active Probe Frequency (ms); Active Probe Size (bytes); Active Probe Test Duration (ms); and Active Probe-ACK Required (0→No/1→Yes).

The CCM 226 configures the C-MADP 207 for probe receipt based on these parameters and for collection of the statistics according to the following configuration: Unique Session ID (session identifier provided to the client in an MX Capability Response); Init Probe Results Configuration (e.g., including Lost Probes (percent), and/or Probe Receiving Rate (packets per second)); Active Probe Results Configuration (e.g., including Average Throughput in the last Probe Duration).

The UP probing is divided into two phases: the Initialization phase and the Active phase. For the Initialization Phase, a network path that is not included by the N-MADP 237 for transmission of user data is deemed to be in the Initialization phase. The user data may be transmitted over other available network paths. For the Active Phase, a network path that is included by the N-MADP 237 for transmission of user data is deemed to be in the Active phase.

During the Initialization phase, the NCM 236 configures the N-MADP 237 to send an Init Probe-REQ message. The CCM 206 collects the Init Probe statistics from the C-MADP 207 and sends the MX Path Estimation Results message (operation 302-2) to the NCM 236 per the Initialization Probe Results configuration.

During the Active phase, the NCM 236 configures the N-MADP 237 to send an Active Probe-REQ message. The C-MADP 207 calculates the metrics as specified by the Active Probe Results configuration. The CCM 206 collects the Active Probe statistics from the C-MADP 207 and sends the MX Path Estimation Results message to the NCM 236 (operation 302-2) per the Active Probe Results configuration.

FIG. 3 also shows an MX Control message format 303. As shown, the MX Control message 303 includes an IP header, a UDP header, and an MX Control PDU Payload 313. The MX Control PDU Payload 313 includes a type field, a CID field, and an MX Control Message 310. The MX Control PDU 313 may include one or more of the following fields: Type (1 byte) to indicate the type of the MX Control message (a value of "0" indicates a Keep-Alive type, and a value of "1" indicates a Probe-REQ/ACK type; Others: Reserved); CID (1 byte) to indicate a connection ID of the delivery connection for sending the MX Control message 303; and an MX Control Message 310 (variable size/length) including the payload of the MX Control message 310. The MX Control message 303/PDU 310 is sent as a normal UP packet over the desired delivery connection whose quality and reachability need to be determined.

The control message 303/PDU 310 may be encoded as a Keep-Alive and/or Probe-REQ/ACK messages to support path quality estimation. The "Type" field is set to "0" for Keep-Alive messages. The C-MADP 207 may periodically send a Keep-Alive message over one or multiple delivery connections 222-1 to 222-n (e.g., ANCs 105, 106, and/or 107), especially if UDP tunneling is used as the adaptation method for the delivery connection 222 with a NAT function on the path. A Keep-Alive message is 2 bytes long and includes a Keep-Alive Sequence Number field (2 bytes) to indicate the sequence number (SN) of the Keep-Alive message. The "Type" field is set to "1" for Probe-REQ/ACK messages. The N-MADP 237 may send a probe request (Probe-REQ) message for path quality estimation. In response, the C-MADP 207 may return a probe acknowledgement (Probe-ACK) message.

A Probe-REQ message may include one or more of the following fields: Probing Sequence Number (2 bytes) to indicate an SN of the Probe REQ message; Probing Flag (1 byte) where Bit 0 is a Probe-ACK flag to indicate whether the Probe-ACK message is expected (1) or not (0), Bit 1 is a Probe Type flag to indicate whether the Probe-REQ/ACK message was sent during the Initialization phase (0) when the network path is not included for transmission of user data, or during the Active phase (1) when the network path is included for transmission of user data, Bit 2 is a bit flag to indicate the presence of the Reverse Connection ID (R-CID) field, and Bits 3-7 are Reserved; Reverse Connection ID (R-CID) (1 byte) to indicate the connection ID of the delivery connection for sending the Probe-ACK message on the reverse path; and Padding (variable). The "Padding" field is used to control the length of the Probe-REQ message. The "R-CID" field is only present if both Bit 0 and Bit 2 of the "Probing Flag" field are set to "1". Moreover, Bit 2 of the "Probing Flag" field should be set to "0" if Bit 0 is "0", indicating that the Probe-ACK message is not expected. If the "R-CID" field is not present, but Bit 0 of the "Probing Flag" field is set to "1", the Probe-ACK message should be sent over the same delivery connection as the Probe-REQ message.

The C-MADP 207 should send the Probe-ACK message in response to a Probe-REQ message with the Probe-ACK flag set to "1". A Probe-ACK message is 3 bytes long and includes a Probing Acknowledgment Number field (2 bytes) to indicate/include a sequence number of the corresponding Probe-REQ message.

The CCM 206 and NCM 236 exchange signaling messages to configure the UP functions via the C-MADP 207 and the N-MADP 237 at the client and the network, respectively. The means for the CCM 206 to obtain the NCM 236 credentials (e.g., Fully Qualified Domain Name (FQDN) or network address (e.g., IP address, or the like)) for sending the initial discovery messages are out of scope for this document. As an example, the client can obtain the NCM 236 credentials by using such methods as provisioning or DNS queries. Once the discovery process is successful, the (initial) NCM 236 can update and assign additional NCM 236 addresses (e.g., based on Mobile Country Code (MCC)/Mobile Network Code (MNC) tuple information received in the MX Discover message) for sending subsequent CP messages.

The CCM 206 discovers and exchanges capabilities with the NCM 236. The NCM 236 provides the credentials of the N-MADP 237 endpoint and negotiates the parameters for the user plane with the CCM. The CCM 206 configures the C-MADP 207 to set up the UP path (e.g., MPTCP/UDP Proxy connection) with the N-MADP, based on the credentials (e.g., (MPTCP/UDP) Proxy network address (e.g., IP address or the like) and port, associated core network path), and the parameters exchanged with the NCM 236. Further, the NCM 236 and CCM 206 exchange link status information to adapt traffic steering and UP treatment to dynamic network conditions.

After sending a MAMS control message, the MAMS CP peer (NCM 236 or CCM 206) waits for a duration of MAMS_TIMEOUT ms before timing out in cases where a response was expected. The sender of the message will retransmit the message for MAMS_RETRY times before declaring failure if no response is received. A failure implies that the MAMS peer is dead or unreachable, and the sender reverts to native non-multi-access/single-path mode. The CCM 206 may initiate the MAMS discovery procedure for re-establishing the MAMS session.

MAMS CP peers execute the keep-alive procedures to ensure that the other peers are reachable and to recover from dead-peer scenarios. Each MAMS CP endpoint maintains a Keep-Alive timer that is set for a duration of MAMS_KEEP_ALIVE_TIMEOUT. The Keep-Alive timer is reset whenever the peer receives a MAMS control message. When the Keep-Alive timer expires, an MX Keep-Alive Request is sent.

The values for MAMS_RETRY and MAMS_KEEP_ALIVE_TIMEOUT parameters used in keep-alive procedures are deployment dependent. As an example, the client 201 and network can obtain the values using provisioning. On receipt of an MX Keep-Alive Request, the receiver responds with an MX Keep-Alive Response. If the sender does not receive a MAMS control message in response to MAMS_RETRY retries of the MX Keep-Alive Request, the MAMS peer declares that the peer is dead or unreachable. The CCM 206 may initiate the MAMS discovery procedure for re-establishing the MAMS session.

Additionally, the CCM 206 immediately sends an MX Keep-Alive Request to the NCM whenever it detects a handover from one (R)AN node 111 to another (R)AN node 111. During this time, the client 201 stops using MAMS UP functionality in the UL direction until it receives an MX Keep-Alive Response from the NCM 236.

The MX Keep-Alive Request includes the following information: Reason (e.g., can be timeout or handover. Handover shall be used by the CCM 206 only on detection of a handover); Unique Session ID (Unique session identifier for the CCM 206 that set up the connection. If the session already exists, then the existing unique session identifier is returned. An NCM ID is a unique identity of the NCM 236 in the operator network, and the session ID is a unique identity assigned to the CCM 206 instance by this NCM 236 instance); Connection ID (if the reason is handover, the inclusion of this field may be mandatory); and Delivery Node ID (identity of the node to which the client is attached. In the case of LTE, this is an E-UTRAN Cell Global Identifier (ECGI). In the case of WiFi, this is an AP ID or a Media Access Control (MAC) address. If the reason is "Handover", the inclusion of this field may be mandatory).

The present disclosure provides new mechanisms to support dynamic traffic splitting/steering at the convergence (sub)layer in MAMS. Existing solutions include various are e2e protocols, such as multi-path TCP (MPTCP), to utilize multiple path or RATs to achieve higher throughput. However, these e2e protocol solutions are managed at the server, which is far away from the data splitting point, and therefore, result in relatively high feedback delay. Moreover, the existing solutions cannot access the radio layer information.

[GMA09] specifies how to dynamically split user data traffic over multiple links at the MX convergence sublayer. The present disclosure provides dynamic traffic splitting for different optimization targets such as reducing e2e delay (e.g., "low delay") or minimizing cellular (e.g., 5G/NR, LTE, etc.) usage (e.g., "low cost"). The present disclosure includes GMA-based traffic splitting that operates in the convergence layer of the MAMS framework (see e.g., FIGS. 1-3). The GMA-based traffic splitting mechanisms are transparent to lower layers and do not require any information from those layers. Two multi-path traffic splitting options are provided including a low delay and low cost options. Various Edge computing frameworks, such as the MEC framework discussed herein, may be used to operate/implement the GMA-based traffic splitting. One example implementation includes using the Smart-Edge/MEC platform provided by Intel®.

Figure 4:
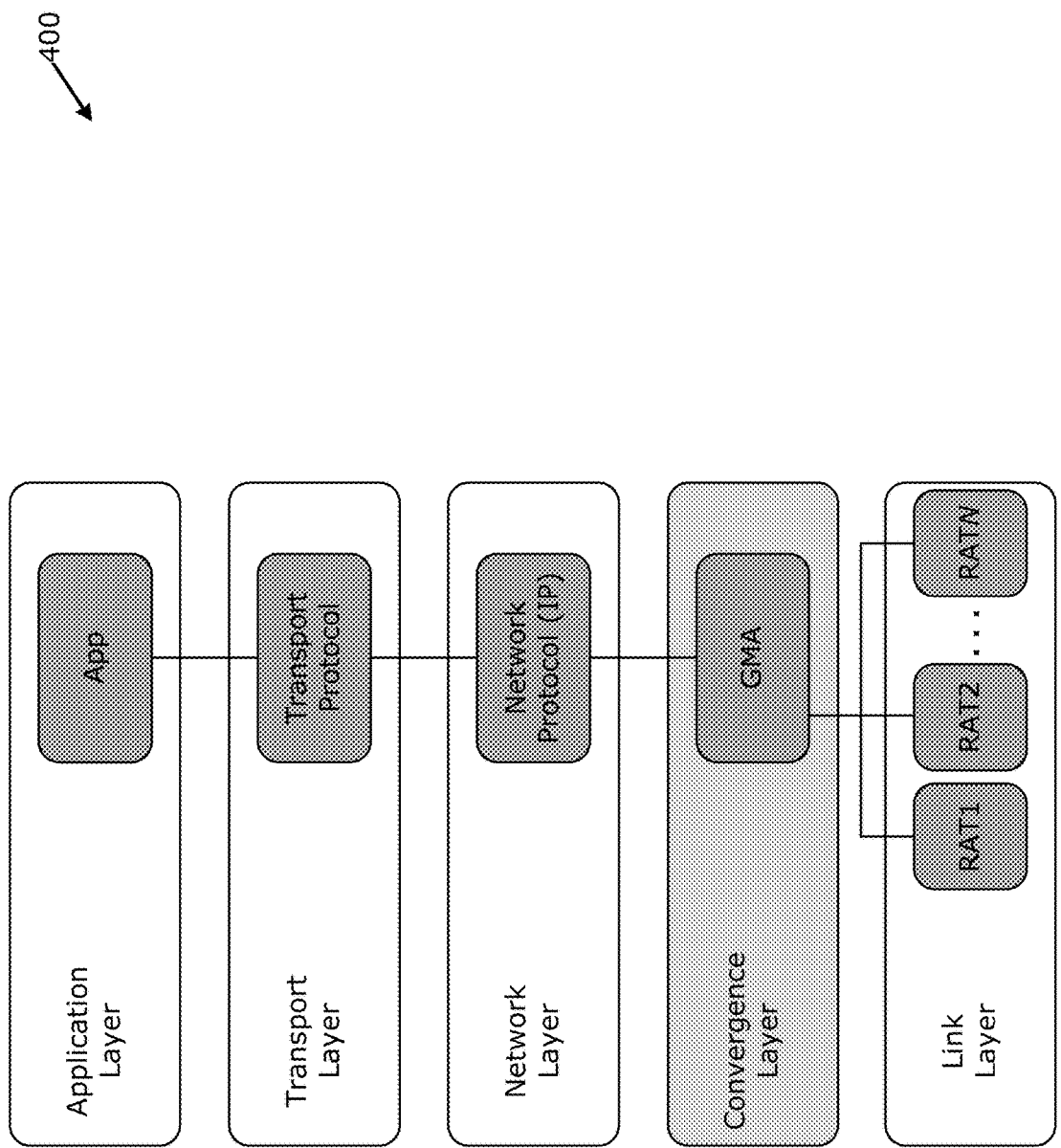
FIG. 4 depicts a Network model with convergence layer.

FIG. 4 depicts a network model (protocol stack) 400 with a convergence layer. In FIG. 4, an applications layer (including one or more apps) is on top of a transport layer (which includes at least one transport protocol), which is on top of a network layer (which includes at least one network protocol), which is on top of the convergence layer (which includes at least one convergence protocol, which is GMA in this example), which is on top of a link layer (which includes 1 to N RAT protocols (where N is a number)). The transport layer protocol may be TCP, UDP, QUIC, and/or any other suitable transport protocol such as those discussed herein. Additionally or alternatively, the network layer protocol may be IP and/or any other suitable network protocol such as those discussed herein.

Figure 5:
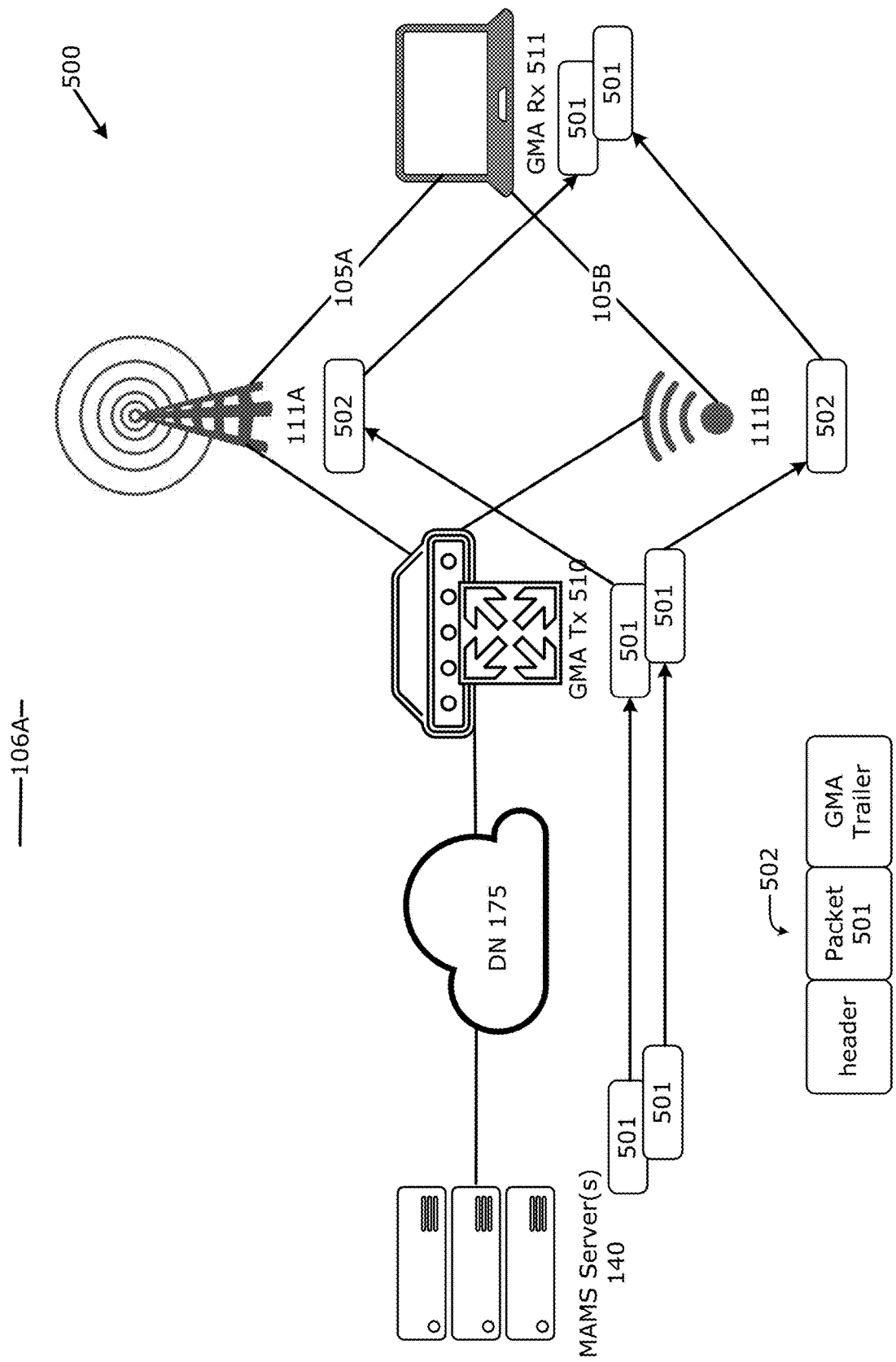
FIG. 5 depicts an example of GMA-based multi-access traffic splitting for downlink.

FIG. 5 shows a GMA multi-access traffic splitting example 500 for a downlink direction. In the example 500, data packets 501 are sent by the MAMS server(s) 140 to a GMA transmitter (Tx) 510 via the DN 175 (e.g., the Internet). The data packets 501 may have any suitable network protocol format; for example, the data packets 501 may be IP packets or the like. The GMA Tx 510 sends one or more packets to NAN 111A for delivery to a GMA receiver (Rx) 511 (e.g., client 101) and sends one or more packets to NAN 111B for delivery to the GMA Rx 511 (e.g., client 101). The NANs 111A, 111B generate encapsulated packets 502 from the packets 501 by adding a header (e.g., an IP header) and a GMA trailer (discussed in more detail infra) to each packet 501. The encapsulated packets 502 are then sent to the client 101 over the respective access network connections 105. The methods for encapsulating the packets 501 is discussed in [GMA09].

The main responsibilities of the convergence protocol (see e.g., FIG. 4) is based on whether the entity is acting as a GMA Tx entity 510 or a GMA Rx entity 511. The GMA Tx entity 510 splits or duplicates traffic over multiple radio links 105 and retransmits packets over a different radio link 105 based on e2e measurements. The GMA Rx entity 511 reorders packets received over different radio links 105 and forwards those packets to higher layer entities, in sequence.

1.1. Dynamic Traffic Splitting Mechanisms

Figure 21:
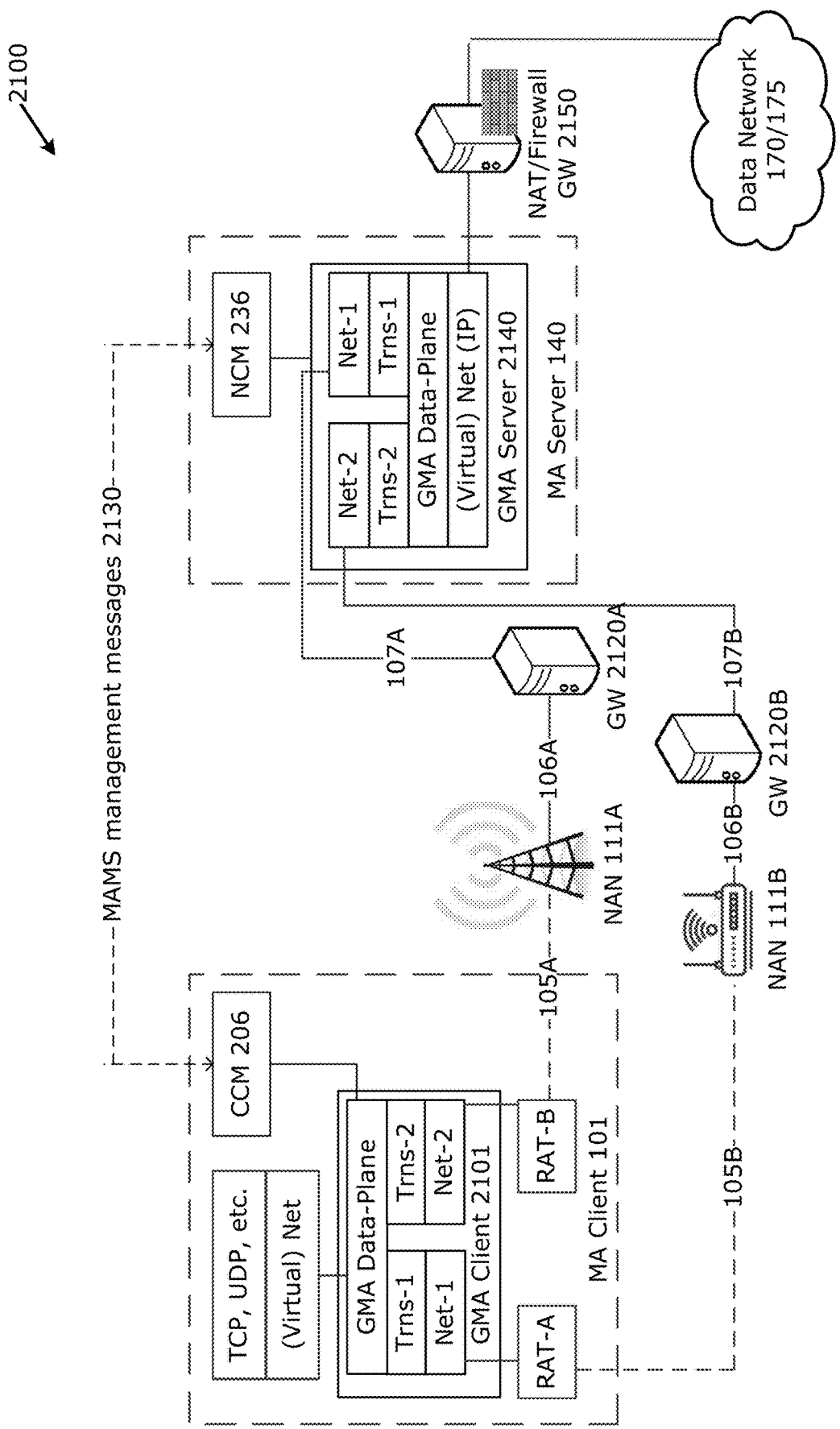
FIG. 21 depicts an OTT Generic Multi-Access (GMA) end-to-end (e2e) Network Reference Architecture.

Referring back to FIG. 1, the MX convergence (sub)layer operates on top of the MX adaptation (sub)layer in the protocol stacks 102 and 142. From the Transmitter (Tx) perspective, a User Payload (e.g. IP PDU) is processed by the convergence sublayer first, and then by the adaptation sublayer before being transported over a delivery access connection; from the Receiver (Rx) perspective, a packet (e.g., IP packet) received over a delivery connection is processed by the MX adaptation sublayer first, and then by the MX convergence sublayer (this is also shown by FIG. 21, which is discussed in more detail infra). The present disclosure provides mechanisms for dynamic traffic splitting at the convergence layer in MAMS frameworks. Existing e2e protocols, such as MPTCP, utilize multiple paths or RATs to achieve higher throughput. However, the existing e2e protocols are managed at the server, which is far away from the data splitting point. Therefore, existing e2e protocols may experience high feedback delay. Moreover, existing e2e protocols cannot access radio layer information.

As discussed in more detail infra, a cross-layer mechanism allows the convergence layer to dynamically split traffic over multiple links (e.g., links 105, 106, 107) based on radio layer information. Examples of the radio layer information used for the dynamic traffic splitting include Tx queue size and delay measurements. Additionally or alternatively, other types of radio information such as those discussed herein may be used. This allows the convergence layer to maximize the utilization of a default link (e.g., WiFi, mmWave, LTE, etc.) with a given delay/latency constraint.

New multi-path traffic splitting strategies are also discussed infra. These strategies include a relatively simple splitting strategy (Option 1) and splitting with rebalancing (Option 2). Additionally, new cross-layer messages from the radio layer to the convergence layer are provided, which indicate "On/Off", "Increase/Decrease/Keep", and "List of Rescheduled Packets". A new traffic splitting algorithm based on the "On/Off" cross-layer message, and a new traffic splitting algorithm based on the "Increase/Decrease/Keep" cross-layer message are discussed infra.

Figure 6:
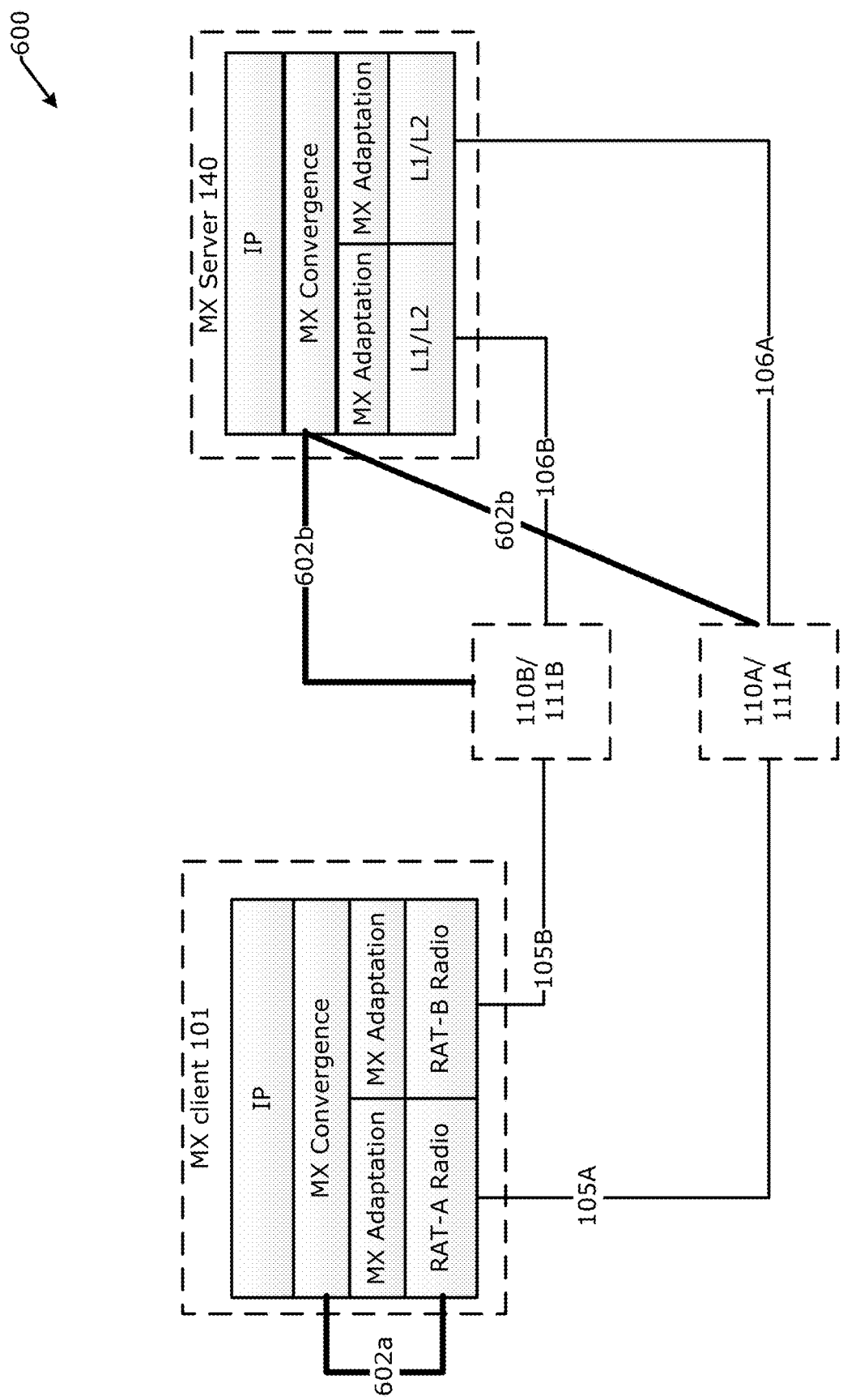
FIG. 6 depicts the MAMS E2E protocol stack with a cross-layer interface.

FIG. 6 shows a MAMS/MX network 600 including e2e protocol stack with cross-layer interface where like numbered elements are the same as discussed previously with respect to FIG. 1. Here, cross-layer interface 602 (including interfaces 602a and 602b) between the radio layer and the convergence layer. The cross-layer interface 602 includes an uplink (UL) cross-layer interface 602a and a downlink (DL) cross-layer interface 602b.

The UL cross-layer interface 602a operates internally at the multi-radio UE 101 between the MX convergence layer and the UE's 101 radio layer (including RAT-A Radio and RAT-B radio in FIG. 6). The DL cross-layer interface 602b operates between the (R)ANs 110 and MAMS server 140. With this new cross-layer interface 602, the radio layer can provide real-time radio information (e.g., Tx buffer, queue status, and/or other like measurements/data such as those discussed herein) so that the convergence layer can dynamically control traffic splitting and load balancing across multiple networks/paths 105, 106, 107.

Additionally, there are two multi-path traffic splitting options considered in the present disclosure. The first option (Option 1) is splitting without rebalancing and the second option (Option 2) is splitting with rebalancing. In Option 1 (splitting without rebalancing), the convergence layer will dynamically split traffic between two or more networks or access types (e.g., mmWave, LTE, etc.). However, any packet that has been scheduled to a link 105, 106, 107 cannot be rescheduled to another link 105, 106, 107 for rebalancing purposes. In Option 2 (splitting with rebalancing), the convergence layer will split the traffic the same way as option 1, but, the convergence layer is allowed to reschedule a packet that has been previously scheduled to a link 105, 106, 107 to another link 105, 106, 107.

Figure 7:
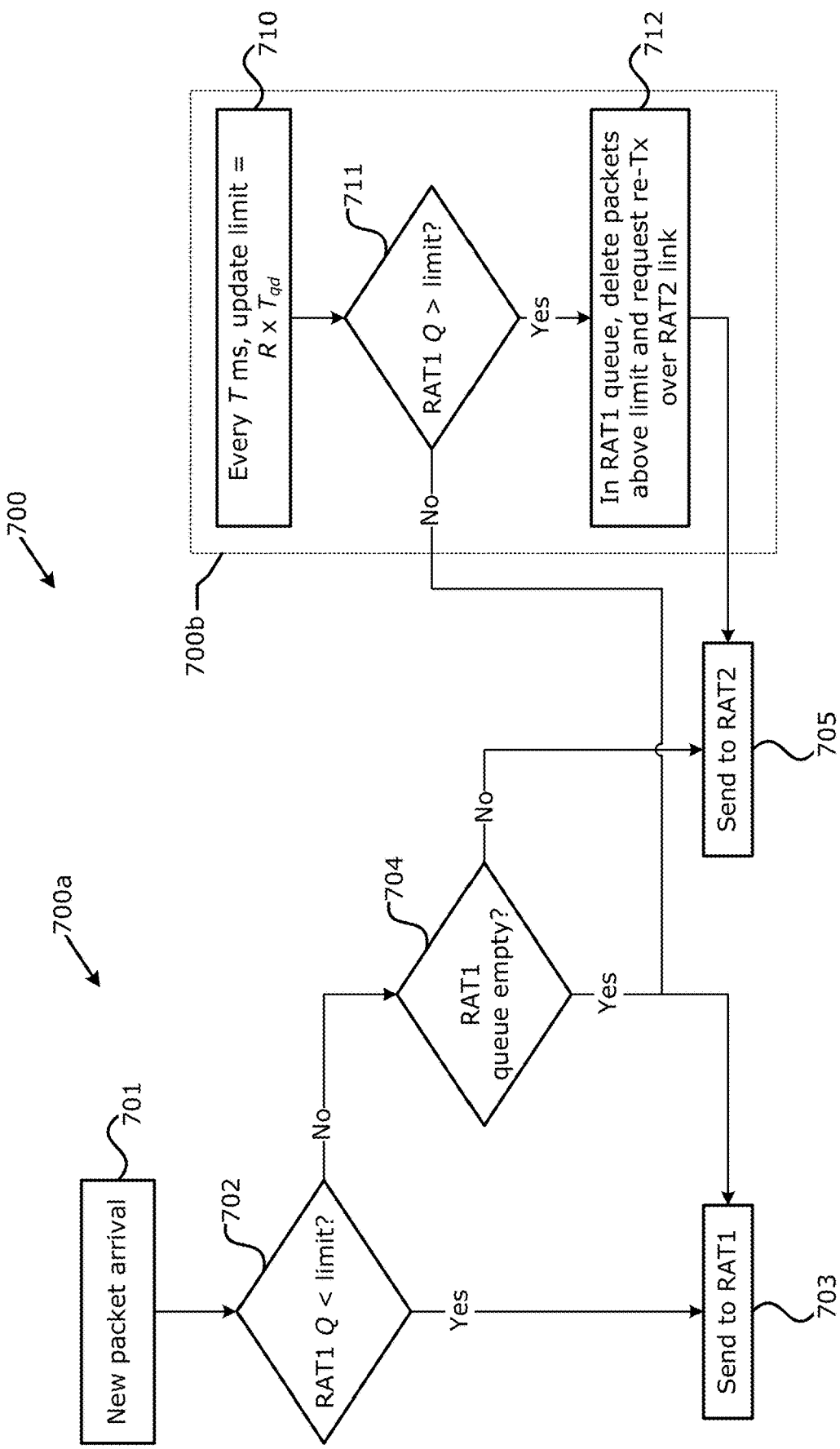
FIG. 7 depicts a traffic splitting algorithm based on "On/Off" cross-layer messages.
Figure 8:
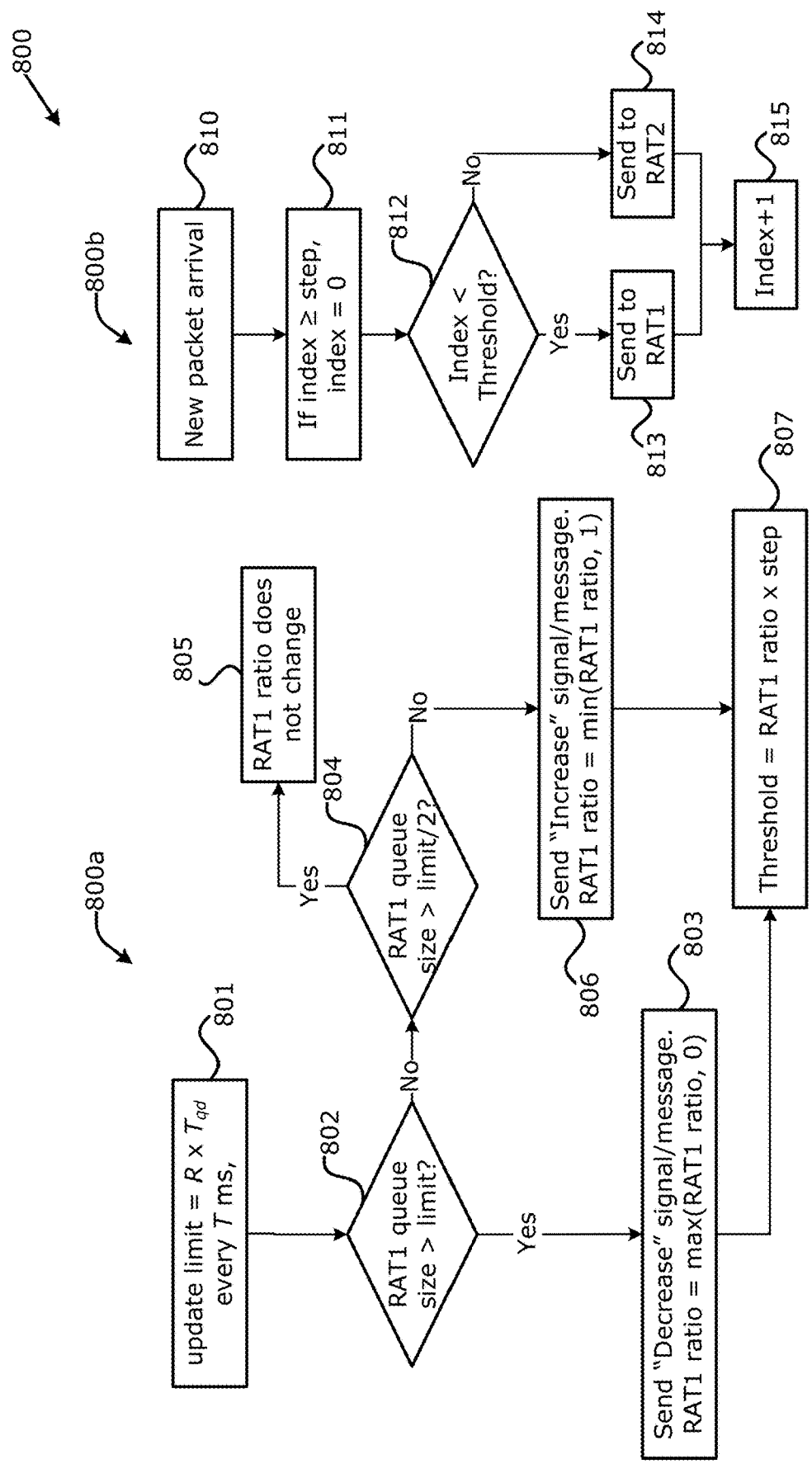
FIG. 8 depicts a traffic splitting algorithm based on "Increase/Decrease/Keep" cross-layer messages.

Additionally, there are two traffic splitting algorithms considered in the present disclosure. The first algorithm is based on a Boolean cross-layer message: "On/Off". Here, the radio layer sends an "On" message to the convergence layer when the Tx buffer of the default link (e.g., mmWave RAT) is below a predefined limit, and send out an "Off" message when its Tx buffer is above the limit. FIG. 7 shows a traffic splitting algorithm based on the "On/Off" cross-layer message. Another cross-layer message: "List of Rescheduled Packets" is provided herein to support the rebalancing operation in option 2. This cross-layer message provides a list of packets (sequence number) that will be rescheduled from one link 105, 106, 107 to another link 105, 106, 107. The second algorithm controls the ratio of the traffic scheduled to the default link, and uses another cross-layer message: "Increase/Decrease/Keep". FIG. 8 shows a traffic splitting algorithm based on the "Increase/Decrease/Keep" cross-layer message.

FIG. 7 depicts an example traffic splitting procedure 700 based on the Boolean (e.g., "On/Off") cross-layer message. In procedure 700, if the message is "On", the convergence layer sends all traffic to the default link 105 (denoted as a "RAT1 link"); otherwise, the convergence layer will send all traffic to a fallback link (denoted as "RAT2 link"). Procedure 700 also includes procedure 700a for option 1 and procedure 700b for option 2. As alluded to previously, the procedure 700 may be performed by the MX convergence layer in the client 101 or the server 140.

In the procedure 700, the convergence layer detects congestion if the queue size and/or a queuing delay is greater than a predefined or configured threshold. The convergence layer maintains the following parameters: Q is the transmission queue size measured after a packet is enqueued; $T_{qd}$ is the target queuing delay, which may be a determined or predefined value (e.g., 4 milliseconds (ms)), or may be based on the minimum delay of secondary (RAT2) link; and R is the estimated link throughput. The estimated link throughput R may be calculated or determined using, for example, the Proportional Integral Controller Enhanced (PIE) algorithm as discussed in Pan et al., "Proportional Integral Controller Enhanced (PIE): A Lightweight Control Scheme to Address the Buffer Bloat Problem", IETF RFC 8033 (February 2017) ("[PIE]"). Here, congestion is detected if Q>T×R. If R estimation is not available, the convergence layer maintains the following parameters: D is the delay of the first packet in the transmission queue (0 if the queue is empty); and $T_{qd}$ is the target queuing delay. Here, congestion is detected if $D > T_{qd}$.

Procedure 700a begins at operation 701 where a new packet arrives and is stored in a RAT1 transmission (Tx) queue. At operation 702, the convergence layer determines whether the RAT1 queue size Q is less than a predefined or predetermined limit (or threshold $T_{qd}$). If the RAT1 queue size Q is less than the limit (or threshold $T_{qd}$), then the convergence layer proceeds to operation 703 to send the packet over the RAT1 link. If the RAT1 queue size is not less than the limit (or threshold $T_{qd}$), then the convergence layer proceeds to operation 704 to determine whether the RAT1 queue is empty. If the RAT1 queue is empty, then the convergence layer proceeds to operation 705 to send the packet over the RAT2 link (or store the packet in the RAT2 Tx queue for transmission over the RAT2 link). If the RAT1 queue is not empty, then the convergence layer proceeds to operation 703 to send the packet over the RAT1 link.

Procedure 700b is for option 2, which is used for the transfer packets from RAT1 to RAT2 queue. Procedure 700b begins at operation 710 where the convergence layer updates the limit (or threshold $T_{qd}$) to be an estimated rate R multiplied by the target queuing delay $T_{qd}$ ever T ms. Here, T may be a predefined or configured amount of time. Then, the convergence layer proceeds to operation 711 to determine whether the RAT1 queue size Q is more than the limit (or threshold $T_{qd}$). If the RAT1 queue size Q is not more than the limit (or threshold $T_{qd}$), then the convergence layer proceeds to operation 703 to send the packet over the RAT1 link. If the RAT1 queue size Q is more than the limit (or threshold $T_{qd}$), then the convergence layer proceeds to operation 712 to delete packets in the RAT1 queue above the limit (or threshold $T_{qd}$) and request re-transmission over the RAT2 link, and then the convergence layer proceeds to operation 705 to send the packet over the RAT2 link (or store the packet in the RAT2 Tx queue for transmission over the RAT2 link). After performance of operations 703 or 705, procedure 700 may end or repeat as necessary.

FIG. 8 depicts an example traffic splitting procedure 800 based on the "Increase/Decrease/Keep" cross-layer message. The procedure 800a of procedure 800 may be performed by the radio layer and procedure 800b of procedure 800 may be performed by the convergence layer. The radio layer and the convergence layer maintain the same parameters as discussed previously with respect to FIG. 7.

The procedure 800 controls the ratio of the traffic scheduled to the default (RAT1) link versus the traffic scheduled to the secondary (RAT2) link. In other words, the traffic splitting ratio (TSR) represents the traffic distribution on each RAT when each access that is applicable for the traffic flow, such as the amount of traffic transmitted (or scheduled for transmission) over a RAT1 link to the amount of traffic transmitted (or scheduled for transmission) over a RAT2 link. The TSR can be implementation specific. For example, the TSR can be implemented to achieve a specific bandwidth value, Round-Trip Time (RTT), latency measurement, or some other like metric over the RAT1 link and/or RAT2 link.

Like the previous algorithm 700, the queue Limit=estimated rate×target delay is periodically estimated. The radio layer sends an "Increase" message when its Tx buffer of the default link is below some predetermined or configured threshold, which may be expressed as "a×Limit" where a is a scaling factor or some other predetermined or configured value (e.g., a=0.5). If the Tx buffer is above the limit, the radio layer will send out the "Decrease" signal. If the Tx buffer is in between these values, the radio layer will send out the "Keep" signal/message. In some implementations, the radio layer only sends out a cross-layer message if it is different from the previously sent cross-layer message (e.g., if a previous cross-layer message was a "Decrease" message, then the radio layer only sends out a cross-layer message when triggered to send a "Keep" or "Increase" message/signal). Once the convergence layer receives the message, it will adjust the TSR as follows:

Option #A (Linear Increase and Linear Decrease)
  a) Increase: increase (splitting) ratio by 1/step every T ms if ratio<1;
  b) Decrease: decrease ratio by 1/step every T ms if ratio>0;
  c) Keep: the ratio is not changed.
Option #B (Linear Increase and Exponential Decrease)
  a) Increase: increase ratio by 1/step every T ins if ratio<1;
  b) Decrease: decrease ratio by half every T ms if ratio>0;
  c) Keep: the ratio is not changed.

In options A and B, the "ratio" refers to the TSR for the primary (RAT1) link, and the interval T is the minimum amount of delay difference to trigger a TSR update. In some implementations, the interval T may be larger than the cross-layer interface/feedback delay. For example, in one implementation, T=feedback delay+1 ms. Additionally or alternatively, the default step size is also configurable (e.g., 4, 8, 16, 32). The "step" refers to a stage, phase, and/or discrete set of operations to be performed to determine a current value and/or proceed to a next point in determining a solution.

Still referring to FIG. 8, the procedure 800 includes procedure 800a performed by the radio layer. Before procedure 800a begins, the RAT1 ratio is initialized to 1 and updated during or after operation of procedure 800a. Procedure 800a begins at operation 801 where the radio layer updates the limit (or threshold $T_{qd}$) based on the R×$T_{qd}$, every T ms. At operation 802, the radio layer determines whether the RAT1 queue size Q is larger than the limit (or threshold $T_{qd}$). If the RAT1 queue size Q is larger than the limit (or threshold $T_{qd}$), then the radio layer proceeds to operation 803 to generate and send a "Decrease" signal/message, and set the RAT1 ratio to be 0 or the RAT1 ratio, whichever is greater (e.g., max(RAT1 ratio, 0) where the max( ) function returns the item with the highest value between the RAT1 ratio and 0). The radio layer performs the "decrease" according to option A or B discussed previously. Additionally or alternatively, the radio layer performs the decrease as follows: Option A (RAT1 ratio−1/step every T ms); Option B (RAT1 ratio×0.5 every T ms)

If at operation 802, the radio layer determines that the RAT1 queue size Q is not larger than the limit (or threshold $T_{qd}$), then the radio layer proceeds to operation 804 to determine whether the RAT1 queue size Q is larger than a scaled limit (or scaled threshold $T_{qd}$) such as for example, whether the RAT1 queue size Q is larger than half the limit (or half the threshold $T_{qd}$) (e.g., limit×0.5). If the RAT1 queue size Q is larger than the scaled limit (or scaled threshold $T_{qd}$), then the radio layer proceeds to operation 805 to generate and send a "Keep" signal/message, where the radio layer does not change the RAT1 ratio. If the RAT1 queue size Q is not larger than the scaled limit (or scaled threshold $T_{qd}$), then the radio layer proceeds to operation 806 to generate and send an "Increase" signal/message, and set the RAT1 ratio to be 1 or the RAT1 ratio, whichever is lower (e.g., min(RAT1 ratio, 1) where the min( ) function returns the item with the lowest value between the RAT1 ratio and 1). The radio layer performs the "increase" according to option A or B discussed previously. Additionally or alternatively, the radio layer performs the increase as follows: RAT1 ratio+1/step every T ms. After performing operation 803 or 806, the radio layer proceeds to operation 807 to set the threshold to be equal to the RAT1 ratio multiplied by the step value Still referring to FIG. 8, the procedure 800 includes procedure 800b performed by the convergence layer. Before procedure 800b begins, the index is initialized to 0 and updated during or after operation of procedure 800b. Procedure 800b begins at operation 810 where a new packet arrives and is stored in a Tx queue. At operation 811, the convergence layer sets the index to 0 if the index is greater than or equal to the step size/value. At operation 812, the convergence layer determines whether the index is lower than a preconfigured or predetermined threshold. If the index is lower than the threshold, the convergence layer proceeds to operation 813 to send the packet over the RAT1 link/interface. If the index is not lower than the threshold, the convergence layer proceeds to operation 814 to send the packet over the RAT2 link/interface. After performance of operation 813 or 814, the convergence layer proceeds to operation 815 to increment the index. After operation 815, the convergence layer may terminate the procedure 800b or procedure 800b may repeat as necessary.

Figure 9:
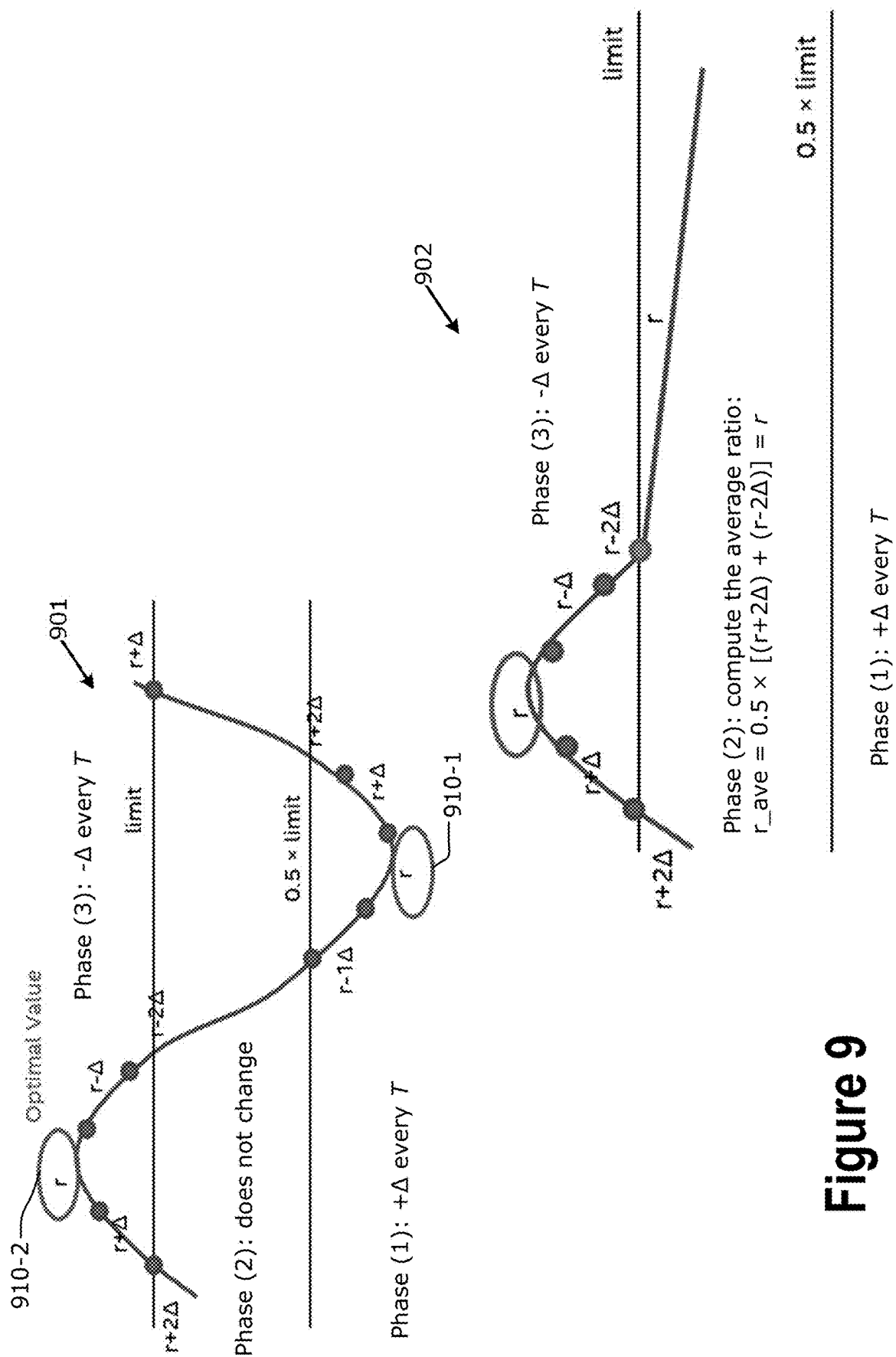
FIG. 9 depicts an example of traffic splitting ratio optimization.

A further enhancement to the traffic splitting procedure 800 includes, when receiving the "Keep" message, the radio layer or convergence layer sets the TSR to an average value r of the splitting ratio since the last "Increase" or "Decrease" message instead of the last value (e.g., r−2Δ) as illustrated in FIG. 9. FIG. 9 depicts an example of TSR optimization. In FIG. 9, the graph 901 shows an example of the issue where the optimal TSR cannot be found. Graph 901 shows an optimal value 910-1 of r, which is obtained in phase (1), and an optimal value 910-2 of r, which is obtained in phase (3). In phase (2), which is between phases (1) and (3), the value of r does not change.

In the enhancement as shown by graph 902, when the queue size enters phase (2), the TSR is changed to the average ratio r from the previous phase (1) or (3). In phase (2) the average TSR may be computed as follows:

$$r\_ave=0.5\times[(r+2\Delta)+(r-2\Delta)]=r$$

Figure 10:
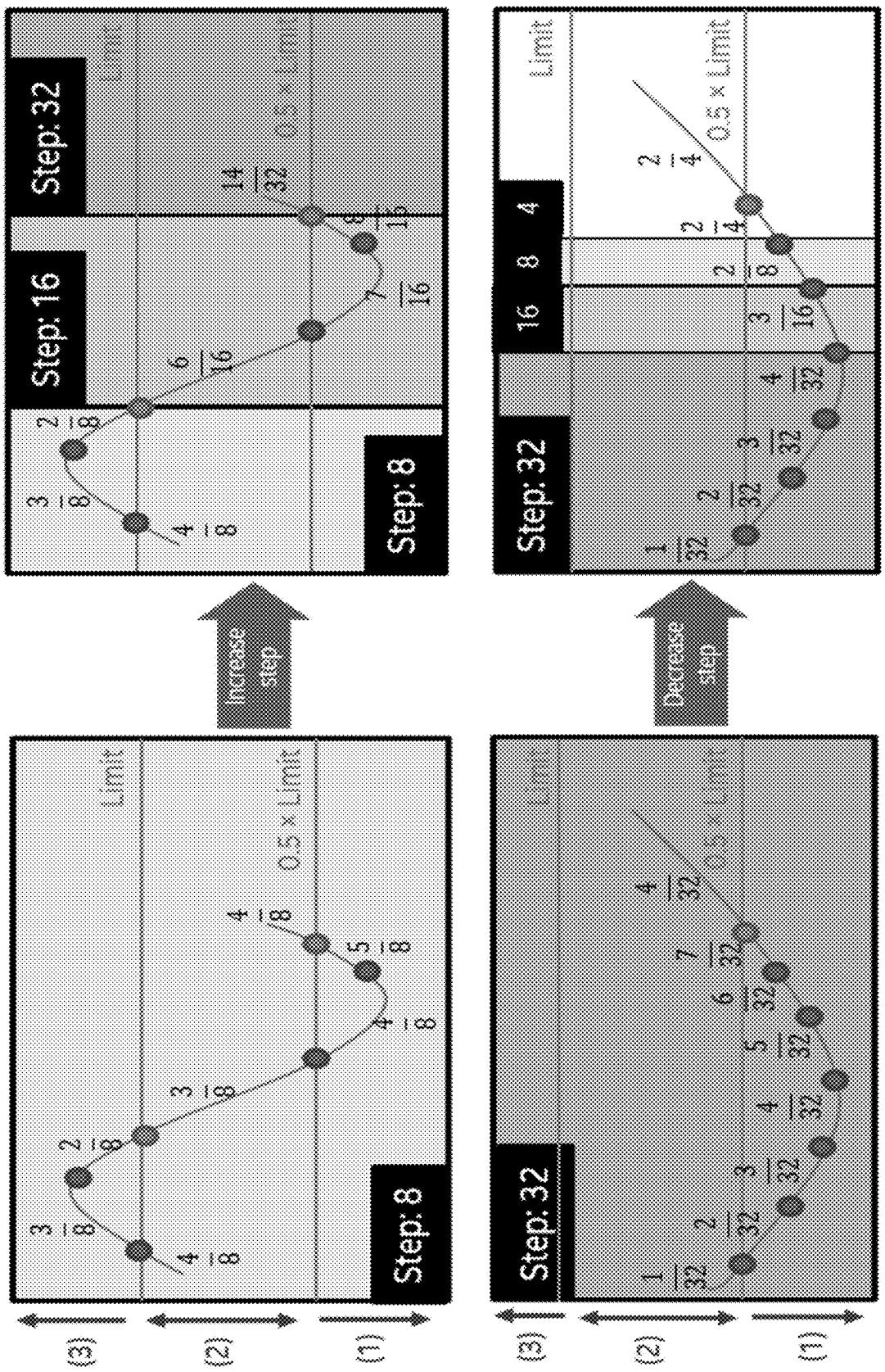
FIG. 10 depicts an example of traffic splitting ratio step-size adaptation.

Another enhancement to the traffic splitting procedure 800 includes adapting the step size within a range (e.g., [4, 8, 16, 32]) as follows. If it takes ≤N intervals to receive the "Keep" message after receiving the "Increase" or "Decrease" message, the step size is doubled; otherwise, the step size is reduced by half every interval. Here, N is a configurable number. In one example, N is configured to be 5, but other values may be used depending on use case, design choice, link measurements, device parameters, and/or other like parameters/criteria. FIG. 10 depicts an example of the TSR step adaptation where N=3.

In the examples of FIGS. 7 and 8, the RAT1 link may be an Extremely high frequency (EHF) link (e.g., a mmWave link, VLC link, or the like) and the (secondary) RAT2 link may be an LTE Uu-interface link. Additionally or alternatively, the RAT1 link may correspond to link 105a and the RAT2 link may correspond to link 105b.

1.2. Cross-Layer/Cross-RAT Traffic Splitting and Retransmission Mechanisms

In some situations, when a device (e.g., client 101) can simultaneously connect to multiple networks, it can be desirable to combine the multiple connections as seamlessly as possible to improve the QoE. To achieve this goal, a new convergence protocol (e.g., GMA as discussed in [GMA09]), to operate between the network layer and the link layer, as shown by FIG. 4.

In the present disclosure, cross-layer information can be exchanged between the link layer and the convergence layer (see e.g., FIG. 4). The cross-layer information is provided between these layers to improve responsiveness of multi-access traffic splitting and retransmission processes/procedures. Existing approaches, such as MPTCP, establish multiple TCP connections over multiple paths with different IP addresses. MPTCP only supports TCP traffic, not UDP. It can be only deployed at end nodes. Its traffic splitting algorithm does not have access to cross-layer information.

In some implementations, real-time cross-layer information is shared between the convergence layer (e.g., GMA elements/entities) and the link layer (e.g., including one or more RATs such as WiFi, 5G/NR, LTE, etc.) for faster traffic splitting and retransmission than existing approaches. These cross-layer traffic splitting and retransmission mechanisms reduce e2e latency and improve user experience.

As discussed in more detail infra, cross-layer signaling takes place between a GMA Rx (or radio device) and GMA Tx to increase, decrease, or maintain a TSR. A cross-layer traffic splitting algorithm is also provided, which is regulated by the size of a transmission queue and/or a queuing delay. Additionally or alternatively, cross-layer signaling takes place between a GMA Rx (or radio device) and GMA Tx for retransmission of one or more packets. The signaling takes place using cross-layer traffic retransmission algorithm, which may triggered by single or multiple delay thresholds.

Figure 11:
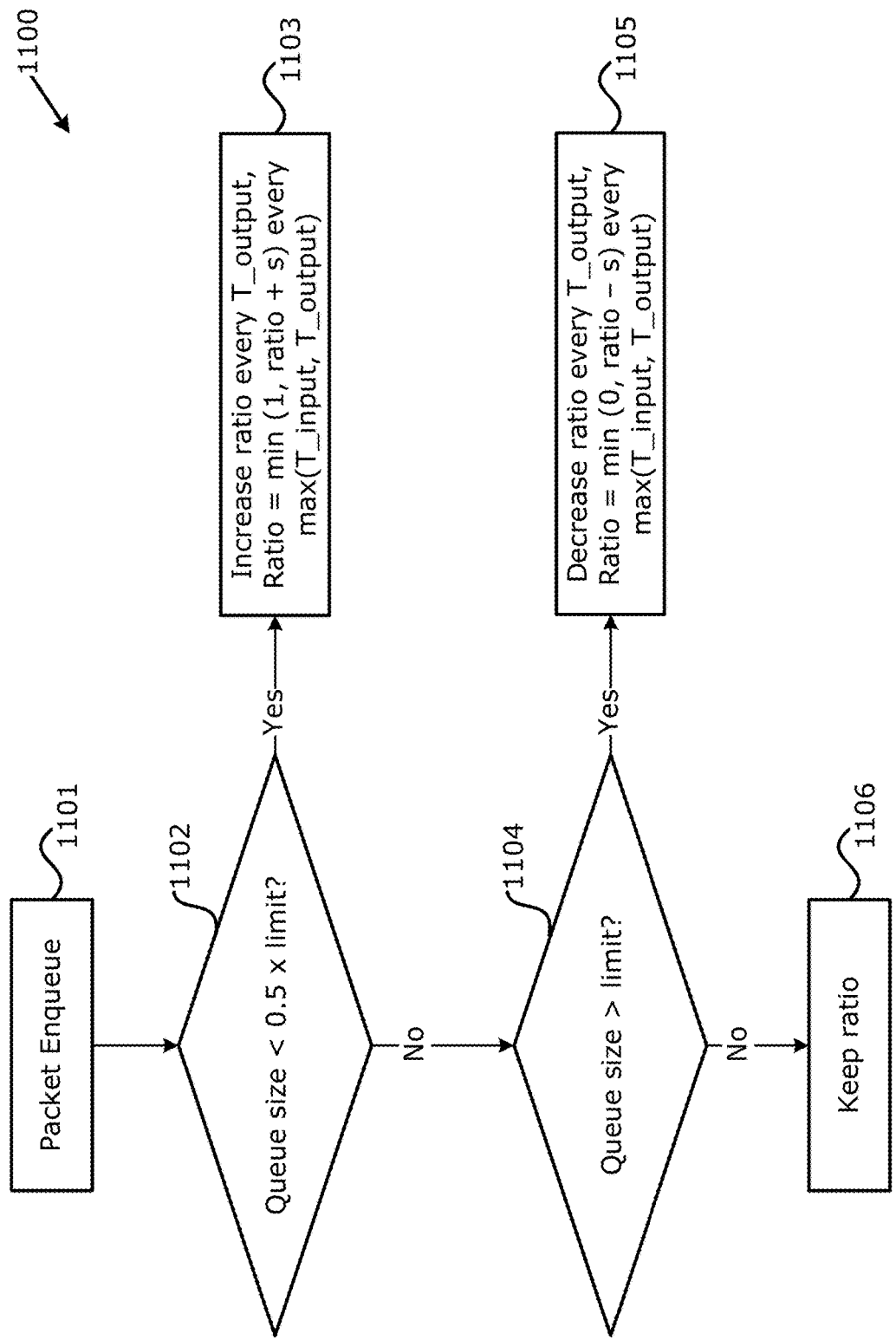
FIG. 11 depicts a queue size-based traffic splitting procedure.
Figure 12:
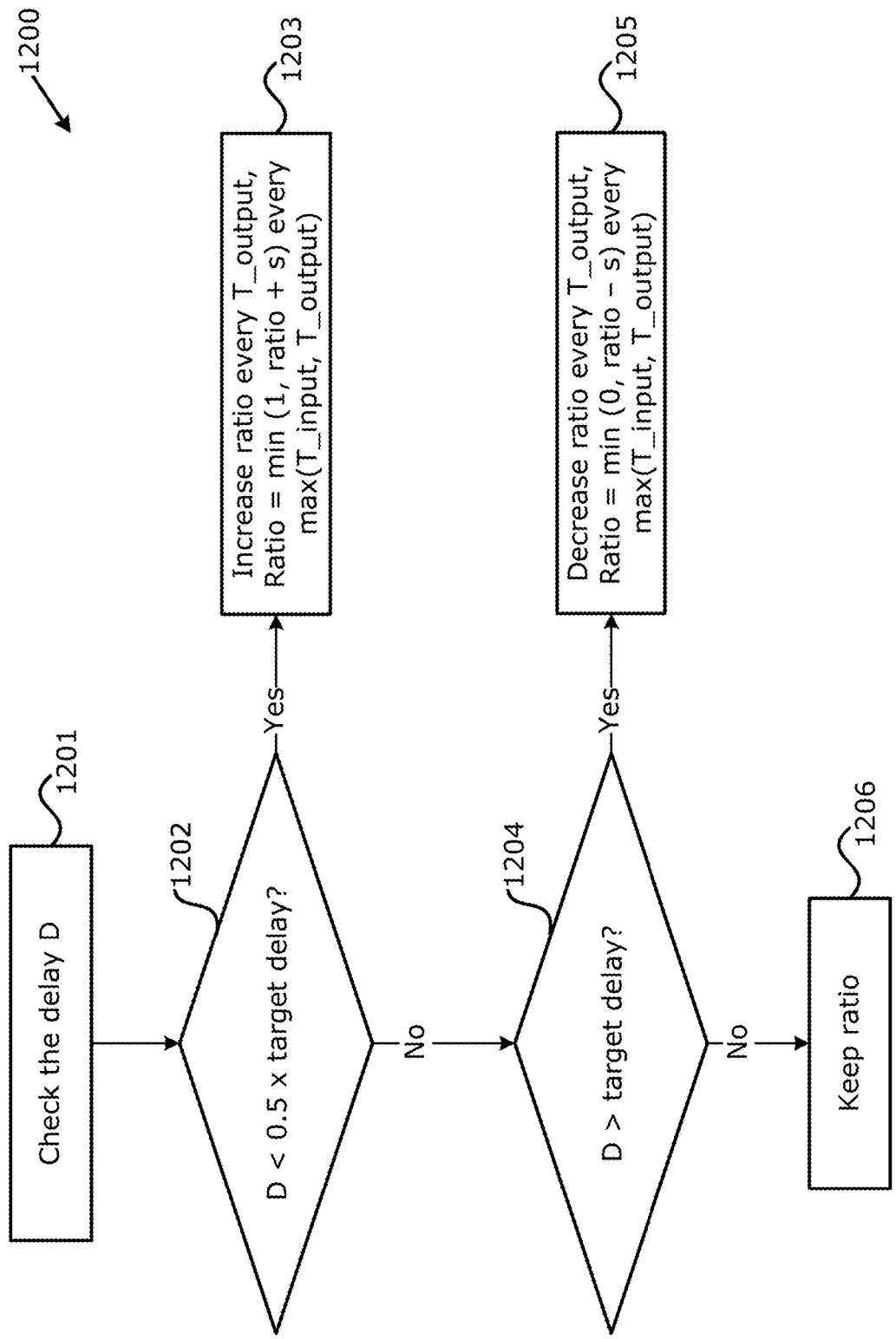
FIG. 12 depicts a delay-based traffic splitting process.

In the present disclosure, there are two cross-layer traffic splitting algorithms including a queue-size traffic splitting algorithm (see e.g., FIG. 11) and a delay-based traffic splitting algorithm (see e.g., FIG. 12). The present disclosure also includes cross-layer retransmission algorithm (see e.g., FIGS. 13 and 14).

FIG. 11 shows a queue size traffic splitting procedure 1100. In this example, a GMA Tx entity maintains the following parameters:

T_input: a minimal interval to observe stable input rate.
ratio: the TSR for the primary (RAT1) link.
s: the ratio value changed per update (e.g., 0.1).

Additionally, the GMA Rx (e.g., radio device) maintains the following parameters:

Q: the Tx queue size (TQS) measured after a packet is enqueued.
T: the target queuing delay.
R: the estimated link throughput and/or estimated rate (the PIE algorithm [PIE] may be used as default).
T_output: 2×average transmission time interval.

The queue size traffic splitting procedure 1100 may be performed by the convergence layer element/entity, and the ratio is initialized to 1 at the beginning of the process. Procedure 1100 begins at operation 1101 where a packet arrives and is added to a Tx queue. At operation 1102, the convergence layer determines whether the queue size Q is lower than half a TQS limit (or TQS threshold). Here, the TQS limit (or TQS threshold) is based on the estimated link throughput/rate R and the target queuing delay T (e.g., TQS Limit R×T). The target queuing delay T may be a predetermined or predefined amount of time (e.g., 4 ms), based on a link measurements or link criteria (e.g., the minimum delay of a secondary (RAT2) link), and/or based on some other parameter(s) or criteria.

If the queue size Q is lower than half the TQS limit (or TQS threshold), the convergence layer proceeds to operation 1103 to increase the ratio every T_output and/or set the ratio to be a lower value between "1" and the ratio plus the ratio value changed per update s. When the convergence layer is implemented by the GMA Rx, operation 1103 involves sending an "Increase ratio every T_output" message to the GMA Tx, and the convergence layer in the GMA Tx sets the ratio to be a lower value between "1" and the s. When the convergence layer is implemented by the GMA Tx, operation 1103 involves receiving an "Increase ratio every T_output" message from the GMA Rx, and the convergence layer sets the ratio to be a lower value between "1" and s. In other words, if Q<0.5×T×R (operation 1102), the GMA Rx sends an "Increase ratio every T_output" message to the GMA Tx (operation 1103), and the GMA Tx increases the ratio to min(1, ratio+s) every max(T_input, T_output) (operation 1103).

If the queue size Q is not lower than half the TQS limit (or TQS threshold), the convergence layer proceeds to operation 1104 to determine whether the queue size Q is larger than the TQS limit (or TQS threshold). If the queue size Q is larger than the TQS limit (or TQS threshold), the convergence layer proceeds to operation 1105 to decrease the ratio every T_output and/or set the ratio to be a maximum value between "0" and the ratio minus the ratio value changed per update s. When the convergence layer is implemented by the GMA Rx, operation 1105 involves sending a "Decrease ratio every T_output" message to the GMA Tx, and the convergence layer in the GMA Tx sets the ratio to be a higher value between "0" and s. When the convergence layer is implemented by the GMA Tx, operation 1105 involves receiving the "Decrease ratio every T_output" message from the GMA Rx, and the convergence layer sets the ratio to be the higher value between "0" and s. In other words, if Q>T×R (operation 1104), the GMA Rx sends an "Decrease ratio every T_output" message to the GMA Tx (operation 1105), and the GMA Tx increases the ratio to min(1, ratio+s) every max(T_input, T_output) (operation 1105).

If at operation 1104 the queue size Q is not larger than the TQS limit (or TQS threshold), the convergence layer proceeds to operation 1106 to maintain (keep) the ratio as-is. When the convergence layer is implemented by the GMA Rx, operation 1106 involves sending a "Keep ratio" message to the GMA Tx, the GMA Tx changes the ratio to an average ratio from the previous increase/decrease phase (e.g., as discussed previously with respect to FIG. 9). When the convergence layer is implemented by the GMA Tx, operation 1106 involves receiving the "Keep ratio" message to the GMA Rx, the convergence layer changes the ratio to the average ratio from the previous increase/decrease phase (e.g., as discussed previously with respect to FIG. 9).

FIG. 12 depicts a delay-based traffic splitting process 1200. In this example, a GMA Tx entity maintains the following parameters:

T_input: a minimal interval to observe stable input rate.
ratio: the TSR for the primary (RAT1) link.
s: the ratio value changed per update (e.g., 0.1).
Additionally, the GMA Rx (e.g., radio device) maintains the following parameters:
D: the queuing delay of a first packet in the Tx queue (when the queue is empty, D=0).
T: the target queuing delay.
T_output: 2×average transmission time interval.

The delay-based traffic splitting process 1200 may be performed by the convergence layer element/entity, and the ratio is initialized to 1 at the beginning of the process. Process 1200 begins at operation 1201 where the convergence layer checks the delay D; in one example, the convergence layer checks the Head-of-Line (HOL) delay D. At operation 1202, the convergence layer determines whether the delay D is lower than half a target delay T. Here, the target queuing delay T may be a predetermined or predefined amount of time (e.g., 4 ms), based on a link measurements or link criteria (e.g., the minimum delay of a secondary (RAT2) link), and/or based on some other parameter(s) or criteria.

If the delay D is lower than half the target delay T, the convergence layer proceeds to operation 1203 to increase the ratio every T_output and/or set the ratio to be a lower value between "1" and the ratio plus the ratio value changed per update s. When the convergence layer is implemented by the GMA Rx, operation 1203 involves sending an "Increase ratio every T_output" message to the GMA Tx, and the convergence layer in the GMA Tx sets the ratio to be a lower value between "1" and the s. When the convergence layer is implemented by the GMA Tx, operation 1203 involves receiving an "Increase ratio every T_output" message from the GMA Rx, and the convergence layer sets the ratio to be a lower value between "1" and s. In other words, if D<0.5×T (operation 1202), the GMA Rx sends an "Increase ratio every T_output" message to the GMA Tx (operation 1203), and the GMA Tx increases the ratio to min(1, ratio+s) every max(T_input, T_output) (operation 1203).

If the delay D is not lower than half the target delay T, the convergence layer proceeds to operation 1204 to determine whether the delay D is larger than the target delay T. If the delay D is larger than the target delay T, the convergence layer proceeds to operation 1205 to decrease the ratio every T_output and/or set the ratio to be a maximum value between "0" and the ratio minus the ratio value changed per update s. When the convergence layer is implemented by the GMA Rx, operation 1205 involves sending a "Decrease ratio every T_output" message to the GMA Tx, and the convergence layer in the GMA Tx sets the ratio to be a higher value between "0" and s. When the convergence layer is implemented by the GMA Tx, operation 1205 involves receiving the "Decrease ratio every T_output" message from the GMA Rx, and the convergence layer sets the ratio to be the higher value between "0" and s. In other words, if D>T (operation 1204), the GMA Rx sends an "Decrease ratio every T_output" message to the GMA Tx (operation 1205), and the GMA Tx increases the ratio to min(1, ratio+s) every max(T_input, T_output) (operation 1205).

If at operation 1204 the delay D is not larger than the target delay T, the convergence layer proceeds to operation 1206 to maintain (keep) the ratio as-is. When the convergence layer is implemented by the GMA Rx, operation 1206 involves sending a "Keep ratio" message to the GMA Tx, the GMA Tx changes the ratio to an average ratio from the previous increase/decrease phase (e.g., as discussed previously with respect to FIG. 9). When the convergence layer is implemented by the GMA Tx, operation 1206 involves receiving the "Keep ratio" message to the GMA Rx, the convergence layer changes the ratio to the average ratio from the previous increase/decrease phase (e.g., as discussed previously with respect to FIG. 9).

The processes 1100 and 1200 may be enhanced to include a step-size adaptation where the step size is adapted within a range (e.g., [4, 8, 16, 32]) as follows. If it takes ≤N intervals to receive the "Keep ratio" message after receiving the "Increase" or "Decrease" message, the step size is doubled; otherwise, the step size is reduced by half every interval. Here, N is a configurable number (e.g., N=5; N=3; and/or N is set/configured based on use case, design choice, link measurements, device parameters, and/or other like parameters/criteria).

Additionally or alternatively, the processes 1100 and 1200 may be enhanced to include a prohibit message timer. In this enhancement, two consecutive ratio update massages are separated using a prohibit message timer, which is set to some suitable time value (e.g., 10 ms). Here, after a ratio update message is sent at operation 1103/1203 or 1105/1205, the prohibit message timer is started and any new ratio update messages generated before the prohibit timer expires are dropped.

In addition to the traffic splitting algorithms, the present disclosure includes cross-layer retransmission algorithms, including delayed-based retransmission, single-threshold trigger retransmission, and multi-threshold trigger retransmission algorithms.

Delay-based retransmission. For the packets send over the first link (e.g., RAT1 link), the GMA Tx keeps the most recent M number of packets (e.g., M=500) in a queue in case the GMA Rx requests for retransmissions. This may be referred to as a drop front queue of size M. The GMA Rx may request for retransmissions by sending a list of GMA sequence numbers to the GMA Tx, which is divided into multiple duplets that represent the starting and ending of sequence blocks. For example, to request retransmission of packets with sequence numbers #11, #12, #13, #14, #16, #18, #19, the following list is sent: "[11, 14, 16, 16, 18, 19]". After receiving the retransmission list, any packet that can be found in the queue is removed from the queue and retransmitted over a second link (e.g., RAT2 link). Additionally, the GMA Rx can select one of the following single-threshold trigger retransmission algorithm or multi-threshold trigger retransmission algorithm to trigger the retransmission of the packets.

The single-threshold trigger retransmission algorithm includes a preconfigured threshold C and the target queuing delay T discussed previously. If any packet in the Tx or re-Tx queue stays longer than C×T (e.g., 2×T), the GMA Rx (or the RAT circuitry associated with the first link (e.g., RAT1 circuitry)) will report its GMA sequence to the GMA Tx, and the GMA Tx will then retransmit it over a second link (e.g., RAT2 link).

The multi-threshold trigger retransmission algorithm includes the following parameters: C(i) which is the i-th threshold, P(i) which is the percentage of packets that stays longer than C(i)×T and will be retransmitted, and L is the number of thresholds. When P(L)=100%, the single-threshold trigger mechanism is a special case (L=1) of the multi-threshold mechanism. In one example implementation, L=2 and P(1)=50%.

The GMA Rx (or RAT circuitry) keeps monitoring the queueing delay for all packets in the Tx or the re-Tx queue. If a packet has its queuing delay larger than a first threshold $T_1$ but smaller than a second threshold $T_2$ (where $T_1=C(1)\times T$ and $T_2=C(2)\times T$), it is called an "expired" packet, where the parameter N indicates the total number of expired packets. The multi-threshold trigger retransmission scheme runs periodically according to a trigger interval, as follows:

Step 1: Initialize N to 0.
Step 2: For every packet in the queue, do the following:
(a) if a packet has delay higher than $T_1$ but lower than $T_2$, update N=N+1 and tag the packet as "expired"; (b) if a packet has delay higher than $T_2$, retransmit that packet immediately if it has not been retransmitted yet.
Step 3: Retransmit the first half (=N/2) of all "expired" packets based on the order of their sequence number, excluding the ones that have already been retransmitted in a previous interval.

Figure 13:
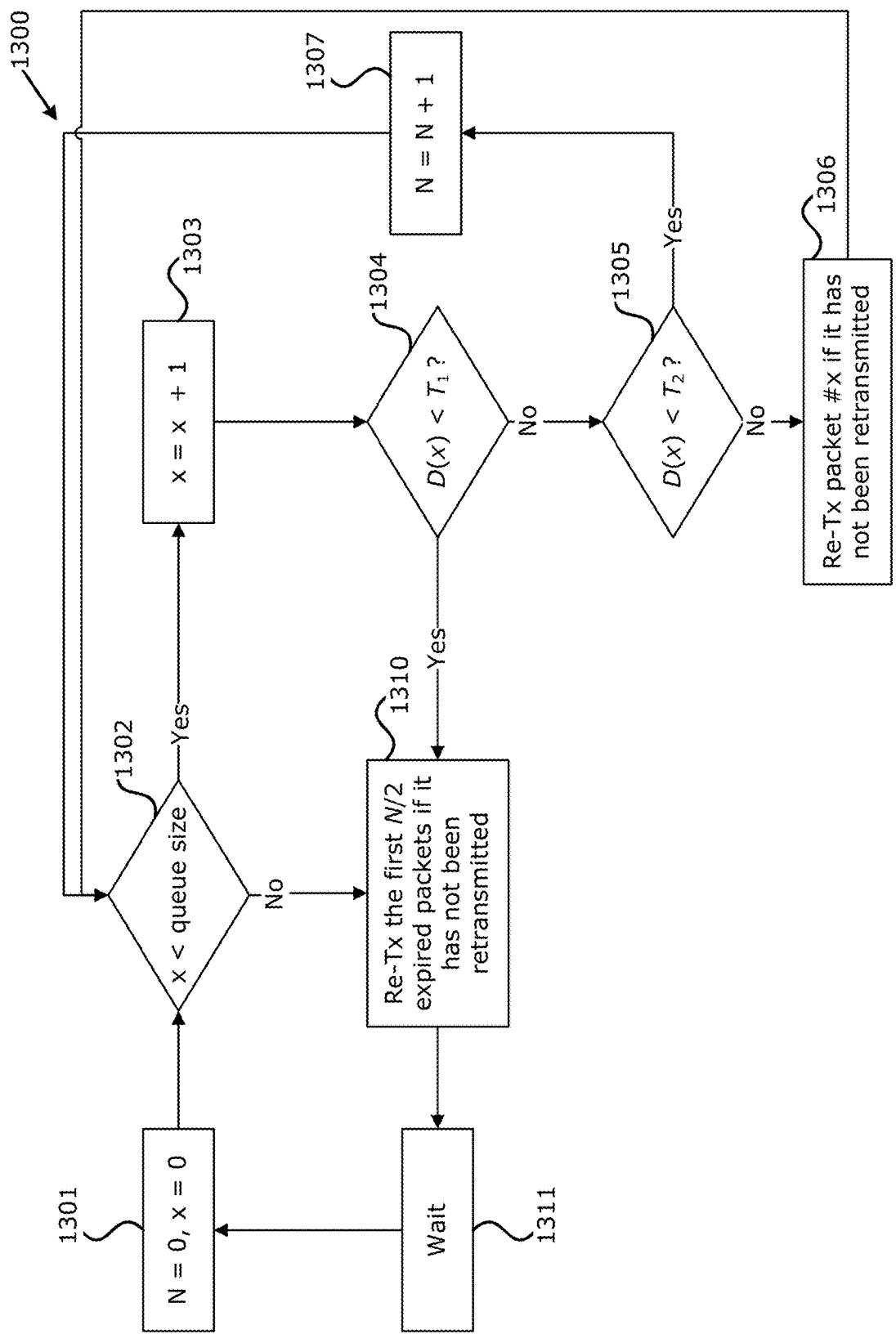
FIG. 13 depicts a two-threshold retransmission procedure.

FIG. 13 depicts a multi-threshold retransmission process 1300, where D(x) is the queuing delay of the x-th packet in the queue. Process 1300 begins at operation 1301 where N and x are set to 0. At operation 1302, the GMA Rx (or radio device) determines whether x is lower than the queue size. If x is lower than the queue size, then the GMA Rx (or radio device) proceeds to operation 1303 to increment x, and then proceeds to operation 1304 to determine if D(x) is less than $T_1$.

If x is not lower than the queue size at operation 1302, then the GMA Rx (or radio device) proceeds to operation 1319 to retransmit the first N/2 expired packets if it/they has/have not been retransmitted, waits for a preconfigured or predetermined period of time (e.g., 1 ms) at operation 1311 before returning to operation 1301.

If D(x) is less than $T_1$ at operation 1304, then the GMA Rx (or radio device) proceeds to operation 1310. If D(x) is not less than $T_1$ at operation 1304, then the GMA Rx (or radio device) proceeds to operation 1305 to determine whether D(x) is not less than $T_2$. If D(x) is not less than $T_2$ at operation 1305, then the GMA Rx (or radio device) proceeds to operation 1306 to retransmit packet x if it has not been retransmitted, and then proceeds back to operation 1301. If D(x) is less than $T_2$ at operation 1305, then the GMA Rx (or radio device) proceeds to operation 1307 to increment N, and then proceeds back to operation 1301.

Figure 14:
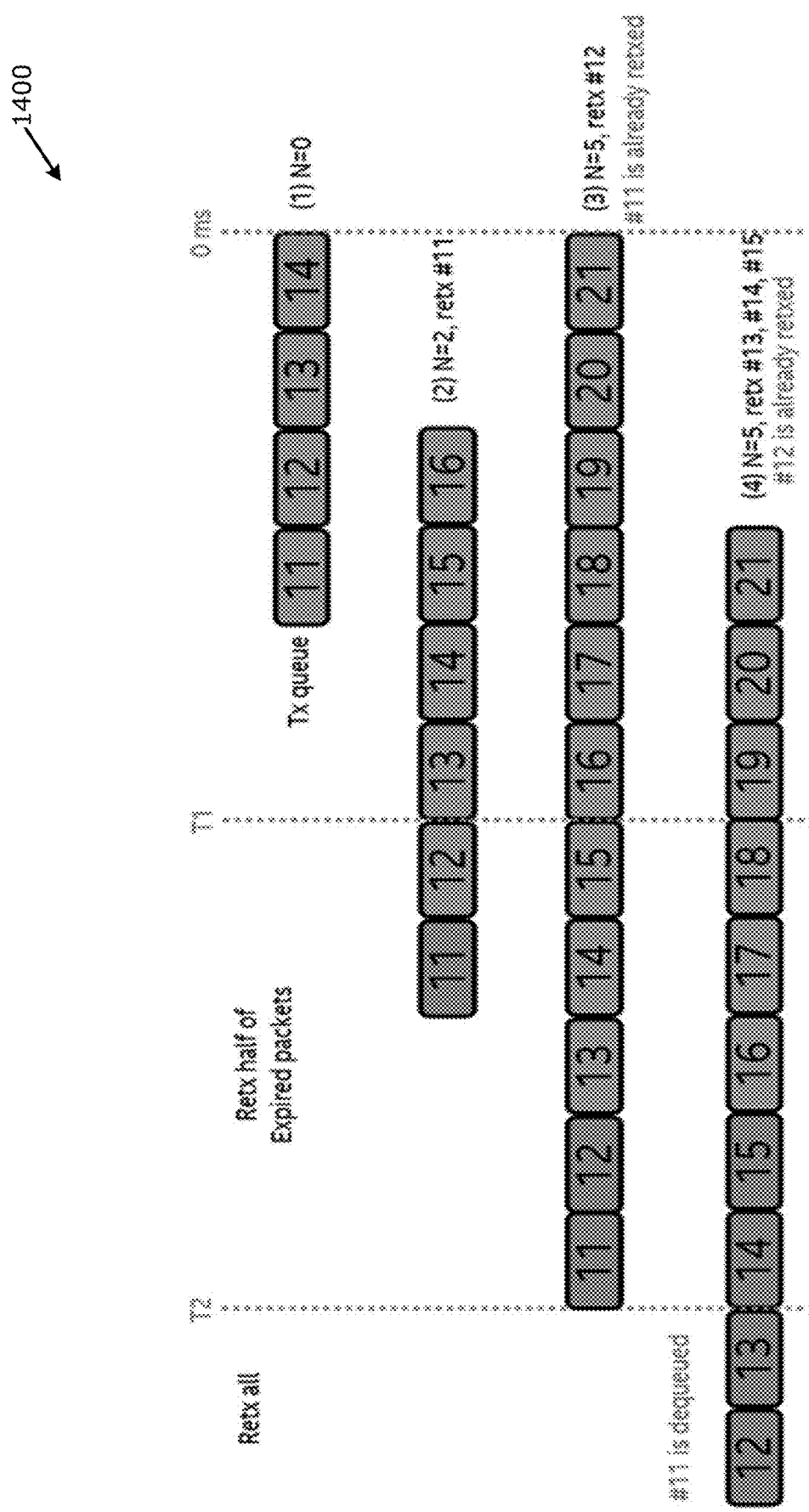
FIG. 14 depicts an example of two-threshold retransmission.

An example of how the multi-transmission process operated is shown by FIG. 14. The main benefit of multi-level trigger retransmission is to reduce the number of simultaneously retransmitted packets and avoid congestion at the second link (e.g., RAT2 link).

The trigger interval may be a predetermined or preconfigured value (e.g., every 1 ms). In some implementations, the trigger interval is a constant value such as 1 ms. In some implementations, in order to reduce queue inspection overhead, the trigger interval may be set to max($T_1$−D(1), 1 ms), where D(1) is the delay of first packet in the queue.

1.3. Multi-Link Packet Reordering Mechanisms

Referring back to FIG. 1, the MX convergence (sub)layer operates on top of the MX adaptation (sub)layer in the protocol stacks 102 and 142. The present disclosure provides new mechanisms to support dynamic traffic splitting/steering at the convergence (sub)layer in MAMS (see e.g., FIGS. 1-5). Existing solutions include various are end-to-end (e2e) protocols, such as multi-path TCP (MPTCP), to utilize multiple path or RATs to achieve higher throughput. However, these e2e protocol solutions are managed at the server, which is far away from the data splitting point, and therefore, result in relatively high feedback delay. Moreover, the existing solutions cannot access the radio layer information.

The present disclosure provides dynamic traffic splitting for different optimization targets such as reducing e2e delay (e.g., "low delay") or minimizing cellular (e.g., 5G/NR, LTE, etc.) usage (e.g., "low cost"). The present disclosure also provides GMA-based traffic splitting that operate in the convergence layer of the MAMS framework (see e.g., FIGS. 1-5). The GMA-based traffic splitting mechanisms are transparent to lower layers and do not require any information from those layers. Two multi-path traffic splitting options are provided including a low delay and low cost options.

The traffic splitting and reordering mechanisms discussed herein can be implemented in Edge computing frameworks including the MEC framework discussed herein. One implementation involves the Smart-Edge/MEC platform provided by Intel®.

1.3.1. Multi-Link Reordering

A multi-link reordering algorithm for MAMS uses flow sequence numbers and delivery link IDs of each packet. The algorithm can be further enhanced if the MX/GMA Rx knows the number of dropped packets for each link 105.

A device (e.g., the client 101 and/or server 140) deploys the reordering algorithm for an access network connection 105 (e.g., a wireless radio link) to guarantee in-order delivery. In one example, the reordering algorithm may be deployed at the RLC UM layer in LTE and/or 5G RATs. The MX/GMA Rx holds out-of-order packets for a period of time in case the missing packets arrive in the future. If the missing packets are detected/declared as dropped or a reordering timer expires, the MX/GMA Rx skips these missing packets and delivers the following in-order packets to higher layers.

At the MX convergence sublayer of an MX Rx (e.g., client 101 in the example of FIG. 15), if a packet #N is missing and all links already receive a packet with sequence number larger than N, then packet #N must be dropped in one of these links because radio links deliver packets in-order. Here "#N" may be the sequence number of the packet #N. Consequently, the MX Rx can skip packet #N and forward the following in-order packets.

Figure 15:
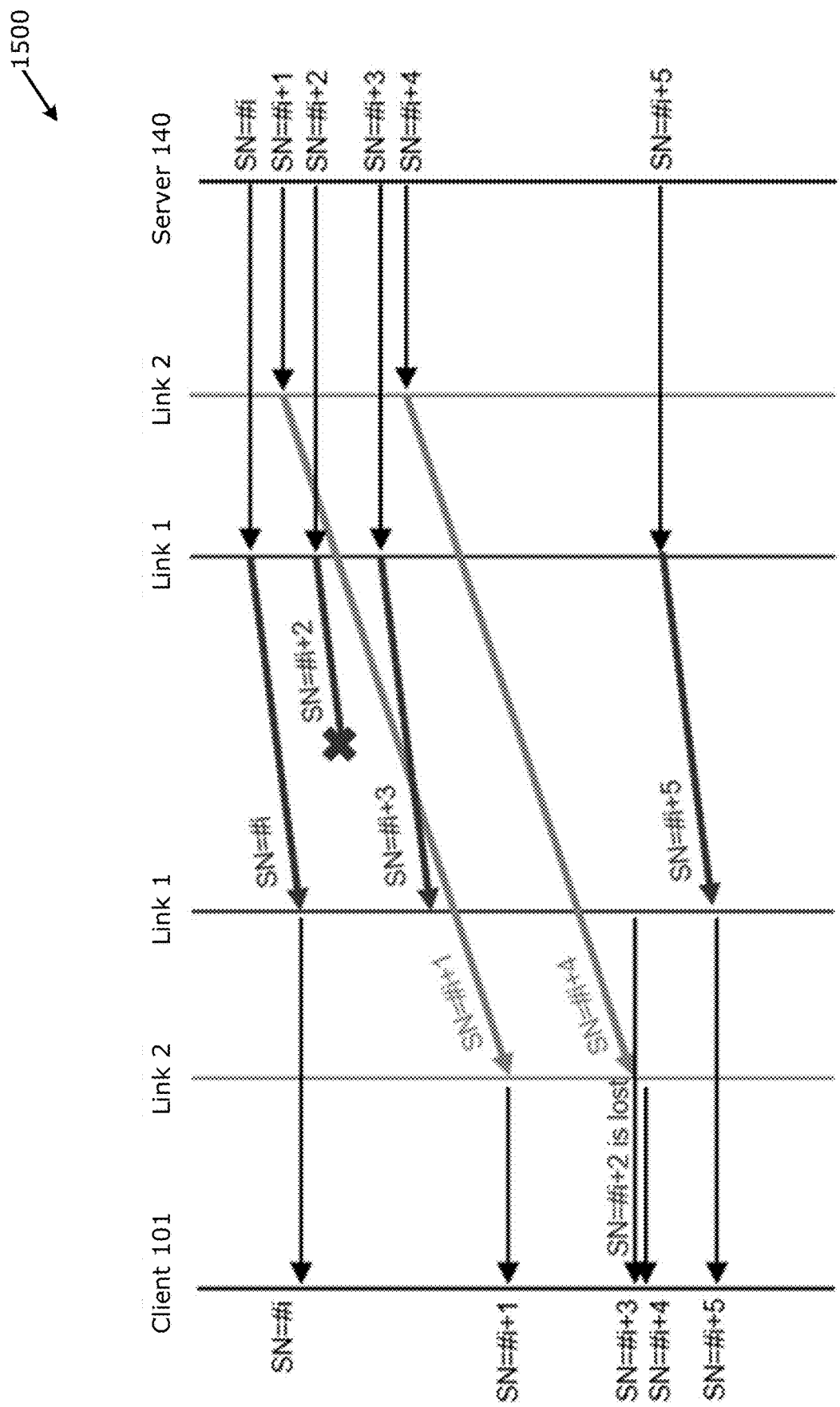
FIGS. 15 and 16 depict packet reordering procedures.
Figure 16:
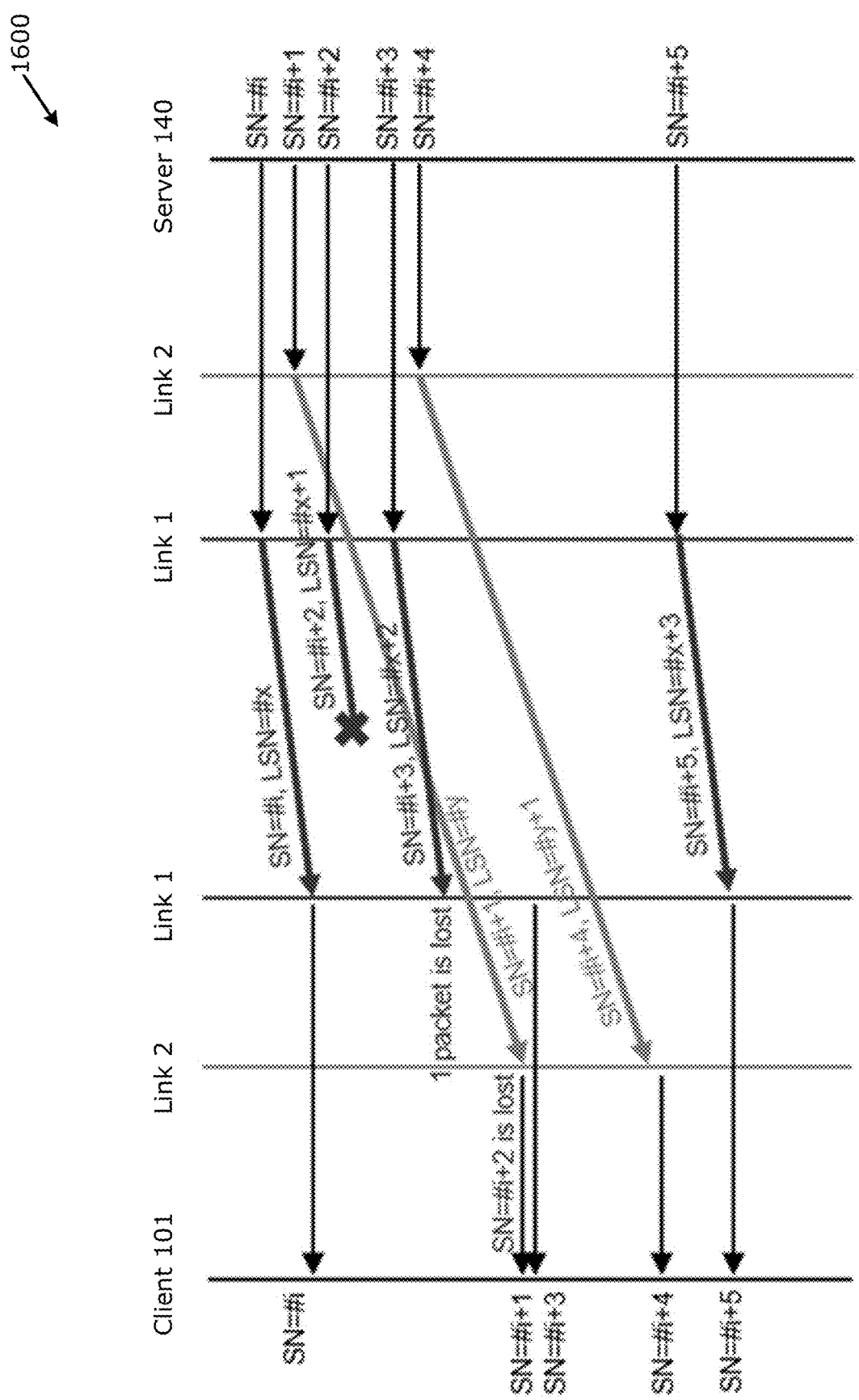

FIG. 15 illustrates an example two-link reordering procedure 1500 using flow sequence number (SN) only. FIG. 16 illustrates an example two-link reordering procedure 1600 using flow sequence number (SN) and local delivery sequence number (LSN).

In FIG. 15, when packet #i+3 is received over link 1, packets #i+1 and #i+2 are missing. These packets may have already been dropped in link 1 or are still being transmitted over link 2. After receiving the in-order packet #i+1 over link 2, it is delivered immediately (e.g., to higher layers). Once packet #i+4 arrives at link 2, the MX Rx confirms packet #i+2 is lost and forwards the following in-order packets starting from #i+3 (e.g., following from packet #i or packet #i+1). In practice, the MX Rx knows the delivery link ID of every received packet, either by checking the connection ID field in the GMA header (see e.g., FIG. 26 and [GMA09]) or by associating each link 105 with a dedicated receiving socket or port number.

Moreover, if the MX convergence sublayer can detect packet loss on each delivery link, the reordering delay can be further reduced. For example, the MX Tx may add a local delivery sequence number (LSN) in the GMA header (see e.g., FIG. 26), and the number of lost packets can be obtained directly by comparing LSN of two consecutive packets received in the same link. For example, in FIG. 16, when packet #i+3 is received, the LSNs of the last two received packets are #x and #x+2, respectively. The number of lost packets equals (x+2)−x−1=1. As a result, one of the two missing packets (#i+1, #i+2) is lost in link 1. When #i+1 is received, the MX Rx confirms packet #i+2 is lost and forwards in-order packets starting from #i+3 (e.g., to higher layers for further processing).

The GMA may include a new field to include the LSN (e.g., LSN Field). Additionally or alternatively, the LSN may be the Delivery SN in the GMA header or GMA trailer (see e.g., FIG. 26). The Delivery SN is an auto-incremented integer that indicates the GMA PDU transmission order on a delivery connection.

1.3.2. Multi-Link Reordering Using Only the Packet Sequence Number

The reordering algorithm using on the packet SN involves the MX Rx releasing in-order packets, and the out of order packets with flow SNs up to min(Max-SN(1), Max-SN(2), . . . , Max-SN(K)), where Max-SN(k) refers to the maximum flow SN of a packet received over link k, and K is the number of links.

For two link scenarios, the MX Rx maintains the following parameters:

Next-SN: the next in-order (Flow) sequence number
Last-SN: the (Flow) sequence number of the last received packet
Last-Queue-SN: the (Flow) sequence number of the last packet in the reordering queue
x: the delivery connection ID of the packets in the reordering queue
y: the delivery connection ID of the last received packet.
T: the reordering timeout value (e.g., 100 ms)
Q: the reordering queue size (e.g., 1000 packets/PDUs)

Additionally, the MX Rx also maintains one or more reordering queues or buffers to store packets for potential reordering purposes. These queues/buffers may be existing queues/buffers in the layer in which the algorithm is implemented, or the queues/buffers may be a separate and/or new queues/buffers added to such a layer. In one example, the MX Rx may implement a queue/buffer for each access network 110 or each access network connection 105, 106 over which it is receiving packets. The size of the queue Q may be based on the desired optimization. For example, the queue size Q may be 20 packets for flows requiring high reliability and the queue size Q may be 1000 packets for flows/applications requiring high throughput.

Further, the MX Rx may implement a suitable software and/or hardware timer to be used as a reordering timer for purposes of releasing stored/queued/buffered packets as discussed herein. Additionally or alternatively, the MX Rx may load the timer with the reordering timeout value T. The reordering timeout value T may be based on the desired optimization. For example, the reordering timeout value T may be 1 for flows requiring high reliability and reordering timeout value T may be 1000 ms for flows/applications requiring high throughput.

The reordering algorithm may operate as follows:
if the reordering timer timeouts (expires) or reordering queue is full, release all packets in the queue and update Next-SN to Last-Queue-SN+1
if Last-SN<Next-SN, drop the (unexpected) last received packet
else if Last-SN==Next-SN
   release the last received packet and all in-order packets in reordering queue, and update Next-SN accordingly
   if reordering queue is not empty, restart reordering timer
else if Last-SN>Next-SN
   if reordering queue is empty
     add the last received packet to reordering queue
     start reordering timer
   else if x==y,
     add the last received packet to the tail of reordering queue
   else,
     if Last-SN<Last-Queue-SN
       release packets in reordering queue with sequence smaller than Last-SN and the last received packet, update Next-SN to Last-SN+1
       release all in-order packets in reordering queue, and update Next-SN accordingly
       restart reordering timer if reordering queue is not empty
     else if Last-SN==Last-Queue-SN+1
       release all packets in reordering queue and the last received packet, update Next-SN to Last-SN+1
     else if Last-SN>Last-Queue-SN+1
       release all packets in reordering queue and update Next-SN to Last-Queue-SN+1
       put the last received packet to reordering queue
       restart reordering timer 1.3.3. Multi-Link Reordering Using the Packet Sequence Number and Local Delivery Sequence Number The reordering algorithm using on the packet SN and LSN involves the MX Rx releasing in-order packets, and the out-of-order packets with flow sequence number up to min (Max-SN(1), Max-SN(2), . . . , Max-SN(K)), where Max-SN(k) stands for maximum flow sequence (e.g., flow SN or LSN) of packet received from link k, and K is the number of links.

A packet (#A) is "in-order" under any of the following conditions:

$$s == \text{Next-SN} \tag{1}$$

$$\text{Wait}(s) = s - s^* - (\text{Lsn}(s) - \text{Lsn}(s^*)) - m == 0 \tag{2}$$

In the above conditions, s is the flow sequence number of packet #A; s* indicates the flow sequence number of the packet received (from the same link) before packet #A; Lsn(•) indicates the LSN of a packet, and the input parameter is the flow sequence number of the packet; Wait(s) is the number of packets that must be received successfully from the other link before a packet in the reordering queue can be considered as "in-order" and released; and m is the number of packets received successfully from the other link and with SN in the range of (s*, s).

Q: the reordering queue size (e.g., 1000).

The reordering algorithm using SN and LSN may operate as shown by the following table:

---

Packet with sequence number s is "in-order" if s == Next-SN or Wait (s) == 0
if reordering timer timeouts or reordering queue is full, release all packets in the queue and update Next-SN to Last-Queue-SN + 1
Wait(Last-SN) = (Last-SN − Next-SN + 1) − (Last-LSN − $2^{nd}$Last-LSN)
if Last-SN < Next-SN,
   drop the (unexpected) last received packet
else if Last-SN == Next-SN
   release the last received packet and all in-order packets in reordering queue, and update Next-SN accordingly
   if reordering queue is not empty, restart reordering timer
else
   if the reordering queue is empty
     if Wait(Last-SN) ≤ 0
       release the last received packet, and update Next-SN to Last-SN + 1
     else
       add a tag of Wait(Last-SN) to the last received packet and put it to reordering queue
       start the reordering timer
   else if x == y,
     Add a tag of Wait(Last-SN) to the last received packet and put it to the tail of reordering queue
   else,
     if Last-SN < Last-Queue-SN
       release packets in reordering queue with SN < Last-SN
       release the last received packet
       update Wait(First-Queue-SN) to Wait(First-Queue-SN) − 1
       update Next-SN to Last-SN + 1
       release in-order packets in the reordering queue, and update Next-SN accordingly
       restart reordering timer if reordering queue is not empty
     else
       update Wait(Last-SN) to Wait(Last-SN) − n, where n is the number of packets in the reordering queue
       release all packets in the reordering queue
     If Wait(Last-SN) ≤ 0
       release the last received packet
       update Next-SN to Last-SN + 1
     else
       update Next-SN to Last-Queue-SN + 1
       add a tag of Wait(Last-SN) to the last received packet and put it to reordering queue
       restart reordering timer

---

For two link scenarios, the MX Rx maintains the following parameters:

Next-SN: the next in-order (Flow) sequence number
Last-SN: the (Flow) sequence number of the last received packet
Last-Queue-SN: the (Flow) sequence number of the last packet in the reordering queue
First-Queue-SN: the (Flow) sequence number of the 1st packet in the reordering queue
Last-LSN: the local delivery sequence number of the last received packet
$2^{nd}$ Last-LSN: on the same link that the last packet is received, the local delivery sequence number of the $2^{nd}$ last received packet
$2^{nd}$ Last-SN: on the same link that the last packet is received from, the flow sequence number of the $2^{nd}$ last received packet.
Wait(s): the number of packets that must be received successfully from the other link before a packet in the reordering queue can be considered as "in-order" and released, where s is the sequence number of the packet.
x: the delivery connection ID of the packets in the reordering queue.
y: the delivery connection ID of the last received packet.
T: the reordering timeout value (e.g., 100 ms).

1.3.4. Impact of Cross-RAT Re-Transmission

If the Tx supports cross-RAT retransmission, the retransmitted packets still carry the same information (e.g., connection ID, flow SN, and local SN) as it was delivered over the original link. Cross-RAT retransmission refers to a process of transmitting packets that were already sent over one link 105 can be retransmitted over a different link 105 upon request. Moreover, in-order retransmission schemes may be used because these schemes minimize packet drop in the reordering process.

1.3.5. Basic Reordering Algorithm

Figure 23:
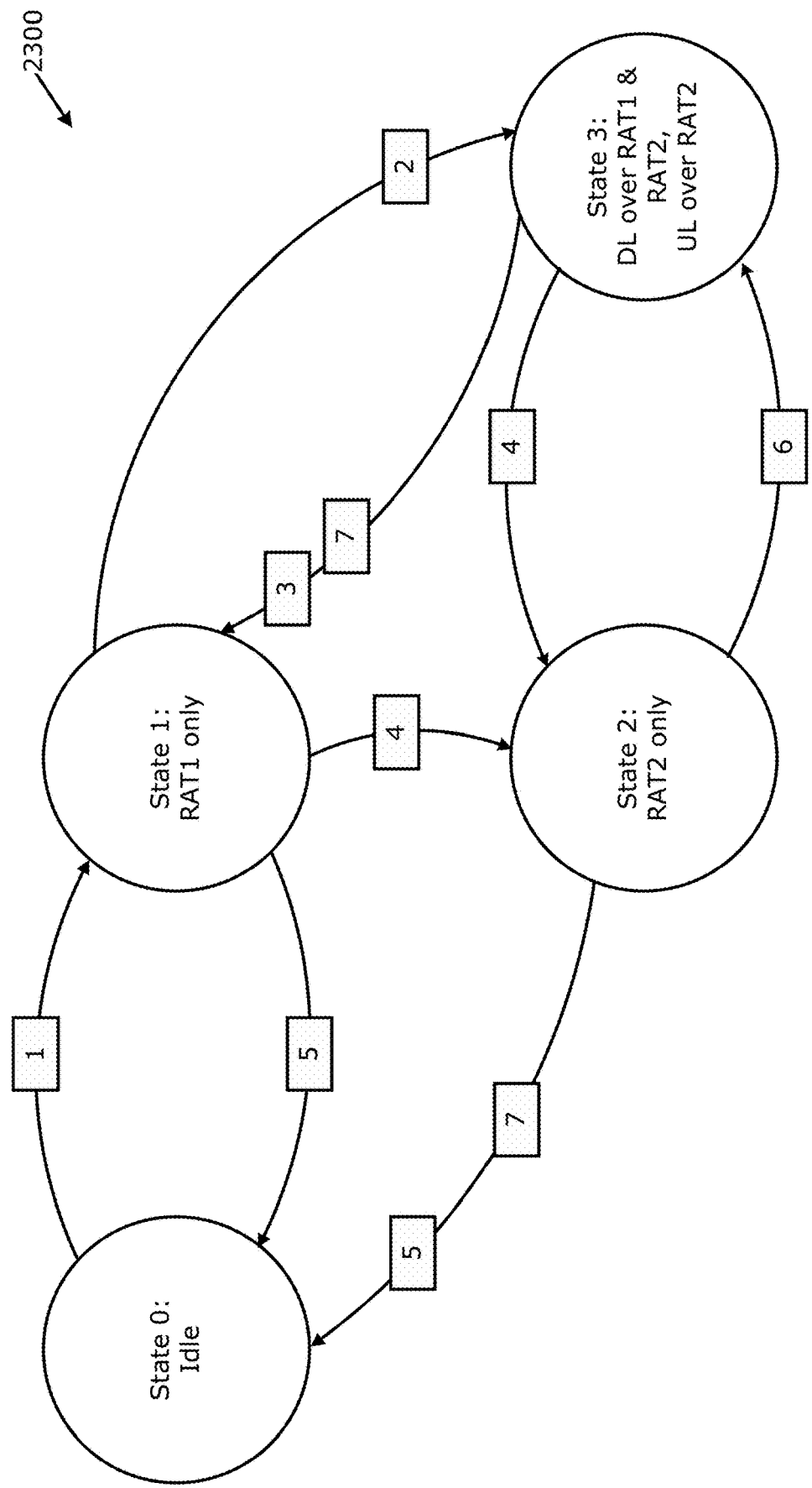
FIG. 23 illustrates a client-based GMA Data Traffic Control State Machine.

The client 101 and server 140 (e.g., (e.g., Gc 2101 and Gs 2140 in FIG. 21) may perform reordering for "high-throughput" flows (e.g., where Flow ID=3; see e.g., FIG. 23 discussed infra). For "high-reliability" (low data-rate) flows, redundant or out-of-order packets may be dropped; But for the "high-throughput" flows, out-of-order packets may be sent/transferred to upper layer(s). The following parameters are used:

next_SN: the next in-order sequence number
packet_SN: the SN of the current packet
RAT2_queue_SN: the SN of the first packet in the RAT2 queue
RAT1_queue_SN: the SN of the first packet in the RAT1 queue RAT2_queue_Reorder_Delay: the reordering delay of the first packet in the RAT2 queue RAT1_queue_Reorder_Delay: the reordering delay of the first packet in the RAT1 queue RAT1_queue_SN: the SN of the first packet in the RAT1 queue RAT2_queue_size: the number of packets in the RAT2 queue RAT1_queue_size: the number of packets in the RAT1 queue T_flag: the flag to indicate if the reordering timer thread is active or not reorder_finish: the flag to indicate if the reorder thread has completed or not T_reorder: the maximum reordering time When a packet is received and the buffer is not full, the device may operate as shown by the following table:

```
if packet_sn == next_SN
    send it to upper layer
    next_SN ++
    If (reorder_finish==1 && RAT1_queue_size + RAT2_queue_size > 0)
        start the Reordering thread
    else If packet_sn < next_SN
        drop the packet
    else
        add the packet into the RAT1 (RAT2) queue;
        RAT1RAT2)_queue_size ++;
        If (reorder_finish==1)
            start the Reordering thread
```

The reordering timer thread is defined as shown by the following table:

```
T_flag = 1
t = max(RAT1_queue_Reorder_Delay, RAT2_queue_Reorder_Delay)
While (t < T_reorder && RAT2_queue_size + RAT1_queue_size > 0 )
{
    sleep(T_reorder − t + 3); //unit: ms
    t = max(RAT1_queue_Reorder_Delay, RAT2_queue_Reorder_Delay)
}
If (RAT2_queue_size + RAT1_queue_size > 0 && reorder_finish == 1)
    Start the Reordering thread;
T_flag = 0
```

Reordering thread is defined as shown by the following table:

```
reorder_finish = 0;
While (RAT2_queue_size > 0 && RAT1_queue_size > 0)
{
    if (RAT1_queue_SN < or == RAT2_queue_SN)
        if RAT1_queue_SN > or == next_SN
            send the first RAT1 packet to the upper layer
            next_SN = RAT1_queue_SN + 1;
        else
            drop the first packet
        update RAT1_queue_SN;
        RAT1_queue_size --;
    else
        If RAT2_queue_SN > or == next_SN
            send the first packet in the RAT2 queue to the upper layer
            next_SN = RAT2_queue_SN + 1;
        else
            drop the first packet;
        update RAT2_queue_SN;
        RAT2_queue_size --;
}
update RAT2_queue_Reorder_Delay and RAT1_queue_Reorder_Delay;
While (RAT1_queue_size > 0 && (RAT1_queue_SN < or == next_SN ||
RAT1_queue_Reorder_Delay > T_reorder)
{
    If (RAT1_queue_SN < next_SN)
        Drop the first packet
    Else
        send the first packet in the RAT1 queue to the upper layer;
        next_SN = RAT1_queue_SN + 1;
    update RAT1_queue_SN and RAT1_queue_Reorder_Delay;
    RAT1_queue_size -- ;
}
While (RAT2_queue_size > 0 && (RAT2_queue_SN < or == next_SN ||
RAT2_queue_Reorder_Delay > T_reorder))
{
    If (RAT2_queue_SN < next_SN)
        Drop the first packet
    else
        send the first packet in the RAT2 queue to the upper layer
        next_SN = RAT2_queue_SN + 1;
    update RAT2_queue_SN and RAT2_queue_Reorder_Delay;
    RAT2_queue_size --;
}
If (RAT1_queue_size + RAT2_queue_size > 0) && (T_flag == 0))
    start reordering timer thread
reorder_finish = 1
```

1.3.6. Reordering Buffer Management

A single ring buffer is used to store both RAT1 and RAT2 out-of-order packets with the following parameters:

S: the size of the ring buffer (e.g. 1K)

B: the size of each slot, e.g. 1500 (Bytes)

Total memory of the ring buffer=S×B, e.g. 1K*1.5 KB=1.5 MB

L: the number of occupied slots (queue size)

x: the index of next available slot s(i): the flag to indicate whether the i-th slot is occupied ("1") or not ("0").

q1: a list to store the slot index of RAT1 packet q2: a list to store the slot index of RAT2 packet k: the slot index of a released packet When receive a packet, do the following shown by the following table:

```
While(s(x)==1) {x++;}
store the packet in the x-th slot;
If (L == S − 1) // reordering buffer is full
    send all packets to upper layer
    update next_SN to "the maximum SN of all packets + 1"
    reset q1, q2, s(i), x=0, and L=0.
else
    If the packet is received from RAT1
        store "x" in q1
    else
        store "x" in q2
s(x) = 1; L++; x++;
```

When release a packet, do the following shown by the following table:

```
s(k) = 0; L --;
if the packet is received from RAT1
    remove "k" from q1
else
    remove "k" from q2
```

1.3.7 Enhanced Reordering Algorithm

The client 101 and server 140 (e.g., (e.g., Gc 2101 and Gs 2140 in FIG. 21) may perform reordering for "high-throughput" flow (e.g., where Flow ID=3; see e.g., FIG. 23 discussed infra). For "high-reliability" (low data-rate) flows, redundant or out-of-order packets are dropped. For the "high-throughput" flows, out-of-order packet are send/delivered to upper layer. The following parameters are used:
- next_SN: the next in-order sequence number.
- packet_SN: the SN of the current packet.
- RAT2_queue_SN: the SN of the first packet in the RAT2 queue.
- RAT1_queue_SN: the SN of the first packet in the RAT1 queue.
- RAT2_queue_Reorder_Delay: the reordering delay of the first packet in the RAT2 queue.
- RAT1_queue_Reorder_Delay: the reordering delay of the first packet in the RAT1 queue.
- RAT1_queue_SN: the SN of the first packet in the RAT1 queue.
- RAT2_queue_size: the number of packets in the RAT2 queue.
- RAT1_queue_size: the number of packets in the RAT1 queue.
- T_RAT1_flag: the flag to indicate if the RAT1 reordering timer thread is active or not.
- T_RAT2_flag: the flag to indicate if the RAT2 reordering timer thread is active or not.
- reorder_finish: the flag to indicate if the reorder thread has completed or not.
- T_reorder: the maximum reordering time.
- Last_LSN: the local delivery sequence number of the last received packet.
- $2^{nd}$Last_LSN: on the same link that the last packet is received, the local delivery sequence number of the $2^{nd}$ last received packet.
- $2^{nd}$Last_SN: on the same link that the last packet is received from, the flow sequence number of the $2^{nd}$ last received packet.

When receive a packet and the buffer is not full, do the following shown by the following table:

```
if packet_sn == next_SN
   send it to upper layer
   next_SN ++
   If (reorder_finish==1 && RAT1_queue_size + RAT2_queue_size > 0)
      start the Reordering thread
else If packet_sn < next_SN
   drop the packet
else if packet_SN - 2^nd Last_SN == Last_LSN - 2^nd Last_LSN
```

-continued

```
   if ( RAT1(RAT2)_queue_size == 0)
      send it to upper layer
      next_SN = packet_SN + 1
      If (reorder_finish==1 && RAT1_queue_size + RAT2_queue_size > 0)
         start the Reordering thread
   else
      Add an inorder tag to this packet
      add the packet into the RAT1 (RAT2) queue;
      RAT1(RAT2)_queue_size ++;
      If (reorder_finish==1)
         start the Reordering thread
else
   add the packet into the RAT1 (RAT2) queue;
   RAT1(RAT2)_queue_size ++;
   If (reorder_finish==1)
      start the Reordering thread
```

Reordering timer thread is defined as follows shown by the following table:

```
T_flag = 1
t = max(RAT1_queue_Reorder_Delay, RAT2_queue_Reorder_Delay)
While (t < T_reorder && RAT2_queue_size + RAT1_queue_size > 0 )
{
   sleep(T_reorder – t + 3); //unit: ms
   t = max(RAT1_queue_Reorder_Delay, RAT2_queue_Reorder_Delay)
}
If (RAT2_queue_size + RAT1_queue_size > 0 && reorder_finish == 1)
   Start the Reordering thread;
T_flag = 0
```

Reordering thread is defined as follows shown by the following table:

```
reorder_finish = 0;
While (RAT2_queue_size > 0 && RAT1_queue_size > 0)
{
   if (RAT1_queue_SN < or == RAT2_queue_SN)
      if RAT1_queue_SN > or == next_SN
         send the first RAT1 packet to the upper layer
         next_SN = RAT1_queue_SN + 1;
      else
         drop the first packet
         update RAT1_queue_SN;
         RAT1_queue_size --;
   else
      If RAT2_queue_SN > or == next_SN
         send the first packet in the RAT2 queue to the upper layer
         next_SN = RAT2_queue_SN + 1;
      else
         drop the first packet;
         update RAT2_queue_SN;
         RAT2_queue_size --;
}
update RAT2_queue_Reorder_Delay and RAT1_queue_Reorder_Delay;
While (RAT1_queue_size > 0 && (RAT1_queue_SN < or == next_SN ||
RAT1_queue_Reorder_Delay > T_reorder || the first packet is marked as inorder))
{
   If (RAT1_queue_SN < next_SN)
```

```
    Drop the first packet
 Else
    send the first packet in the RAT1 queue to the upper layer;
    next_SN = RAT1_queue_SN + 1;
 update RAT1_queue_SN and RAT1_queue_Reorder_Delay;
 RAT1_queue_size -- ;
}
While (RAT2_queue_size > 0 && (RAT2_queue_SN < or == next_SN | |
RAT2_queue_Reorder_Delay > T_reorder | | the first packet is marked as inorder))
{
 If (RAT2_queue_SN < next_SN)
    Drop the first packet
 else
    send the first packet in the RAT2 queue to the upper layer
    next_SN = RAT2_queue_SN + 1;
 update RAT2_queue_SN and RAT2_queue_Reorder_Delay;
 RAT2_queue_size --;
}
If (RAT1_queue_size + RAT2_queue_size > 0) && (T_flag == 0))
 start reordering timer thread
reorder_finish = 1
```

1.4. Link-Aware Packet Duplication Mechanisms

Referring back to FIG. 1, the MX convergence (sub)layer operates on top of the MX adaptation (sub)layer in the protocol stacks 102 and 142. The convergence sublayer: this layer performs multi-access specific tasks (e.g., access (path) selection, multi-link (path) aggregation, splitting/reordering, lossless switching, keep-alive, and probing, etc.). [GMA09] specifies that additional control information (e.g., Key, Sequence Number, Timestamp, etc.) is encoded at this sublayer. The adaptation sublayer performs functions to handle tunneling, network layer security, and network address translation (NAT), and the existing protocols (e.g., UDP, IPSec, etc.) can be reused.

Packet duplication, where multiple copies of individual packets are created and sent over different radio links 105, may dramatically reduce latency and improve reliability because the receiver (Rx) will receive at least one copy of a packet from the fastest link 105. However, one issue with using packet duplication is high overhead. This takes place when the transmitter (Tx) increases the data injected into the network proportional to the number of radio links 105. In this disclosure, a link-aware packet duplication mechanism is provided for the MAMS convergence sublayer. The link-aware packet duplication mechanism duplicates packets over multiple links only if a predefined or configured delay target cannot be met with a single link 105.

A device (e.g., client 101 and/or server 140) identifies a link as being in a free, busy, or overloaded state based on predicted and measured transmission time. Additionally or alternatively, the device can dynamically enable packet duplication based on the identified link states. Additionally or alternatively, the device notifies the receiver (Rx) to start/stop reordering. Additionally or alternatively, the device provides the IDs of active links by carrying an active link bitmap in the data packet header.

The link-aware packet duplication mechanism defines various link states. The following link states are defined by the link-aware packet duplication mechanism: free, busy, and overloaded. Data packets and control messages may be sent over a free link 105 (i.e., a link in the free state). A limited amount of data packets and control messages may be sent over a busy link 105 (i.e., a link in the busy state). Only control messages can be sent over an overloaded link 105 (i.e., a link in the overloaded state).

If any link is identified as being in the free state, the Tx will select one of the free links 105 to transmit, and packet duplication is disabled. If the current link state for a particular link 105 switches from the free state to the busy state and packet duplication is not active, the Tx will start packet duplication. After a predefined or preconfigured time period (e.g., one or more seconds), if any link 105 becomes "free", the Tx stops packet duplication and switches back to one of the free links. Otherwise, the Tx continues duplicating packets. Moreover, the Tx includes an optional active link bitmap field in the convergence header [GMA09] when the duplicate mode is enabled, such that the Rx knows which links 105 are used for packet duplication and applies the multiple-link 105 reordering algorithm accordingly.

Figure 17:
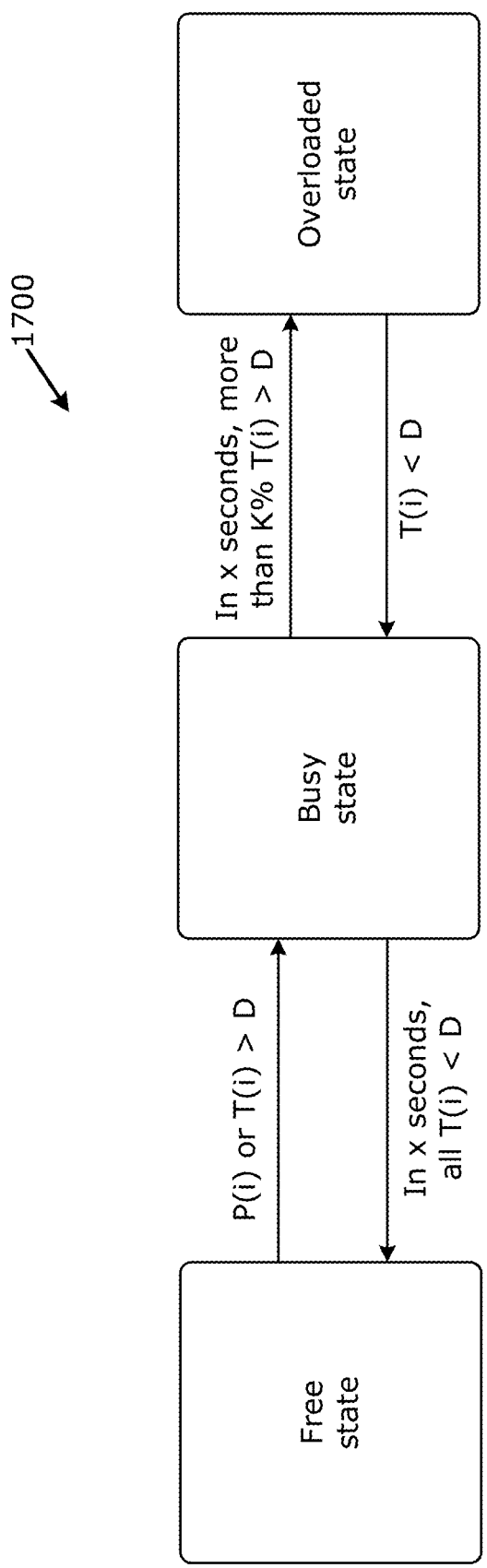
FIG. 17 depicts a link state transition diagram.

FIG. 17 depicts a link state transition diagram showing link state transition conditions. The device (e.g., the Tx device) maintains the following parameters:

D: target delay, the maximum delay the application can tolerate (e.g., 10 ms);

K %: transmission delay percentage threshold (e.g., 80%);

X: transmission delay measurement duration (e.g., 1 second);

P(i): predicted transmission time for packet i, the time-lapse from packet i requesting access till the next possible delivery time;

T(i): measured transmission time for packet i, the time-lapse from packet i requesting access till receiving its ACK; and L: min duration of duplicate mode (e.g., 1 second), or mode switching interval.

As mentioned previously, the link-aware packet duplication mechanism defines free, busy, and overloaded link states, which may be further defined using the aforementioned parameters as follows:

free: transmission time T(i) is always smaller than the target delay D;

busy: less than K % of transmission time T(i) violates the target delay D; and overloaded: more than K % of transmission time T(i) violates the target delay D.

The Tx will measure the transmission time for delivered packets periodically (every x seconds) and determine the link state accordingly. If a packet is dropped, either due to buffer overflow or reaching the maximum number of retransmissions, its transmission time will be set to $T(i)>D$. The link state transition conditions of FIG. 17 are as follows:

From the free state, if any transmission ($P(i)$ or $T(i)$) violates the target delay D, the Tx will switch the link state from "free" to "busy". Here, the target delay D is violated if $P(i)>D$ or $T(i)>D$.

From the busy state, if more than K % of transmissions violate the target delay D, the Tx will change the link state from "busy" to "overloaded". In some implementations, the transition from busy to overloaded takes place when the transmission delay percentage threshold K exceeds the target delay D within the transmission delay measurement duration X.

From the busy state, if all packets are delivered within the target delay D, the Tx will change the link state from "busy" back to "free". In some implementations, the transition from busy to free takes place when $T(i)<D$ within the transmission delay measurement duration X.

From the overloaded state, if any packet is delivered within the target delay D, the Tx will change the link state from "overloaded" to "busy". In some implementations, the transition from overloaded to busy takes place when $T(i)<D$ within the transmission delay measurement duration X.

Figure 18:
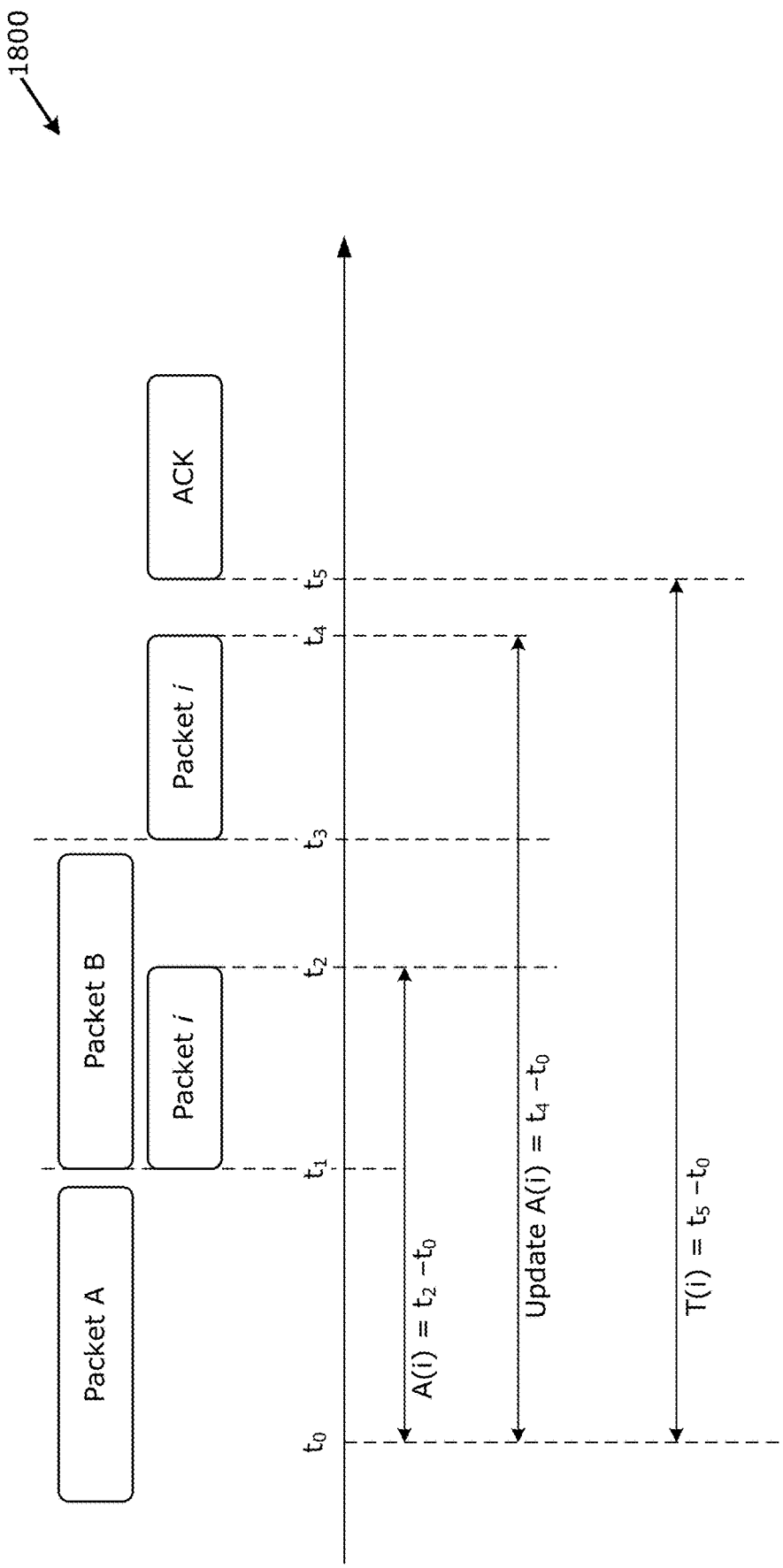
FIG. 18 depicts an example of computing a predicted transmission time for a packet and a measured transmission time for the packet.

The above state transition mechanism works even if $T(i)$ is used as the only trigger condition. But, with $P(i)$, the Tx can detect link state change and start packet duplication much earlier. FIG. 18 shows an example of computing $P(i)$ and $T(i)$. Here, $T(i)$ is only available when the ACK is received at time $t_5$ and can be calculated as $t_5-t_0$, where $t_0$ is the time when the access for packet #i is requested. In comparison, $P(i)$ can be updated based on channel sensing information such as clear channel assessment (CCA), network allocation vector (NAV), energy detection (ED), etc. As shown in FIG. 18, at time $t_0$, the device knows the physical channel will be busy until $t_1$. Then, at $t_1$, the device detects the channel will stay busy due to another transmission and update $P(i)$ to $t_4-t_0$, where $t_4$ is the end of the transmission $t_3$ (e.g., based on the received IEEE 802.11 PHY/MAC header information) plus the transmission duration of packet i. In summary, $T(i)$ computes the measured transmission time when ACK is received (at $t_5$), and $P(i)$ computes a lower bound for $T(i)$ based on the current channel information and may be updated whenever the channel status changes (at $t_1$).

Figure 19:
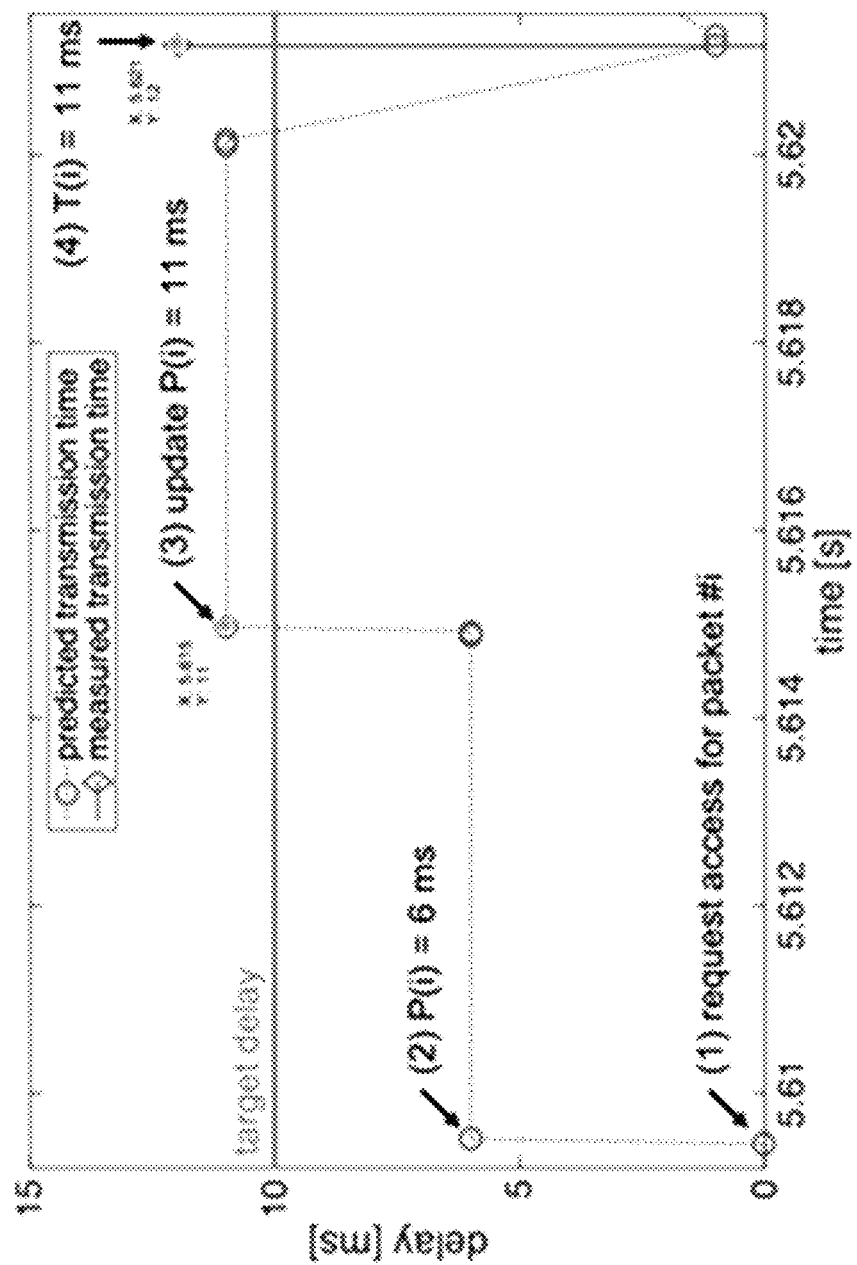
FIG. 19 depicts a graph of the predicted transmission time vs. the measured transmission time.

FIG. 19 shows a graph 1900 of predicted transmission time $P(i)$ vs. measured transmission time $T(i)$. FIG. 19 shows the traces of $P(i)$ and $T(i)$ in simulation to validates our algorithm. At time 5.609 s, when the channel access is requested, $P(i)$ is computed as 6 ms. Later, it is updated to 11 ms at time 5.615 s. I.e., after waiting for 6 ms, the device predicts the transmission time is at least 11 ms. If the target delay D=10 ms, the Tx will detect delay violation at 5.615 s, 6 ms earlier than using $T(i)$.

Figure 20:
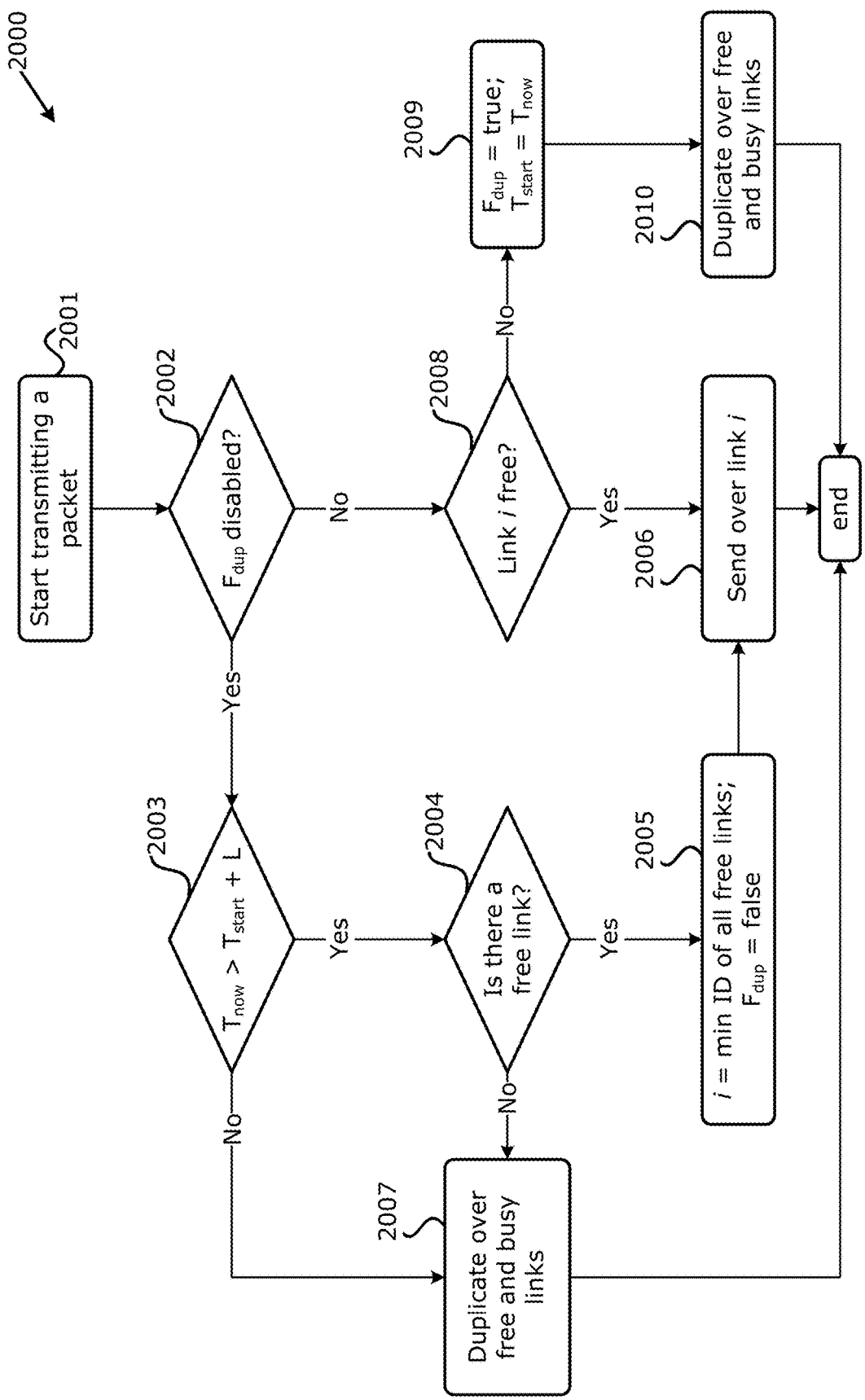
FIG. 20 depicts a dynamic packet duplication procedure.

FIG. 20 shows a dynamic packet duplication process 2000. Process 2000 may allow for toggling between single link and duplicate mode. Utilizing the link state information, the device selects a free link to transmit or duplicates packets over multiple links if none of the links is free. Initially in process 2000, the configuration parameters are as follows: the duplicate mode is disabled (e.g., the duplicate flag ($F_{dup}$) is set to "false"), the initial default link ID i is configured as 0, all links are considered as "free", the mode switching interval L is set to a predetermined or preconfigured value (e.g., 1 second), and $T_{now}$ is updated based on a current system time.

When a packet arrives, if the duplicate mode is disabled (e.g., $F_{dup}$=false), it will be delivered over link i if it is free; otherwise, it will be duplicated and sent over all free or busy links. For the overloaded links, a probe control message is sent every L seconds. After L seconds of duplication mode, if none of the links is free, continue duplicating packets. Otherwise, stop the duplication mode, and send data packets to only one of the free links. When the current link is busy, the device switches to duplicate mode to find another free link. The duplicate mode may be limited for at least L seconds to prevent frequent switching between single-link and duplicate mode.

Process 2000 starts at operation 2001 where a packet arrives and/or starts transmitting the packet. At operation 2002, the device determines if the duplicate mode $F_{dup}$ is disabled. If the duplicate mode $F_{dup}$ is disabled, the device determines if the current time $T_{now}$ is greater than the starting time $T_{start}$ and the mode switching interval L ($T_{now}>T_{start}+L$) at operation 2003. If the current time $T_{now}$ is greater than the starting time $T_{start}$ and the mode switching interval L, the device duplicates over any free and busy links at operation 2007, and then process 2000 ends. If the current time $T_{now}$ is not greater than the starting time $T_{start}$ and the mode switching interval L, the device determines if there are any free links at operation 2004. If there are no free links at operation 2004, then the device duplicates over any free and busy links at operation 2007, and then process 2000 ends. If there are one or more free links at operation 2004, the device identifies a link with a minimum/lowest ID of all free links (e.g., by setting link i to have a link ID equal to the min ID), and then disables the duplicate mode $F_{dup}$ at operation 2005, sends the packet over the identified link at operation 2006, and then process 2000 ends.

Referring back to operation 2002, if the duplicate mode $F_{dup}$ is not disabled (or is enabled), the device determines whether a link i is free at operation 2008. If link i is free, then the device sends the packet over link i at operation 2006. If link i is free, then the device sets the $F_{dup}$ to true and sets the starting time $T_{start}$ to be the current time $T_{now}$, then duplicates over free and busy links at operation 2010, and then process 2000 ends.

In addition to the above, the present disclosure includes an enhanced multi-link reordering mechanism that can be implemented by a receiver (Rx) device. The reordering procedure is described in section MULTI-LINK PACKET REORDERING MECHANISMS supra. Assume packets are duplicated over M in-order delivery links for one or more RAT links. In one implementation, if there are missing packets and the Rx receives at least one packet from all links, the Rx can skip the missing packets and start forwarding. In a two-link example, when packet #2 is missing, if the Rx receives packet #4 over a first link and packet #3 over a second link, the Rx can declare packet #2 as being lost and forward packet #3 and #4 without waiting for packet #2.

For this reordering algorithm, the Rx needs to know the number of active links for data, since the Tx may only select one or a subset of the links over which to send data since data is prohibited from being send over overloaded links. The active link information is carried to the Rx in an optional field (one byte) called active link bitmap in the packet header. In single link mode, this field is disabled, and the receiver will not do reordering. In duplicate mode, this field is enabled and each bit represents whether a link is used to send the duplicated packet. For example, if the j-th link is active in duplicate mode, the j-th bit of the bitmap equals one. This bitmap may be extended to more bytes if the device connects to more links. At the receiver side, it enables/disables the reordering process and updates the active link based on the active link bitmap of the last transmitted packet from the Tx (the packet with the max sequence number). For example, when packet #10 arrives with active link bitmap enabled, the receiver updates active links and starts performing reordering. Later, if packet #9 arrives with active link bitmap disabled (indicate no reordering is required), the device will continue reordering packets since packet #10 represents a more recent decision from the Tx side.

1.5. MAMS Management Messages

The MAMS system 100, 200 and the GMA system 2100 (discussed infra) may use various MAMS management messages (e.g., message 2130 in FIG. 21) to configure data plane functions (e.g., Gc 2101 and Gs 2140 in FIG. 21), These MAMS management messages 2130 may include one or more of the following MAMS messages:

MX Discover Message (mx_discover): This message is the first message sent by the CCM 206 to discover the presence of NCM 236 in the network. It contains only the base information as described in Appendix C.2.1 of [RFC8743] with message_type set as mx_discover).

MX System Info Message (mx_system_info): This message is sent by the NCM 236 to the CCM 206 to inform the endpoints that the NCM 236 supports MAMS functionality. In addition to the base information described in Appendix C.2.1 of [RFC8743], it contains the following information:

NCM Connection described infra and in Appendix C.2.3 of [RFC8743].

MX Capability Request (mx_capability_req): This message is sent by the CCM 206 to the NCM 236 to indicate the capabilities of the CCM 206 instance available to the NCM 236 indicated in the System Info message earlier. In addition to the base information described in Appendix C.2.1 of [RFC8743], it contains the following information:
  (a) Features and their activation status (see e.g., Appendix C.2.5 of [RFC8743]).
  (b) Number of Anchor Connections: The number of anchor connections (toward the core) supported by the NCM 236.
  (c) Anchor connections (see e.g., Appendix C.2.6 of [RFC8743]).
  (d) Number of Delivery Connections: The number of delivery connections (toward the access) supported by the NCM 236.
  (e) Delivery connections (see e.g., Appendix C.2.7 of [RFC8743]).
  (f) Convergence methods (see e.g., Appendix C.2.9 of [RFC8743]).
  (g) Adaptation methods (see e.g., Appendix C.2.10 of [RFC8743]).

The mx_capability_req message is enhanced to include the following new parameters:
  last_ip_address to indicate the virtual network address (e.g., IP address or the like) used in the last MAMS session
  last_session_id to indicate the unique session id of the last MAMS session
  device_type to indicate the device type (e.g., 0: Android, 1: iOS, 2: Windows, 3: Linux, etc.).

Moreover, the following new messages are introduced in the GMA system 2100: mx_session_resume_req/rsp (discussed infra). The mx_session_resume_req/rsp messages is/are for notifying server that client has resumed the GMA operation, and for time synchronization. Both messages share the same format as mx_session_termination_req/rsp, and carry unique_session_id.

MX Capability Response (mx_capability_resp or mx_capability_rsp): This message is sent by the NCM 236 to the CCM 206 to indicate the capabilities of the NCM 236 instance and unique session identifier for the CCM 206. In addition to the base information described in Appendix C.2.1 of [RFC8743], the mx_capability_resp contains the following information:
  (a) Features and their activation status (see e.g., Appendix C.2.5 of [RFC8743]).
  (b) Number of Anchor Connections: The number of anchor connections (toward the core) supported by the NCM 236.
  (c) Anchor connections (see e.g., Appendix C.2.6 of [RFC8743]).
  (d) Number of Delivery Connections: The number of delivery connections (toward the access) supported by the NCM 236.
  (e) Delivery connections (see e.g., Appendix C.2.7 of [RFC8743]).
  (f) Convergence methods (see e.g., Appendix C.2.9 of [RFC8743]).
  (g) Adaptation methods (see e.g., Appendix C.2.10 of [RFC8743]).
  (h) Unique Session ID: This uniquely identifies the session between the CCM 206 and the NCM 236 in a network (see e.g., Appendix C.2.2 of [RFC8743]).

If the "number of anchor connections" parameter in mx_capability_rsp message is set to "0", indicating the server has rejected the client's request, the client should stop the procedure immediately and wait for the next event (e.g., WiFi connect) to start again.

MX Capability Acknowledge (mx_capability_ack): This message is sent by the CCM 206 to the NCM 236 to indicate acceptance of capabilities advertised by the NCM 236 in an earlier MX Capability Response message. In addition to the base information described in Appendix C.2.1 of [RFC8743], it contains the following information:
  (a) Unique Session ID: Same identifier as the identifier provided in the MX Capability Response (see e.g., Appendix C.2.2 of [RFC8743]).
  (b) Capability Acknowledgment: Indicates either acceptance or rejection of the capabilities sent by the CCM 206. Can use either "MX_ACCEPT" or "MX_REJECT" as acceptable values.

MX User-Plane Configuration Request (mx_up_setup_conf_req): This message is sent by the NCM 236 the CCM 206 to configure the user plane for MAMS. In addition to the base information described in Appendix C.2.1 of [RFC8743], it contains the following information:
  (a) Number of Anchor Connections: The number of anchor connections supported by the NCM 236.
  (b) Setup of anchor connections (see e.g., Appendix C.2.11 of [RFC8743]).

The mx_up_setup_conf message is enhanced to configure a virtual IP interface on the client 101 (e.g., including the network address (e.g., IP address or the like), gateway, dns server, network mask, or the like).

MX User-Plane Configuration Confirmation (mx_up_setup_conf_cnf): This message is the confirmation of the UP setup message sent from the CCM 206 after successfully configuring the user plane on the client. This message contains the following information:
  (a) MX probe parameters (included if probing is supported):
    (1) Probe Port: UDP port for accepting probe message.
    (2) Anchor connection ID: Identifier of the anchor connection to be used for probe function. Provided in the MX UP Setup Configuration Request.

(3) MX Configuration ID: This parameter is included only if the MX Configuration ID parameter is available from the UP setup configuration. It indicates the MX configuration ID of the anchor connection to be used for probe function.

(b) The following information is required for each delivery connection:
  (1) Connection ID: Delivery connection ID supported by the client.
  (2) Client Adaptation-Layer Parameters: If the UDP Adaptation Layer is in use, then the UDP port to be used on the C-MADP side.

As discussed herein, the mx_up_setup_cnf message is enhanced to configure a virtual IP interface on the client 101 (e.g., network address (e.g., IP address or the like), gateway, dns server, network mask, or the like), provide all the GMA client configuration parameters to the client 101, and provide a list of applications allowed to use GMA optimizations. It contains the following information: APP List (e.g., com.google.android.youtube, and/or the like).

MX Reconfiguration Request (mx_reconf_req): This message is sent by the NCM 236 to the CCM 206 to configure the user plane for MAMS. In addition to the base information described in Appendix C.2.1 of [RFC8743], it contains the following information:
  (a) Unique Session ID: Identifier for the CCM 206-NCM 236 association (see e.g., Appendix C.2.2 of [RFC8743]).
  (b) Reconfiguration Action: The reconfiguration action type can be one of "setup", "release", or "update".
  (c) Connection ID: Connection ID for which the reconfiguration is taking place.
  (d) Network address (e.g., IP address or the like): Included if Reconfiguration Action is either "setup" or "update".
  (e) SSID: If the connection type is WiFi, then this parameter contains the SSID to which the client has attached.
  (f) MTU of the connection: The MTU of the delivery path that is calculated at the client for use by the NCM 236 to configure fragmentation and concatenation procedures at the N-MADP.
  (g) Connection Status: This parameter indicates whether the connection is currently "disabled", "enabled", or "connected". Default: "connected".
  (h) Delivery Node ID: Identity of the node to which the client is attached. In the case of LTE, this is an ECGI. In the case of WiFi, this is an AP ID or a MAC address.

MX Reconfiguration Response (mx_reconf_rsp): This message is sent by the NCM 236 to the CCM 206 as a confirmation of the received MX Reconfiguration Request and contains only the base information in Appendix C.2.1 of [RFC8743].

MX Path Estimation Request (mx_path_est_req): This message is sent by the NCM 236 toward the CCM 206 to configure the CCM 206 to send MX Path Estimation Results. In addition to the base information described in Appendix C.2.1 of [RFC8743], it contains the following information:
  (a) Connection ID: ID of the connection for which the path estimation report is required.
  (b) Init Probe Test Duration: Duration of initial probe test, in milliseconds.
  (c) Init Probe Test Rate: Initial testing rate, in megabits per second.
  (d) Init Probe Size: Size of each packet for initial probe, in bytes.
  (e) Init Probe-ACK: If an acknowledgment for probe is required. (Possible values: "yes", "no")
  (f) Active Probe Frequency: Frequency, in milliseconds, at which the active probes shall be sent.
  (g) Active Probe Size: Size of the active probe, in bytes.
  (h) Active Probe Duration: Duration, in seconds, for which the active probe shall be performed.
  (i) Active Probe-ACK: If an acknowledgment for probe is required. (Possible values: "yes", "no")

MX Path Estimation Results (mx_path_est_results): This message is sent by the CCM 206 to the NCM 236 to report on the probe estimation configured by the NCM 236. In addition to the base information described in Appendix C.2.1 of [RFC8743], it contains the following information:
  (a) Connection ID: ID of the connection for which the path estimation report is required (see e.g., Appendix C.2.2 of [RFC8743]).
  (b) Init Probe Test Duration: Duration of initial probe test, in milliseconds.
  (c) Init Probe Test Rate: Initial testing rate, in megabits per second (see e.g., Appendix C.2.12 of [RFC8743]).
  (d) Init Probe Size: Size of each packet for initial probe, in bytes (see e.g., Appendix C.2.13 of [RFC8743]).

MX Traffic Steering Request (mx_traffic_steering_req): This message is sent by the NCM 236 to the CCM 206 to enable traffic steering on the delivery side in UL and DL configurations. In addition to the base information described in Appendix C.2.1 of [RFC8743], it contains the following information:
  (a) Connection ID: Anchor connection number for which the traffic steering is being defined.
  (b) MX Configuration ID: MX configuration for which the traffic steering is being defined.
  (c) DL Delivery (see e.g., Appendix C.2.14 of [RFC8743]).
  (d) Default UL Delivery: The default delivery connection for the UL. All traffic should be delivered on this connection in the UL direction, and the Traffic Flow Template (TFT) filter should be applied only for the traffic mentioned in Uplink Delivery
  (e) Uplink Delivery (see e.g., Appendix C.2.15 of [RFC8743]).
  (f) Features and their activation status (see e.g., Appendix C.2.5 of [RFC8743]).

MX Traffic Steering Response (mx_traffic_steering_rsp): This message is a response to an MX Traffic Steering Request from the CCM 206 to the NCM 236. In addition to the base information described in Appendix C.2.1 of [RFC8743], it contains the following information:
  (a) Unique Session ID: Same identifier as the identifier provided in the MX Capability Response (see e.g., Appendix C.2.2 of [RFC8743]).
  (b) Features and their activation status (see e.g., Appendix C.2.5 of [RFC8743]).

MX SSID Indication (mx_ssid_indication): This message is sent by the NCM 236 to the CCM 206 to indicate the list of allowed SSIDs that are supported by the MAMS entity on the network side. It contains the list of SSIDs. Each SSID comprises the type of SSID (which can be one of the following: SSID, BSSID, or HESSID) and the SSID itself.

MX Keep Alive Request (mx_keep_alive_req): An MX Keep-Alive Request can be sent from either the NCM 236 or the CCM 206 on expiry of the Keep-Alive timer or a handover event. The peer shall respond to this request with an MX Keep-Alive Response. In the case of no response from the peer, the MAMS connection shall be assumed to be broken, and the CCM 206 shall establish a new connection by sending MX Discover messages. In addition to the base information described in Appendix C.2.1 of [RFC8743], it contains the following information:

(a) Keep-Alive Reason: Reason for sending this message (e.g., "Timeout", "Handover", or the like).
(b) Unique Session ID: Identifier for the CCM 206-NCM 236 association (see e.g., Appendix C.2.2 of [RFC8743]).
(c) Connection ID: Connection ID for which handover is detected, if the reason is "Handover".
(d) Delivery Node ID: The target delivery node ID (e.g., NCGI, ECGI, WiFi AP ID/MAC address, etc.) to which the handover is executed.

MX Keep Alive Response (mx_keep_alive_rsp): On receiving an MX Keep-Alive Request from a peer, the NCM 236/CCM 206 shall immediately respond with an MX Keep-Alive Response on the same delivery path from where the request arrived. In addition to the base information, it contains the unique session identifier for the CCM 206-NCM 236 association (see e.g., Appendix C.2.2 of [RFC8743]).

MX Measurement Configuration (mx_measurement_conf): This message is sent from the NCM 236 to the CCM 206 to configure the period measurement reporting at the CCM 206. The message contains a list of measurement configurations, with each element containing the following information:

(a) Connection ID: Connection ID of the delivery connection for which the reporting is being configured.
(b) Connection Type: Connection type for which the reporting is being configured (e.g., "LTE", "WiFi", "5G_NR", etc.).
(c) Measurement Report Configuration: Actual report configuration based on the Connection Type (see e.g., Appendix C.2.17 of [RFC8743]).

MX Measurement Report (mx_measurement_report): This message is periodically sent by the CCM 206 to the NCM 236 after measurement configuration. In addition to the base information, it contains the following information:

(a) Unique Session ID: Same identifier as the identifier provided in the MX Capability Response (see e.g., Appendix C.2.2 of [RFC8743]).
(b) Measurement report for each delivery connection is measured by the client (see e.g., Appendix C.2.18 of [RFC8743]).

MX Session Termination Request (mx_session_termination_req): In the event where the NCM 236 or CCM 206 can no longer handle MAMS for any reason, it can send an MX Session Termination Request to the peer. In addition to the base information (MXBase), it contains a Unique Session ID and the reason for the termination such as, for example, "MX_NORMAL_RELEASE", "MX_NO_RESPONSE", or "INTERNAL_ERROR".

MX Session Termination Response (mx_session_termination_rsp): On receipt of an MX Session Termination Request from a peer, the NCM 236/CCM 206 shall respond with MX Session Termination Response on the same delivery path where the request arrived and clean up the MAMS-related resources and settings. The CCM 206 shall reinitiate a new session with MX Discover messages.

MX Application MADP Association Request (mx_app_madp_assoc_req): This message is sent by the CCM 206 to the NCM 236 to select MADP instances provided earlier in the MX UP Setup Configuration Request, based on requirements for the applications. In addition to the base information described inUnique Session ID: This uniquely identifies the session between the CCM 206 and the NCM 236 in a network (see e.g., Appendix C.2.2 of [RFC8743]).

(a) A list of MX Application MADP Associations, with each entry as follows:
  (1) Connection ID: Represents the anchor connection number of the MADP instance.
  (2) MX Configuration ID: Identifies the MX configuration of the MADP instance.
  (3) Traffic Flow Template Uplink: Traffic Flow Template to be used in the UL direction (see e.g., Appendix C.2.16 of [RFC8743]).
  (4) Traffic Flow Template Downlink: Traffic Flow Template to be used in the DL direction (see e.g., Appendix C.2.16 of [RFC8743]).

MX Application MADP Association Response (mx_app_madp_assoc_rsp): This message is sent by the NCM 236 to the CCM 206 to confirm the selected MADP instances provided in the MX Application MADP Association Request by the CCM 206. In addition to the base information described in Appendix C.2.1 of [RFC8743], it contains information if the request has been successful.

MX Network Analytics Request (mx_network_analytics_req): This message is sent by the CCM 206 to the NCM 236 to request parameters like bandwidth, jitter, latency, and signal quality predicted by the network analytics function. In addition to the base information, it contains the following parameter:

(a) Unique Session ID: Same identifier as the identifier provided in the MX Capability Response (see e.g., Appendix C.2.2 of [RFC8743]).
(b) Parameter List: List of parameters in which the CCM 206 is interested: one or more of "bandwidth", "jitter", "latency", and "signal_quality".

MX Network Analytics Response (mx_network_analytics_rsp): This message is sent by the NCM 236 to the CCM 206 in response to the MX Network Analytics Request. For each delivery connection that the client has, the NCM 236 reports the requested parameter predictions and their respective likelihoods (between 1 and 100 percent). In addition to the base information described in Appendix C.2.1 of [RFC8743], it contains the following information:

(a) Number of Delivery Connections: The number of delivery connections that are currently configured for the client.
(b) The following information is provided for each delivery connection:
  (1) Connection ID: Connection ID of the delivery connection for which the parameters are being predicted.
  (2) Connection Type: Type of connection. Can be "WiFi", "5G_NR", "MulteFire", or "LTE".
  (3) List of Parameters for which Prediction is requested, where each of the predicted parameters consists of the following:
    (a) Parameter Name: Name of the parameter being predicted (e.g., "bandwidth", "jitter", "latency", "signal_quality", and/or the like).
    (b) Additional Parameter: If Parameter name is "signal_quality", then this qualifies the quality parameter (e.g., "lte_rsrp", "lte_rsrq", "nr_rsrp", "nr_rsrq", "wifi_rssi", and/or the like).
    (c) Predicted Value: Provides the predicted value of the parameter and, if applicable, the additional parameter.
    (d) Likelihood: Provides a stochastic likelihood of the predicted value.

(e) Validity Time: The time duration for which the predictions are valid.

In addition to the above, where the MAMS system implements the GMA protocol (see e.g., FIGS. 26-27) the following new messages are introduced:

MX Session Suspend Request (mx_session_suspend_req): used to notify the server 140 that the client 101 has suspended MAMS/GMA (session) operation, and may be used for time synchronization as discussed herein. The mx_session_suspend_req shares the same format as the mx_session_termination_req, and carries a unique_session_id.

MX Session Suspend Response (mx_session_suspend_rsp): used to notify the client 101 that the server 140 has suspended MAMS/GMA (session) operation, and may be used for time synchronization. The mx_session_suspend_rsp shares the same format as the mx_session_termination_rsp, and carries a unique_session_id.

MX Session Resume Request (mx_session_resume_req): used to notify the server 140 that the client 101 has resumed MAMS/GMA (session) operation and/or may be used for time synchronization. The mx_session_resume_req shares the same format as the mx_session_termination_req and/or mx_session_termination_rsp, and carries the unique_session_id. The reason for resuming the session (e.g., MAMS and/or GMA operation) may be different than those listed for the mx_session_termination_req. The reason for the resuming a session may be, for example, application or device waking up from idle or sleep state (e.g., "APP_ACTIVE", "GC_ACTIVE", "GS_ACTIVE", etc.), delivery connection being (re)established (e.g., "MX_RESPONSE"), a screen being turned on, one or more packets being sent over a delivery connection, a total throughput being at or above a threshold amount of throughput, link quality being at or above a threshold quality measurement, and/or other reasons.

MX Session Resume Response (mx_session_resume_rsp): used to notify the client 101 that the server 140 has resumed MAMS/GMA (session) operation and/or may be used for time synchronization. The mx_session_resume_rsp shares the same format as the mx_session_termination_req and/or mx_session_termination_rsp, and carries a unique_session_id.

The above messages may be used during a suspend/resume procedure, which allows the MAMS client 101 to notify the MAMS server 140 about temporarily suspending all MAMS operations to conserve resources and/or save power. In response, the MAMS server 140 keeps all the MAMS context information of the client 101 and stops performing any MAMS-specific operations (e.g., GMA convergence on the data plane). This procedure enhances the MAMS framework to improve client power efficiency and reduce resource consumption, for example, when the client device 101 is unattended or/and has very little active traffic.

The previously described MAMS control/management messages may include the following data types.

Base information (MXBase): This data type is the base information that every message between the CCM 206 and NCM 236 exchanges has including the following information:
  (a) Version: Version of MAMS used.
  (b) Message Type: Message type being sent, where the following are considered valid values: "mx_discover", "mx_system_info", "mx_capability_req", "mx_capability_rsp", "mx_capability_ack", "mx_up_setup_conf_req", "mx_up_setup_cnf", "mx_reconf_req", "mx_reconf_rsp", "mx_path_est_req", "mx_path_est_results", "mx_traffic_steering_req", "mx_traffic_steering_rsp", "mx_ssid_indication", "mx_keep_alive_req", "mx_keep_alive_rsp", "mx_measurement_conf", "mx_measurement_report", "mx_session_termination_req", "mx_session_termination_rsp", "mx_session_resume_req", "mx_session_resume_rsp", "mx_app_madp_assoc_req", "mx_app_madp_assoc_rsp", "mx_network_analytics_req", "mx_network_analytics_rsp"
  (c) Sequence Number: Sequence number to uniquely identify a particular message exchange (e.g., MX Capability Request/Response/Acknowledge).

Unique Session ID: This data type represents the unique session ID between a CCM 206 and NCM 236 entity. It contains an NCM ID that is unique in the network and a session ID that is allocated by the NCM for that session. On receipt of the MX Discover message, if the session exists, then the old session ID is returned in the MX System Info message; otherwise, the NCM 236 allocates a new session ID for the CCM 206 and sends the new ID in the MX System Info message.

NCM Connections: This data type represents the connection available at the NCM 236 for MAMS connectivity toward the client. It contains a list of NCM 236 connections available, where each connection has the following information:
  (a) Connection Information, see Appendix C.2.4 of [RFC8743].
  (b) NCM Endpoint Information: Contains the network address (e.g., IP address or the like) and port exposed by the NCM 236 endpoint for the CCM 206.

Connection Information: This data type provides the mapping of connection ID and connection type. This data type contains the following information:
  (a) Connection ID: Unique number or string identifying the connection.
  (b) Connection Type: Type of RAT connection associated with the connection ID. Examples of the type of connection include "Wi-Fi", "5G_NR", "MulteFire", "LTE", "DSL", etc.

Features and Their Activation Status: This data type provides the list of all features with their activation status. Each feature status contains the following:
  (a) Feature Name: the name of the feature can be one of the following: "lossless_switching", "fragmentation", "concatenation", "uplink_aggregation", "downlink_aggregation", and "measurement".
  (b) Active status: Activation status of the feature: "true" means that the feature is active, and "false" means that the feature is inactive.

Anchor Connections: This data type contains the list of Connection Information items (see e.g., Appendix C.2.4 of [RFC8743]) that are supported on the anchor (core) side.

Delivery Connections: This data type contains the list of Connection Information items (see e.g., Appendix C.2.4 of [RFC8743]) that are supported on the delivery (access) side.

Method Support: This data type provides the support for a particular convergence or adaptation method. It consists of the following:
  (a) Method: Name of the method.
  (b) Supported: Whether the method listed above is supported or not. Possible values are "true" and "false".

Convergence Methods: This data type contains the list of all convergence methods and their support status. Examples of the possible convergence methods include: "GMA", "MPTCP_Proxy", "GRE Aggregation_Proxy", and "MPQUIC".

Adaptation Methods: This data type contains the list of all adaptation methods and their support status. Examples of the possible adaptation methods include: "UDP_without_DTLS", "UDP_with_DTLS", "IPsec", and "Client_NAT".

Setup of Anchor Connections: This data type represents the setup configuration for each anchor connection that is required on the client's side. It contains the following information, in addition to the connection ID and type of the anchor connection:
  (a) Number of Active MX Configurations: If more than one active configuration is present for this anchor, then this identifies the number of such connections.
  (b) The following convergence parameters are provided for each active configuration:
    (1) MX Configuration ID: Present if there are multiple active configurations. Identifies the configuration for this MADP instance ID.
    (2) Convergence Method: Convergence method selected (see convergence methods discussed previously and/or described in Appendix C.2.9 of [RFC8743]).
    (3) Convergence Method Parameters described in Appendix C.2.11.1 of [RFC8743].
    (4) Number of Delivery Connections: The number of delivery connections (access side) that are supported for this anchor connection.
    (5) Setup of delivery connections described in Appendix C.2.11.2 of [RFC8743].

Convergence Method Parameters: This data type represents the parameters used for the convergence method and contains the following:
  (a) Proxy IP: IP address of the proxy that is provided by the selected convergence method.
  (b) Proxy Port: Port of the proxy that is provided by the selected convergence method.

Setup Delivery Connections: This is the list of delivery connections and their parameters to be configured on the client. Each delivery connection defined by its connection information (see e.g., Appendix C.2.4 of [RFC8743]) optionally contains the following:
  (a) Adaptation Method: Selected adaptation method name. This shall be one of the methods listed in Appendix C.2.10 of [RFC8743].
  (b) Adaptation Method Parameters: Depending on the adaptation method, one or more of the following parameters shall be provided:
    (1) Tunnel Network Address (e.g., IP address or the like).
    (2) Tunnel Port address.
    (3) Shared Secret.
    (4) MX header optimization: If the adaptation method is UDP_without_DTLS or UDP_with_DTLS, and convergence is GMA, then this flag represents whether or not the checksum field and the length field in the IP header of an MX PDU should be recalculated by the MX Convergence Layer. The possible values are "true" and "false". If it is "true", both fields remain unchanged; otherwise, both fields should be recalculated. If this field is not present, then the default of "false" should be considered.

Init Probe Results: This data type provides the results of the init probe request made by the NCM. It consists of the following information:
  (a) Lost Probes: Percentage of probes lost.
  (b) Probe Delay: Average delay of probe message, in microseconds.
  (c) Probe Rate: Probe rate achieved, in megabits per second.

Active Probe Results: This data type provides the results of the active probe request made by the NCM. It consists of the following information:
  (a) Average Probe Throughput: Average active probe throughput achieved, in megabits per second.

Downlink Delivery: This data type represents the list of connections that are enabled on the delivery side to be used in the downlink direction.

Uplink Delivery: This data type represents the list of connections and parameters enabled for the delivery side to be used in the uplink direction. The uplink delivery consists of multiple uplink delivery entities, where each entity consists of a Traffic Flow Template (TFT) (see e.g., Appendix C.2.16 of [RFC8743]) and a list of connection IDs in the uplink, where traffic qualifying for such a Traffic Flow Template can be redirected.

Traffic Flow Template: The Traffic Flow Template generally follows the guidelines specified in 3GPP TS 23.060 v16.0.0 (2019 Mar. 25). The Traffic Flow Template in MAMS consists of one or more of the following:
  (a) Remote Address and Mask: IP address and subnet for remote addresses represented in Classless Inter-Domain Routing (CIDR) notation. Default: "0.0.0.0/0".
  (b) Local Address and Mask: IP address and subnet for local addresses represented in CIDR notation. Default: "0.0.0.0/0"
  (c) Protocol Type: IP protocol number of the payload being carried by an IP packet (e.g., UDP, TCP). Default: 255.
  (d) Local Port Range: Range of ports for local ports for which the Traffic Flow Template is applicable. Default: Start=0, End=65535.
  (e) Remote Port Range: Range of ports for remote ports for which the Traffic Flow Template is applicable. Default: Start=0, End=65535.
  (f) Traffic Class: Represented by Type of Service in IPv4 and Traffic Class in IPv6. Default: 255.
  (g) Flow Label: Flow label for IPv6, applicable only for IPv6 protocol type. Default: 0.

Measurement Report Configuration: This data type represents the configuration done by the NCM 236 toward the CCM 206 for reporting measurement events:
  (a) Measurement Report Parameter: Parameter that shall be measured and reported. This is dependent on the connection type:
    (1) For the connection type of "Wi-Fi", the allowed measurement type parameters are "WLAN_RSSI", "WLAN_LOAD", "UL_TPUT", "DL_TPUT", "EST_UL_TPUT", and "EST_DL_TPUT".
    (2) For the connection type of "LTE", the allowed measurement type parameters are "LTE_RSRP", "LTE_RSRQ", "UL_TPUT", and "DL_TPUT".
    (3) For the connection type of "5G_NR", the allowed measurement type parameters are "NR_RSRP", "NR_RSRQ", "UL_TPUT", and "DL_TPUT".
  (b) Threshold: High and low threshold for reporting.
  (c) Period: Period for reporting, in milliseconds.

Measurement Report: This data type represents the measurements reported by the CCM for each access network measured. This type contains the connection information, the Delivery Node ID that identifies either the cell (ECGI) or the WiFi Access Point ID or MAC address (or equivalent identifier in other technologies), and the actual measurement performed by the CCM in the last measurement period 1.6. Generic Multi-Access (GMA) Encapsulation Protocol As alluded to previously, for MX devices, it is desirable to combine the multiple access network connections seamlessly to improve quality of experience. Such optimization may require additional control information, for example, Sequence Number (SN), in each data packet (e.g., IP packet). The Generic Multi-Access (GMA) Encapsulation Protocol [GMA09] is a new light-weight and flexible encapsulation protocol for this need.

Referring back to FIG. 1, the convergence (sub)layer in the MAMS DPPS is responsible for multi-access operations, including multi-link (path) aggregation, splitting/reordering, lossless switching/retransmission, fragmentation, concatenation, etc. It operates on top of the adaptation (sub)layer in the protocol stack 102, 142. From the Tx perspective, a User Payload (e.g., IP packet) is processed by the convergence layer first, and then by the adaptation layer before being transported over a delivery connection; from the Receiver perspective, an IP packet received over a delivery connection is processed by the adaptation layer first, and then by the convergence layer.

Today, Generic Routing Encapsulation (GRE) is used as the encapsulation protocol at the convergence layer to encode additional control information (e.g., Key, Sequence Number) (see e.g., 3GPP TS 36.361 v15.0.0 (2018 Jul. 9) ("[LWIPEP]"), Dommety, G., "Key and Sequence Number Extensions to GRE", IETF RFC 2890, (September 2000) ("[GRE1]"), and Leymann et al., "Huawei's GRE Tunnel Bonding Protocol", IETF RFC 8157 (May 2017) ("[GRE2]"). However, there are two main drawbacks with this approach including, for example, IP-over-IP tunnelling (required for GRE) leads to higher overhead especially for small packets; and it is difficult to introduce new control fields. For example, the overhead of IP-over-IP/GRE tunnelling with both Key and Sequence Number is 32 Bytes (20 Bytes IP header+12 Bytes GRE header), which is 80% of a 40 Bytes TCP ACK packet.

The GMA encapsulation protocol is implemented at the convergence layer. GMA supports three encapsulation methods/formats: trailer-based IP encapsulation, header-based IP encapsulation, and non-IP encapsulation. Particularly, the IP Encapsulation methods avoid IP-over-IP tunneling overhead (e.g., 20 Bytes), which is 50% of a 40 Bytes TCP ACK packet. Moreover, GMA introduces new control fields to support fragmentation and concatenation, which are not available in conventional GRE-based solutions such as in [LWIPEP], [GRE1], and [GRE2]. GMA operates between endpoints that have been configured to operate with GMA through additional control messages and procedures (see e.g., [RFC8743]). Moreover, UDP or IPSec tunneling may be used at the adaptation sublayer to protect GMA operation from intermediate nodes.

As shown by FIG. 1, a client device 101 (e.g., a smartphone, laptop, IoT device, etc.) may connect to the Internet via multiple access network connections 105. One of these connections (e.g., connection 105A) may operate as an anchor connection, and the other connection (e.g., connection 105B) may operate as the delivery connection. The anchor connection provides the network address (e.g., IP address or the like) and connectivity for end-to-end (e2e) Internet access, and the delivery connection provides additional path between the client 101 and the MX gateway (e.g., MX server 140) for multi-access optimizations. In some implementations, the anchor connection when GMA is used may be a virtual IP connection similar to what is used in a VPN, and there may be up to two simultaneous delivery connections (e.g., 5G/NR, LTE, WiFi, etc.), each of which has a dedicated UDP tunnel established over for data transfer.

For example, per-packet aggregation allows a single IP flow to use the combined bandwidth of the two connections. In another example, packets lost due to temporarily link outage may be retransmitted. Moreover, packets may be duplicated over multiple connections to achieve high reliability and low latency, and duplicated packets should be eliminated by the receiving side. Such multi-access optimization requires additional control information (e.g., SN) in each IP data packet, which can be supported by the GMA encapsulation protocol described herein and/or in [GMA09].

GMA is usually used when multiple access network connections are used, but may also be used when only a single access network connection is used. In these scenarios, GMA may be used for loss detection and recovery purposes, or used to concatenate multiple small packets to reduce per packet overhead/resource consumption.

FIG. 21 shows an OTT GMA E2E Network Reference Architecture 2100. In FIG. 21, the MA client 101 includes the CCM 206, which is a control-plane functional entity in the client 101 that exchanges MAMS control messages with the NCM 236 and configures multiple network paths at the client for transport of user data. The CCM 206 is communicatively coupled with a GMA client (Gc) 2101 in the MA client 101.

The Gc 2101 is a data plane functional entity in the client 101 that handles user data forwarding across multiple network paths 105 and MA convergence operations (e.g., splitting, steering, duplication, measurement, etc.). The Gc 2101 operates its own GMA protocol stack, which include the GMA data plane layer, which is on top of respective transport layers Trns-1 and Trns-2 (e.g., TCP, UDP, etc.), which are on top of respective network layers Net-1 and Net-2 (e.g., IP or the like). The respective network layers interact with respective access layer entities RAT-1 and RAT-2. In this example RAT-A is a WiFi station (STA) and RAT-B is an LTE UE.

The MA server 140 includes the NCM 236, which is control-plane functional entity in the network that handles MAMS control messages from the client 101, 1 and configures distribution of data packets over multiple network paths, and user plane treatment of the traffic flows. The NCM 236 is communicatively coupled with a GMA server (Gs) 2140 in the MA server 140. The Gs 2140 is a data plane functional entity in the network that handles user data forwarding across multiple network paths 107 and MA convergence operations (e.g., splitting, steering, duplication, measurement, etc.). The Gs 2140 includes a GMA protocol stack that is the same or similar to the GMA protocol stack in the Gc 2101. Furthermore, the MA server 140, and in particular the Gs 2140, may be communicatively coupled with a NAT/Firewall gateway 2150. The NAT/Firewall gateway 2150 may be disposed between the MA server 140 and a DN 170, 175 (e.g., the Internet, an enterprise network, a local area DN, and/or the like).

A websocket-based (e.g., TCP, UDP, etc.) secure connection is established between the CCM 206 and NCM 236 to exchange MAMS management messages 2130, which are used for configuring the data plane functions (e.g., Gc 2101 and Gs 2140). The MAMS management messages 2130 are discussed in more detail infra.

There are two types of connections in a GMA system 2100: anchor connections and delivery connections. An anchor connection is an IP connection that is used by applications for e2edata transfer. A delivery connection is a network connection (e.g., IP connection) that is used to deliver user data between the Gc 2101 and the Gs 2140. The anchor connection in the OTA GMA system 2100 is virtual network (e.g., IP) connection, which is similar to what is used in virtual private networks (VPNs). In some implementations, there may be up to two simultaneous delivery connections (e.g., 5G/NR, LTE, WiFi, etc.) each of which has a dedicated tunnel (e.g., UDP tunnel or the like) established for data transfer.

The Gc 2101 and/or the Gs 2140 select the delivery connection for MAMS messages based on a current state of the Gc 2101 and/or the Gs 2140, which may include one or more of the following: send all MAMS messages over a first (preferred) delivery connection (e.g., WiFi) in state 1 or 3 (see e.g., FIG. 23); and send all MAMS message over the second delivery connection (e.g., Cellular) in state 2 or 4 (see e.g., FIG. 23).

In one example implementation, the NAN 111A is a cellular base station such as a 5G/NR gNB, an LTE eNB, and/or the like, and the GW 2120A comprises one or more servers operating as an Evolved Packet Core (EPC) for LTE implementations or a 5G system (5GS)/5G core network (5GC) for 5G/NR implementations. In this example implementation, the one or more servers operate one or more network functions (NFs) such as a UPF in 5G/NR implementations, a Serving Gateway (S-GW) and/or Packet Data Network Gateway (P-GW) in LTE implementations, or the like. In this example implementation, connection 106A is an N3 reference point/interface for 5G/NR implementations or an S1 reference point/interface for LTE implementations, and connection 107A is an N6 reference point/interface for 5G/NR implementations or an SGi reference point/interface for LTE implementations.

In another example implementation (with may be combined with the previously described example implementation), the NAN 111B is a WLAN access point (AP) such as a WiFi AP, and the GW 2120B comprises one or more servers and/or network elements operating as a WLAN (WiFi) access gateway (WAG), a broadband network gateway (BNG), and/or the like. In this example implementation, each of connection 106B and connection 107B may be a suitable tunneling interface/link such as a GRE tunnel, general packet radio service (GPRS) Tunneling Protocol (GTP) tunnel, Mobile IP (MIP), a Proxy MIP (PMIP) tunnel, VPN tunnel, and/or the like. The connection 106B and connection 107B may utilize the same or different tunneling protocols and/or communication technologies.

Figure 22:
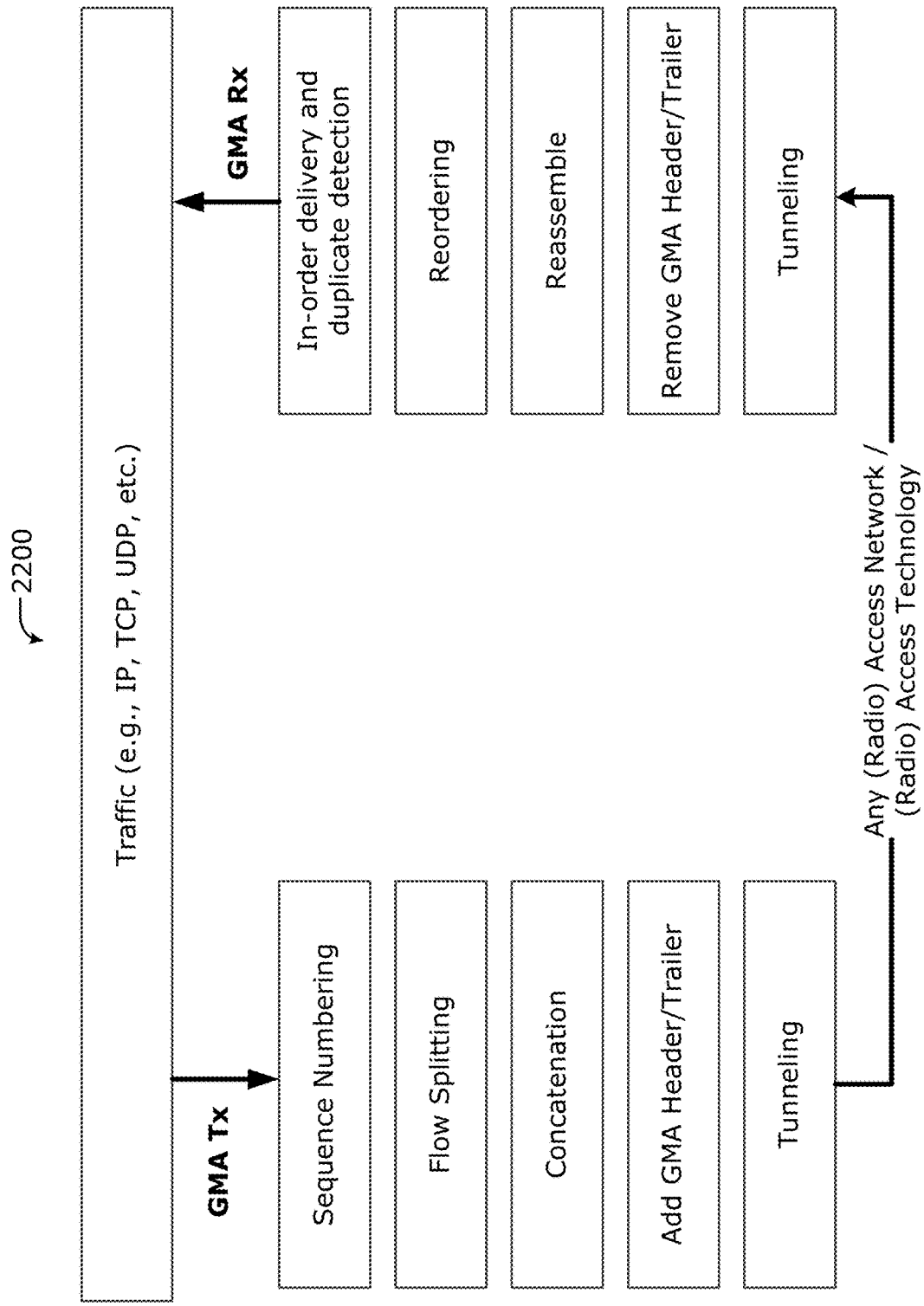
FIG. 22 depicts an example of GMA data plane functionalities.

FIG. 22 shows functionalities of a GMA data plane entity 2200. The GMA data plane entity 2200 corresponds to the Gs 2140 and/or the Gc 2101 discussed previously with respect to FIG. 21 (or corresponds to the GMA data-plane layer within the Gs 2140 and/or the Gc 2101). Here, the GMA data plane acts as a generic convergence layer for any (radio) access network and/or (radio) access technology. The GMA data plane entity 2200 performs various functions such as path quality measurements (QoS, packet loss, latency, etc.), multi-link traffic steering (e.g., traffic splitting/steering, reordering, retransmission, duplication, coding, fragmentation, concatenation, etc.), and QoS-aware traffic shaping and queueing (e.g., priority queuing (PQ), Strict Priority (SP), Weighted Round Robin (WRR), etc.).

The GMA data plane entity 2200 at a GMA Tx prepares traffic (e.g., IP, TCP, UDP, etc.) for transmission to a GMA Rx. The GMA Tx provides sequence number to packets, performs flow (traffic) splitting wherein packets are split or distributed to different multiple access networks (or RATs), simultaneously for delivery to the GMA Rx. The GMA Tx also performs concatenation, which involves putting multiple SDUs into one PDU to reduce packet processing and tunneling overhead, thereby improving signaling and processing efficiency. The GMA Tx also adds a GMA header or trailer to the packet(s) and performs tunneling by, for example, repackaging the packet according to a suitable GMA tunneling protocol. The packet(s) is/are then transmitted over a suitable access network (e.g, one of the different (R)ANs/(R)ATs discussed herein).

The GMA Rx receives the packet(s) and unpackages the packet(s) according to the tunneling protocol being used, and removes the GMA header/trailer. The GMA Rx also reassembles and reorders the packet(s) that are delivered over multiple access networks based on the sequence numbers provided by the GMA Tx. The GMA Rx then performs duplicate detection to identify (and discard) and duplicate packets, and then delivers, in-order, the reassembled and reordered packet(s) to higher layers Additionally or alternatively, the GMA data plane entity 2200 provides lossless switching, which involves the retransmission and/or recovery of packets that may be lost when switching from one network access path to another network access path. Additionally or alternatively, the GMA data plane entity 2200 performs or provides path quality measurements, which includes passive and active measurements of QoS parameters such as, for example, packet loss rate, round trip time, among many others (such as the various measurements discussed herein). Additionally or alternatively, the GMA data plane entity 2200 performs other functions such as automatic repeat request (ARQ)-like retransmission, duplication, network coding, traffic shaping/queuing, and/or the like.

FIG. 23 illustrates a client-based GMA data traffic control state machine 2300. The data traffic control state machine 2300 includes the following states:

State 0 (Idle): the (anchor) virtual connection is down.
State 1 (RAT1 only): all data traffic (DL and UL) are delivered over the first (preferred) RAT connection (RAT1).
State 2 (RAT2 only): all data traffic are delivered over the second connection (RAT2).
State 3 (DL over RAT1 & RAT2, UL over RAT2): DL traffic are delivered over both connections, and UL traffic are delivered over the second connection (RAT2).

The data traffic control state machine 2300 includes the following state-transition triggers:

(1) The (anchor) virtual connection is established successfully. This trigger causes a transition from state 0 to state 1.
(2) Congestion is detected over the RAT1 DL and RAT2 Link Success has been declared/detected wherein the last control message over RAT2 was successful. This trigger causes a transition from state 1 to state 3. In some implementations, congestion detection (based on packet loss) is applicable only if the RAT1 Congestion Detection flag is disabled.
(3) Congestion is no longer present over the RAT1 DL (applicable only if the RAT1 Congestion Detection flag is disabled). This trigger causes a transition from state 3 to state 1.
(4) RAT1 received signal quality (or received signal strength) is relatively poor (e.g. <−75 decibel-milliwatts (dBm)) and/or RAT1 has declared or detected a link failure (or Radio Link Failure (RLF)). The particular mechanism for detecting and/or declaring a link failure (or RLF) is defined by the standards/specifications of RAT1. This trigger causes a transition from state 1 to state 2 or a transition from state 3 to state 2.

(5) The GMA/MAMS operation is terminated or suspended. Termination of the GMA/MAMS operation may include a delivery connection (RAT2 or RAT1) being lost for a predefined period (e.g., 10 minutes or some other amount of time) and/or total throughput is relatively low (e.g., <10 kilobits per second (Kbps)). Suspended GMA/MAMS operation may include a screen being off and/or total throughput is low (e.g., <10 Kbps). This trigger causes a transition from state 1 to state 0 or a transition from state 2 to state 1.

(6) RAT1 received signal quality is relatively good (e.g., >-70 dBm) and RAT1 has detected/declared a Link Success. This trigger causes a transition from state 2 to state 3.

(7) RAT2 has detected/declared a link failure (or RLF). The particular mechanism for detecting and/or declaring a link failure (or RLF) is defined by the standards/specifications of RAT2. This trigger causes a transition from state 3 to state 1 or a transition from state 2 to state 0.

If a link is declared "Link Failure", it should not be used to send any data or control packets, except "Probe/ACK", and the "Link Failure" status can only be turned off after successfully transmitting a probe message over the link.

The following three flows are defined for data traffic:

High Reliability (Flow ID=1): High Reliability traffic will be delivered by duplication over both RAT1 and RAT2 in state 1, 2 and 3. Notice that the receiver will be responsible for detecting and removing duplicated packet based on their sequence number (using the algorithm defined in 6.6.1). Notice that high reliability flow should have low data rate (e.g., <1 Mbps).

Delay Sensitive (Flow ID=2): Delay Sensitive traffic will be delivered over RAT2 only in State 1, 2 and 3.

High Throughput (Flow ID=3): High Throughput (e.g., DL) traffic will be delivered by aggregation over both RAT1 and RAT2 in State 3, and the receiver (Gc) will be responsible for reordering packets using algorithm defined in 6.6.1 or 6.6.2. UL traffic will be delivered by RAT1 in state 1 and by RAT2 in state 2. In state 3, UL traffic will be delivered by RAT2 if the "UL-over-RAT2 flag" is set to "1", and by RAT1 otherwise. The default value of "UL-over-RAT2 flag" is 0 (disabled).

In the example of FIG. 23, RAT1 may be a WLAN RAT (e.g., WiFi) and RAT2 may be a cellular RAT (e.g., 5G/NR, LTE, GSM, GPRS, WiMAX, etc.). The specific RAT protocols may define the mechanisms and/or parameters for determining Link Failures and/or Link Successes.

Figure 24:
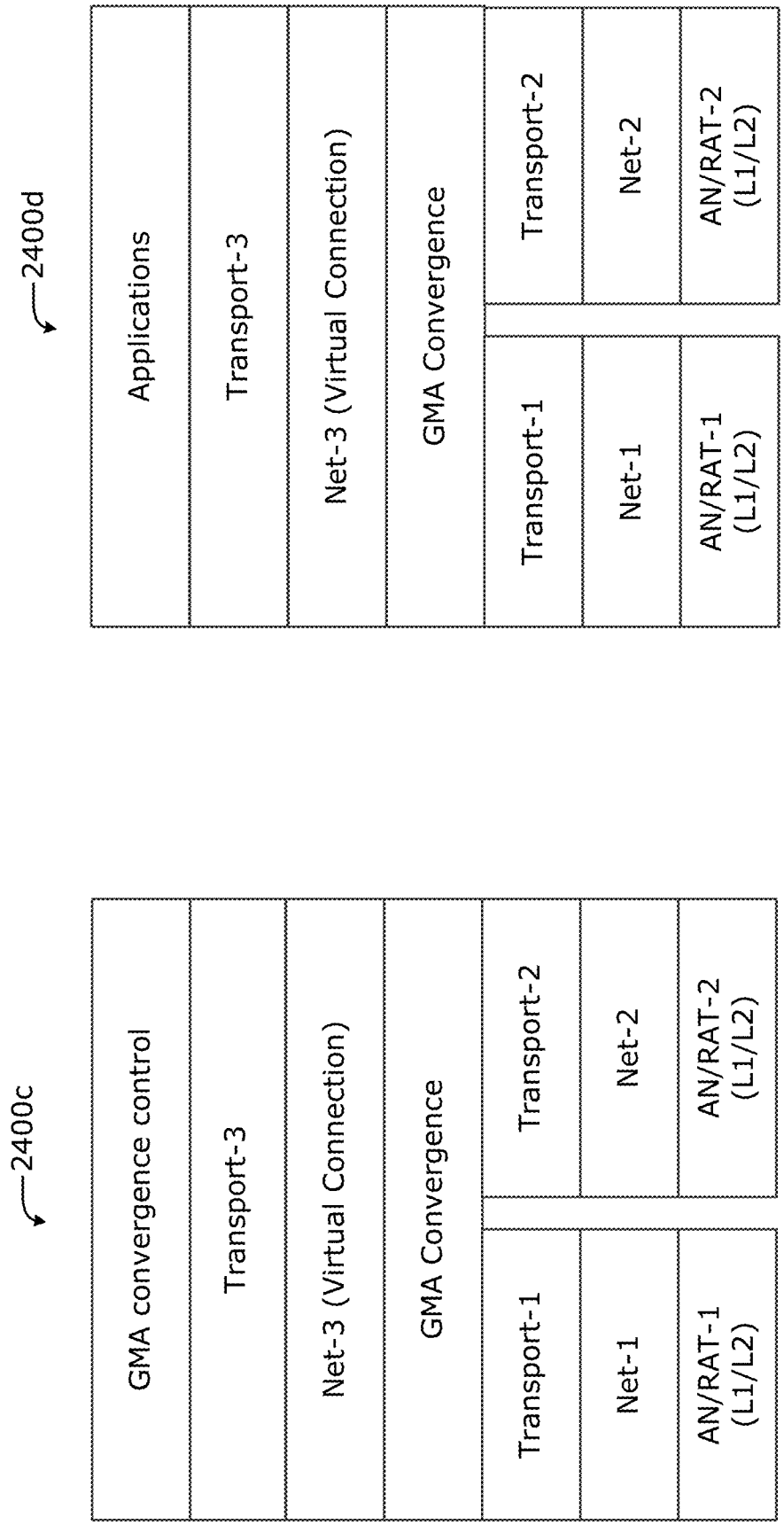
FIG. 24 depicts an example GMA-based data plane protocol stack for OTT MAMS deployments.

FIG. 24 depicts an example GMA convergence control protocol stack 2400c. The GMA convergence control protocol stack 2400c includes a GMA convergence control layer which includes GMA/MAMS control messages. Additionally, a third transport layer (e.g., UDP or IP Security Protocol (IPSec)) tunnel is established over a virtual (anchor) IP connection (IP-3) for sending time-sensitive control messages (e.g., probes, traffic splitting updates, etc.).

The virtual (anchor) IP connection is on top of a GMA convergence layer (also referred to as a "GMA encapsulation layer"). This allows the (virtual) IP packets carrying a GMA control message(s) to be encapsulated with a GMA header, which only includes a 2B Flag field (discussed infra) where the Flag field is set to all "0"s. The GMA encapsulation layer resides on top of respective transport (e.g., UDP or IPSec) tunneling layers for respective access networks (ANs) 1 and 2, which is on top of respective IP layers, which are on top of layer 2 (L2) and Layer 1 (L1) of the respective ANs 1 and 2. The anchor connection is now virtual and no longer tied to any specific access network (e.g., AN1 and AN2 in the example of FIG. 24).

FIG. 24 also shows an example GMA convergence data protocol stack 2400d. The GMA convergence data protocol stack 2400d is similar to the GMA convergence control protocol stack 2400c except that the GMA convergence control layer in the stack 2400c is replaced with an applications layer.

Figure 25:
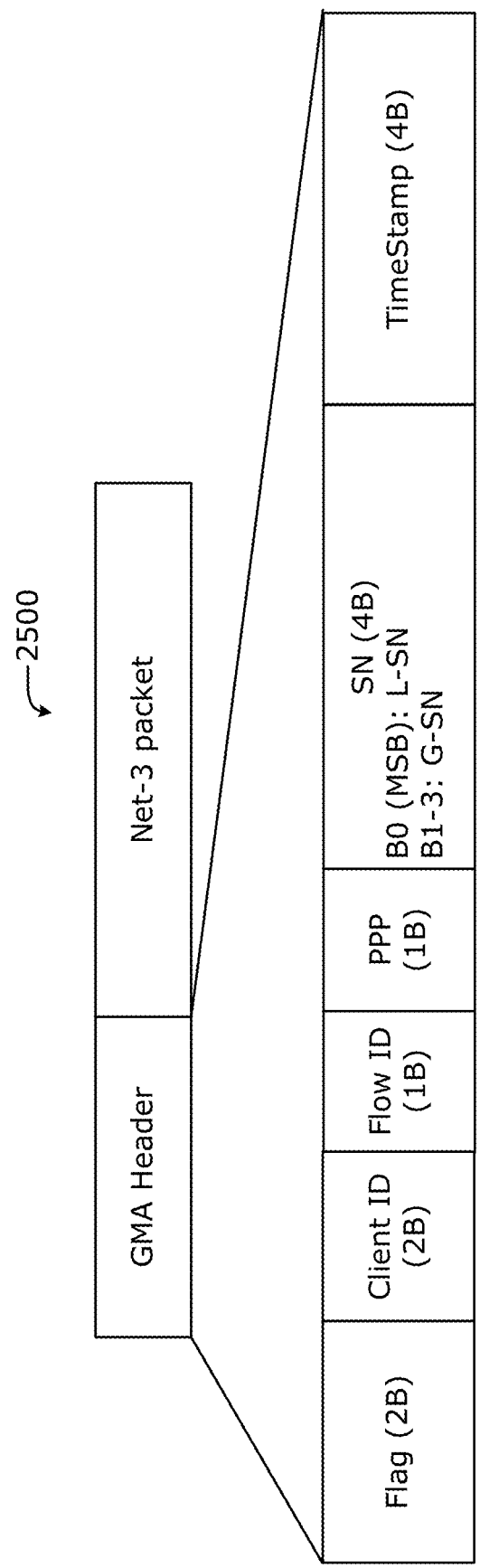
FIG. 25 depicts GMA convergence protocol data unit (PDU) format.

In both stacks stack 2400c, stack 2400d, a new protocol layer, the GMA convergence (also referred to as Trailer-based MAMS convergence [UPMAMS]) layer, is introduced to handle all multi-path (management) related operations (e.g., concatenation, splitting, reordering, duplication, elimination, measurements, etc.). In some implementations, the GMA convergence layer encapsulates the data and/or control messages using a GMA header-based encapsulation format is used as shown in FIG. 25. The GMA convergence encapsulation protocol is discussed in When an access network 110 does not support any MAMS network functions, the virtual connection is established between an end-device (e.g., client device 101) and cloud server or Edge server. This virtual connection may then be used as the anchor connection for cloud applications or Edge applications. The virtual anchor connections may be an IP connection that is used by applications for e2e data transfer. The other connections (e.g., delivery connections) of AN1 and AN2 may be IP connections to deliver user data between the client and server. Additionally, the existing MAMS convergence sublayer functionalities [UPMAMS] can be reused as-is. Additionally or alternatively, the virtual (anchor) connection is established for sending time-sensitive MAMS control/management messages (e.g., probes, traffic splitting updates, etc.) The (virtual) packets carrying a GMA control/management messages are also encapsulated with the GMA header, which is also discussed in more detail infra FIG. 25 depicts GMA convergence protocol data unit (PDU) format 2500. The PDU 2500 includes a GMA header and an IP packet. The GMA header is discussed in more detail infra. In this example, the PDU 2500 includes a flag field (2 bits (B), a client ID field (2B), a flow ID field (1B), a Per-Packet Priority (PPP) field 1B), a sequence number (SN) field (4B), and a timestamp field (4B) as follows where Bit 0 is the most significant bit (MSB) and Bit 15 is the least significant bit (LSB):

Bit #0 (MSB): Client ID
Bit #1: Flow ID
Bit #2: PPP (Per-Packet Priority)
Bit #3: Sequence Number (B0: L-SN, B1-B3: G-SN).
Bit #4: Timestamp
Bit #13~15: GMA protocol (e.g., "0x07")

The B0 of the SN field includes is an L-SN (sub)field and B1-B3 of the SN field is a G-SN (sub)field. The G-SN is for reordering and the L-SN is for packet loss measurement.

The (2B) flag field indicates what additional fields are included in the GMA header. The following bits in the flag field may include a first value if the packet 2500 carries downlink data (e.g., "0xF807"), a second value if the packet carries uplink data (e.g., "0x7807"), a third value if the packet 2500 carries an encrypted control message (e.g., "0x800F"), or a fourth value if the packet 2500 carries an un encrypted control message (e.g., "0x0000"). Additionally or alternatively, if the packet 2500 carries uplink data, the "Client ID" field is not be included in the GMA header.

Additionally or alternatively, if the packet 2500 carries an encrypted control message, it may include the following fields:

Bit #0 (MSB): Client ID
Bit #12: Encryption Enabled
Bit #13~15: GMA protocol (e.g., "0x07").

As shown in FIGS. 3, 24, and 25, there are three different network addresses (e.g., IP addresses) and three transport connections (e.g., UDP, TCP, etc.) for each client in a GMA system. The network address (e.g., IP address) of each delivery connection on the client is configured by a respective access network. All other network addresses (e.g., IP address) and transport portd (e.g., UDP, TCP ports, or the like) are configured in the GMA system through either client configuration or MAMS messages.

1.6.1. GMA Encapsulation Methods and Formats

The GMA encapsulation protocol supports the following three methods: trailer-based IP encapsulation; header-based IP encapsulation; and (header-based) non-IP encapsulation. Trailer-based IP encapsulation should be used as long as implementation allows. Header-based encapsulation should be used if trailered-based encapsulation is not feasible due to any reason (e.g., implementation constraints). In this case, if the adaptation layer (e.g., UDP tunnelling) supports non-IP packet format, header-based non-IP encapsulation should be used; otherwise, header-based IP encapsulation should be used.

If non-IP encapsulation is configured, GMA header should always be present in every packet. In comparison, if IP encapsulation is configured, GMA header or trailer may be added dynamically on per-packet basis, and it indicates the presence of GMA header (or trailer) to set the protocol type of the GMA PDU to "114".

Figure 26:
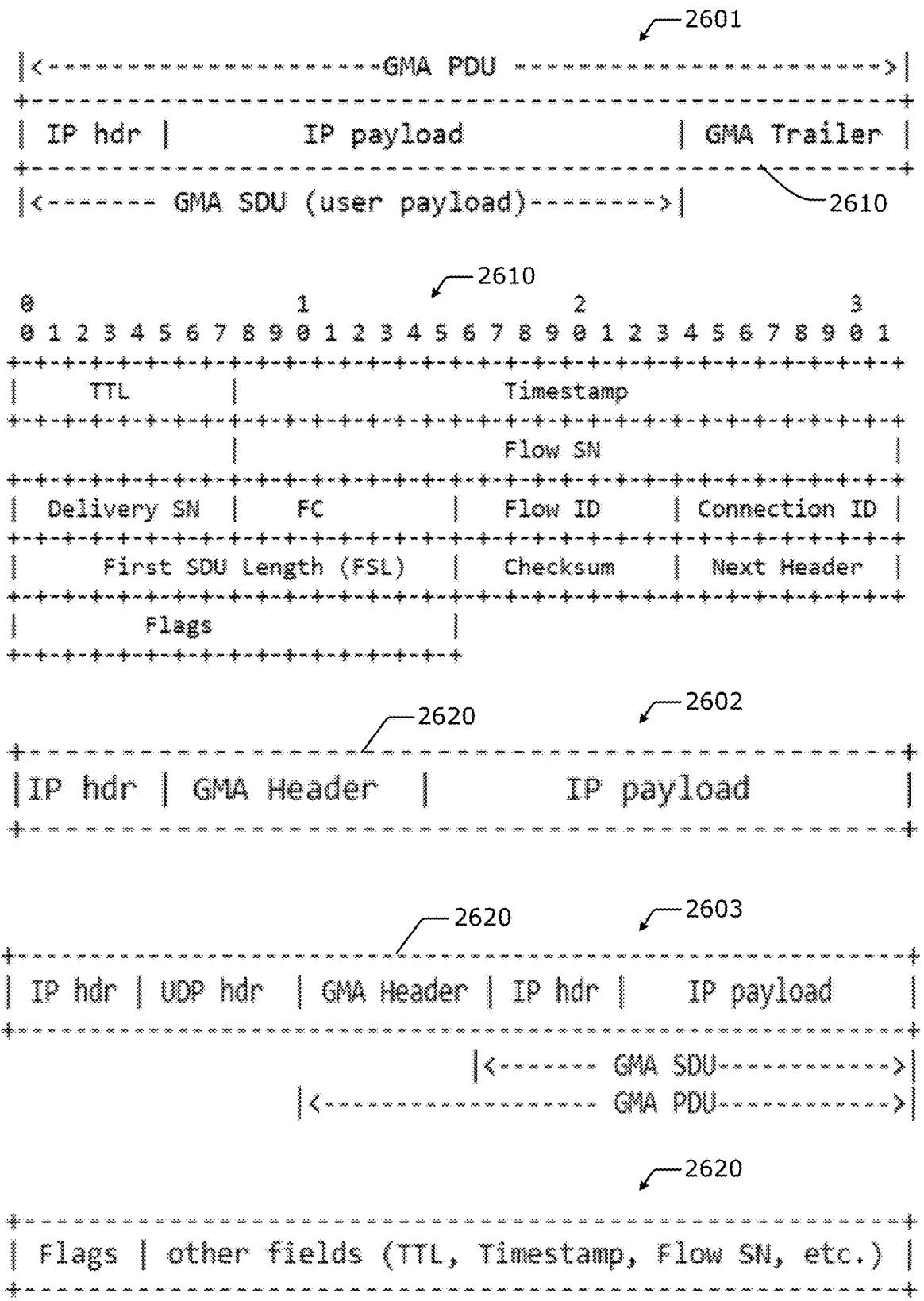
FIG. 26 illustrates various GMA packet formats.

The GMA endpoints may configure the encapsulation method through control signaling (see e.g., FIG. 2) or pre-configuration. For example, an "MX UP Setup Configuration Request" message as discussed in [RFC8743] includes the "MX Convergence Method Parameters," which provides the list of parameters to configure the convergence layer, and can be extended to indicate the GMA encapsulation method. A "GMA encapsulation format" parameter may be included to indicate one of the three GMA encapsulation methods FIG. 26 shows various GMA Protocol Data Unit (PDU) formats including a GMA PDU Format with Trailer-based IP Encapsulation 2601, a GMA PDU Format with Header-based IP Encapsulation 2602, and a GMA PDU Format with Non-IP Encapsulation 2603. Each GMA PDU (regardless of the particular format used) may carry one or more IP packets (also referred to as (GMA) service data units (SDUs)), or a fragment of an IP packet (or (GMA) SDU fragment), in the payload section of the PDU.

The GMA PDU 2601 includes an IP header, IP payload, and a GMA trailer 2610. The other GMA PDUs 2602 and 2603 include a GMA header 420 instead of the GMA trailer 2610. The GMA trailer 2610 and GMA header 2620 include various GMA control fields. Usually, the trailer-based IP encapsulation GMA PDU 2601 is used as long as implementation allows/permits.

However, the header-based encapsulation PDUs 2602 and 2603 may be used if the GMA control fields cannot be added at the end of the packets.

1.6.1.1. Trailer-Based IP Encapsulation

For the trailer-based GMA PDU 2601, the Protocol Type field in the IP header is changed to "114" (any 0-hop protocol) to indicate the presence of the GMA trailer 2610.

If the original IP packet is IPv4, the following three IP header fields may be changed:
 IP length field—add the length of the "GMA Trailer" to the length of the original IP packet;
 Time to Live (TTL)—set the TTL field to "1";
 IP checksum field—recalculate IP checksum after changing the "Protocol Type" field, "TTL", and "IP Length".

If the original IP packet is Ipv6, the following two IP header fields may be changed:
 IP length field—add the length of the "GMA Trailer" to the length of the original IP packet;
 Hop Limit (HL) field—set the HL field to "0".

If UDP tunnelling is used at the adaptation layer to carry the GMA PDU 2601, 2602 or 2603, these three IP header fields may remain unchanged, and the Rx will determine the GMA PDU length based on the UDP packet length.

FIG. 26 also shows an example format of the GMA trailer 2610, which shows various control fields present. The GMA trailer 2610 includes one or more mandatory fields and zero or more optional fields. The mandatory fields include the "flags" field and "next header" field, which are the last 3 bytes of the GMA trailer 2610. The Next Header field (1 Byte) indicates the IP protocol type of the (first) SDU in a PDU, and it stores the value before it was overwritten to '114.' For the Flags field (2 Bytes), Bit 0 is the most significant bit (MSB), and Bit 15 is the least significant bit (LSB). The Flags field includes the following fields: Checksum Present (bit 0): If the Checksum Present bit is set to 1, then the Checksum field is present; Concatenation Present (bit 1): If the Concatenation Present bit is set to 1, then the PDU carries multiple SDUs, and the First SDU Length field is present; Connection ID Present (bit 2): If the Connection ID Present bit is set to 1, then the Connection ID field is present; Flow ID Present (bit 3): If the Flow ID Present bit is set to 1, then the Flow ID field is present; Fragmentation Present (bit 4): If the Fragmentation Present bit is set to 1, then the PDU carry a fragment of the SDU and the Fragmentation Control field is present; Delivery SN Present (bit 5): If the Delivery Sequence Number (SN) Present bit is set to 1, then the Delivery SN field is present and contains the valid information; Flow SN Present (bit 6): If the Flow SN Present bit is set to 1, then the Sequence Number field is present; Timestamp Present (bit 7): If the Timestamp Present bit is set to 1, then the Timestamp field is present; TTL Present (bit 8): If the TTL Present bit is set to 1, then the TTL field is present; Reserved (bit 9-12): set to "0" and ignored on receipt; Version (bit 13~15): GMA version number, set to 0 for the GMA encapsulation protocol specified in [GMA09]. The Flags field is at the end of the PDU and the Next Header field is the second to last field. The GMA Rx may decode the Flags field first to determine the length of the GMA trailer, and then decodes the one or more optional fields included in the GMA PDU (discussed infra).

The GMA trailer 2610 may also include zero or more of the following optional fields: Checksum (1 Byte) to contain the (one's complement) checksum sum of all the 8 bits in the trailer 2610 (for purposes of computing the checksum, the value of the checksum field is Zero; this field is present only if the Checksum Present bit is set to one); First SDU Length (2 Bytes) indicates the length of the first IP packet in the PDU, only included if a PDU contains multiple IP packets (e.g., this field is present only if the Concatenation Present bit is set to one); Connection ID (1 Byte) includes an unsigned integer to identify the anchor and/or delivery connection of the GMA PDU (e.g., this field is present only if the Connection ID Present bit is set to one): the Anchor Connection ID data element/field (MSB 4 Bits of the Connection ID field) is an unsigned integer to identify the anchor connection, and the Delivery Connection ID data element/field (LSB 4 Bits of the Connection ID field) is an unsigned integer to identify the delivery connection; Flow ID (1 Byte) includes an unsigned integer to identify the IP flow that a PDU belongs to, for example, Data Radio Bearer (DRB) ID [LWIPEP] for a cellular (e.g. LTE, 5G/NR, etc.) connection (e.g., this field is present only if the Flow ID Present bit is set to one); Fragmentation Control (FC) (e.g. 1 Byte) to provide necessary information for re-assembly, only needed if a PDU carries fragments (e.g., this field is present only if the Fragmentation Present bit is set to one; see e.g., section 5 in [GMA09]); Delivery SN (1 Byte) includes an auto-incremented integer to indicate the GMA PDU transmission order on a delivery connection (e.g., the Delivery SN may be needed to measure packet loss of each delivery connection and therefore generated per delivery connection per flow; e.g., this field is present only if the Delivery SN Present bit is set to one); Flow SN (3 Bytes) includes an auto-incremented integer to indicate the GMA SDU (e.g., IP packet) order of a flow (e.g., the flow SN may be needed for retransmission, reordering, and fragmentation; the flow SN may be generated per flow; e.g., this field is present only if the Flow SN Present bit is set to one; Timestamp (4 Bytes) to contain the current value of the timestamp clock of the Tx in the unit of 1 millisecond. This field is present only if the Timestamp Present bit is set to one; and TTL (1 Byte) to contain the TTL value of the original IP header if the GMA SDU is IPv4, or the Hop-Limit value of the IP header if the GMA SDU is IPv6 (e.g., field is present only if the TTL Present bit is set to one). The GMA control fields follow the bit order in the flags field (e.g., Bit 0 (MSB) of the flags field is the checksum present bit, and the checksum field is the last in the trailer 2610 except for the two mandatory fields; Bit 1 is the concatenation present bit and the FSL field is the second to last, and so forth).

1.6.1.2. Header-Based IP Encapsulation

FIG. 26 also shows the header-based IP encapsulation format 2602. Here, the GMA header 2620 is inserted right after the IP header of the GMA SDU.

FIG. 26 also shows an example GMA header (hdr) format 2620, which includes the Flags field and the GMA control fields. In comparison to GMA trailer 2610, the only difference is that the Flags field is now in the front so that the Rx can first decode the Flags field to determine the GMA header length. Moreover, the IP header fields of the GMA PDU should be changed in the same way as trailered-based IP encapsulation (as discussed previously). Additionally or alternatively, the TTL, FSL, and Next Header fields are removed from the GMA control fields since the IP header fields of the GMA SDU remain unchanged during encapsulation. The order of the other GMA control fields is/are the same as discussed previously.

In some implementations, if the adaptation layer (e.g., UDP tunnelling or the like) supports a non-IP packet format, the GMA PDU 2602 may be used without modification. If the adaptation layer (see e.g., FIG. 1B) only supports the IP packet format, the header-based IP encapsulation GMA PDU 2603 may be used. In the header-based IP encapsulation PDU 2603, the IP header of the GMA SDU (e.g., IP payload) is moved to the front of the packet so that the GMA PDU 2603 becomes an IP packet, and the IP header fields of the GMA PDU 2603 may be changed in the same manner as the trailer-based IP encapsulation PDU 2601.

The header or trailer based IP encapsulation PDUs 2602, 2601 may be used dynamically on a per-packet basis, and setting the protocol type of the GMA PDU to "114" indicates the presence of the GMA header 2620 in an IP packet.

1.6.1.3. (Header-Based)Non-IP Encapsulation

FIG. 26 also shows the header-based non-IP encapsulation format 2603. Here, "UDP Tunnelling" is configured at the MX adaptation layer. Additionally, the "TTL", "FSL", and "Next Header" are no longer needed. Moreover, the IP header fields of the GMA SDU remain unchanged. If non-IP encapsulation is configured, the GMA header 2620 is also present.

1.6.2. Fragmentation

The convergence layer MAY support fragmentation if a delivery connection has a smaller maximum transmission unit (MTU) than the original IP packet (SDU). The fragmentation procedure at the convergence sublayer is similar to IP fragmentation (see e.g., "DARPA Internet Program Protocol Specification" IETF RFC 791 (September 1981)) in principle, but with the following two differences for less overhead: the fragment offset field is expressed in number of fragments; and the maximum number of fragments per SDU is $2^7$ (=128).

The Fragmentation Control (FC) field in the GMA trailer (or header) contains the following bits: Bit #7: a More Fragment (MF) flag to indicate if the fragment is the last one (0) or not (1); and Bit #0~#6: Fragment Offset (in units of fragments) to specify the offset of a particular fragment relative to the beginning of the SDU.

A PDU carries a whole SDU without fragmentation if the FC field is set to all "0"s or the FC field is not present in the trailer. Otherwise, the PDU contains a fragment of the SDU.

The Flow SN field in the trailer is used to distinguish the fragments of one SDU from those of another. The Fragment Offset (FO) field tells the receiver the position of a fragment in the original SDU. The More Fragment (MF) flag indicates the last fragment.

To fragment a long SDU, the Tx creates n PDUs and copies the content of the IP header fields from the long PDU into the IP header of all the PDUs. The length field in the IP header of PDU should be changed to the length of the PDU, and the protocol type should be changed to 114.

The data of the long SDU is divided into n portions based on the MTU size of the delivery connection. The first portion of the data is placed in the first PDU. The MF flag is set to "1", and the FO field is set to "0". The i-th portion of the data is placed in the i-th PDU. The MF flag is set to "0" if it is the last fragment and set to "1" otherwise. The FO field is set to i−1.

To assemble the fragments of a SDU, the receiver combines PDUs that all have the same Flow SN. The combination is done by placing the data portion of each fragment in the relative order indicated by the Fragment Offset in that fragment's GMA trailer (or header). The first fragment will have the Fragment Offset set to "0", and the last fragment will have the More-Fragments flag set to "0".

GMA fragmentation operates above the IP layer of individual access connection (e.g., RAT1, RAT2, etc.) and between the two end points of convergence layer. The convergence layer end points (client, multi-access gateway) should obtain the MTU of individual connection through either manual configuration or implementing Path MTU Discovery (PMTUD) as suggested in Bonica et al., "IP Fragmentation Considered Fragile", IETF RFC 8900 (September 2020).

1.6.3. Concatenation

The convergence sublayer may support concatenation if a delivery connection has a larger maximum transmission unit (MTU) than the original IP packet (SDU). Only the SDUs with the same client network address (e.g., IP address or the like), and the same Flow ID may be concatenated. If the (trailer or header based) IP encapsulation method is used, the First SDU Length (FSL) field should be included in the GMA trailer (or header) to indicate the length of the first SDU. Otherwise, the FSL field should not be included.

To concatenate two or more SDUs, the Tx creates one PDU and copies the content of the IP header field from the first SDU into the IP header of the PDU. The data of the first SDU is placed in the first portion of the data of the PDU. The whole second SDU is then placed in the second portion of the data of the PDU. The procedure continues till the PDU size reaches the MTU of the delivery connection. If the FSL field is present, the IP length field of the PDU should be updated to include all concatenated SDUs and the trailer (or header), and the IP checksum field should be recalculated if the packet is IPv4.

To disaggregate a PDU, if the (header or trailer based) IP encapsulation method is used, the receiver first obtains the length of the first SDU from the FSL field and decodes the first SDU. The receiver then obtains the length of the second SDU based on the length field in the second SDU IP header and decodes the second SDU. The procedure continues till no byte is left in the PDU. If the non-IP encapsulation method is used, the IP header of the first SDU will not change during the encapsulation process, and the receiver SHOULD obtain the length of the first SDU directly from its IP header.

If a PDU contains multiple SDUs, the Flow SN field is for the last SDU, and the Flow SN of other SDU carried by the same PDU can be obtained according to its order in the PDU. For example, if the SN field is 6 and a PDU contains 3 SDUs (IP packets), the SN is 4, 5, and 6 for the first, second, and last SDU respectively. GMA concatenation can be used for packing small packets of a single application, e.g. TCP ACKs, or from multiple applications. Notice that a single GMA flow may carry multiple application flows (TCP, UDP, etc.).

1.6.4. GMA Protocol Stack

Figure 27:
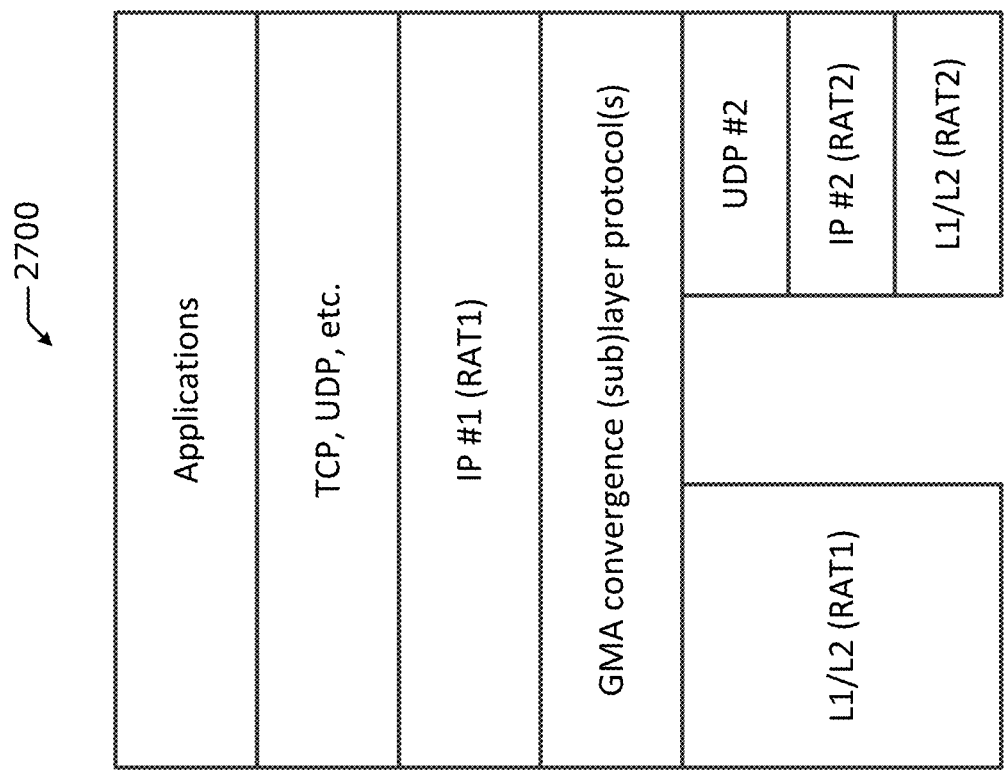
FIG. 27 shows an example GMA-based MAMS data plane protocol stack.

FIG. 27 shows an (anchored) integrated GMA convergence protocol stack 2700. As alluded to previously, GMA data plane functions (e.g., Gc and Gs) may be integrated into one or more existing network functions (e.g., a Gateway (GW), MEC, etc.) to avoid using virtual network interface (e.g., IP #3). FIG. 27 shows the integrated GMA data plane protocol stack 2700 using the RAT1 connection as the anchor connection. As a result, only one UDP tunnel is needed for delivering traffic over the non-anchor connection, which is the RAT2 connection.

In one example, the RAT1 anchor connection is a cellular connection (e.g., 5G/NR, LTE, etc.) and the RAT2 non-anchor connection is a WiFi connection. If using the 5G/LTE connection as the anchor for applications, and the WiFi connection as the delivery connection, UDP tunneling (or IPSec) may be used for delivering 5G/LTE IP traffic over a WiFi network. The GMA convergence sublayer (see also e.g., FIGS. 1A, 1B, 1C) is responsible for multi-path management operations (e.g., lossless switching, aggregation/splitting, etc.). In another example, a virtual IP connection may be used as the anchor, and the server 140 will provide all necessary information through MAMS signaling to configure the virtual IP connection on the client side 101. In the example GMA-MAMS DPPS 2700, the GMA data plane functions (Gc 2101 and Gs 2140) may be integrated into an existing network function (e.g., Gateway, Edge server/host such as a MEC server/host, etc.) to avoid using a virtual network interface.

1.6.5. GMA Configuration Parameters

Some example GMA configuration parameters are as follows:
RAT1 probing interval: 30 seconds
RAT2 probing interval in state 1 and 2: 30 seconds
RAT2 probing interval in state 3: 10 second
RAT2 reconnecting interval: 60 seconds
Low throughput threshold: 10 kBps
Link disconnect timer: 10 minutes
RAT1 signal quality low threshold: −75 dBm
RAT1 signal quality high threshold: −70 dBm
RAT1 packet loss low threshold: 1%
RAT1 packet loss high threshold: 10%
Reordering queue size for High Throughput Flow (Flow ID=3): 1000 packets
Reordering timer for High Throughput Flow (Flow ID=3): 100 ms
Reordering queue size for High Reliability Flow (Flow ID=1): 20 packets
Reordering timer for High Reliability Flow (Flow ID=1): 10 ms
Measurement Interval (MI): 30 seconds
Reporting Interval (RI): 50 (MIs)
Default Flow ID (DFI): 3
Control message retransmission limit: 3
Virtual NIC MTU size: 1400 (bytes)
Idle Timer: 1 minute
Timestamp unit: 1000 (us)
UL-over-LTE flag: 0 (disabled, default)/1 (enabled)
Wi-Fi Congestion Detection flag: 0 (disabled, default)/1 (enabled)
Power Save flag: 0 (disabled, default)/1 (enabled)
Both Gc and Gs maintain the following (per-client) parameter(s):
Start_Time: the duration between now and next "time zero" when Start_Time is reset (in the unit of 1 ms).
tx_timeStamp: a timestamp of when a packet is transmitted.
rx_timeStamp: a timestamp of when a packet is received.
Sync_Guard_Time: configurable parameter that controls how long Gc or Gs should wait before starting measurements (based on timestamp info in received packet (s)).

Gc and Gs reset their respective "Start_Time" immediately after the successful exchange of mx_session_resume_req/rsp, and the (tx) timestamp parameter in a control message indicates the duration between transmitting the message and resetting Start_Time.

In the above example, RAT1 is a WLAN connection/RAT (e.g., WiFi or the like) and RAT2 is a cellular connection/RAT (e.g., LTE, 5G/NR, GSM, WiMAX, or the like).

1.6.6. GMA Deployment Scenarios

Some example GMA based deployments may be as follows:

In a first GMA deployment, GMA client modules (e.g., GMA Gc and/or CCM 206) may be implemented as a "multi-home VPN" application and run on a UE (e.g., smartphone, tablet, PC, etc.) without any impact to platform or operation system.

In a second GMA deployment, the GMA server modules (e.g., GMA Gs and/or NCM 236) may be implemented as an "Edge/cloud server" application (e.g., MEC app or the like) and run in the Edge or cloud server without any impact to platform or operation system. If running GMA server on the Edge, the traffic routing policy may be configured on the Edge platform such that the following three flows are routed locally to the Edge platform:

TCP flow (for MAMS management messages): IP #1 (or IP #2)+TCP #1

UDP flow (for tunneling traffic over the $1^{st}$ delivery connection): IP #1+UDP #1

UDP flow (for tunneling traffic over the second delivery connection): IP #2+UDP #2

Moreover, a DNS configuration may be added to the Edge platform such that "gmaserver.mec.com" is mapped to IP #1 and IP #2 over the two delivery connections, respectively.

2. Edge Computing System Configurations and Arrangements

Edge computing refers to the implementation, coordination, and use of computing and resources at locations closer to the "Edge" or collection of "Edges" of a network. Deploying computing resources at the network's Edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform Edge computing operations (referred to as "Edge compute nodes," "Edge nodes," or the like) can reside in whatever location needed by the system architecture or ad hoc service. In many Edge computing architectures, Edge nodes are deployed at NANs, gateways, network routers, and/or other devices that are closer to endpoint devices (e.g., UEs, IoT devices, etc.) producing and consuming data. As examples, Edge nodes may be implemented in a high performance compute data center or cloud installation; a designated Edge node server, an enterprise server, a roadside server, a telecom central office; or a local or peer at-the-Edge device being served consuming Edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various Edge system arrangements/architecture treats VMs, containers, and functions equally in terms of application composition. The Edge nodes are coordinated based on Edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for Edge computing include but are not limited to virtualization of traditional network functions including include, for example, Software-Defined Networking (SDN), Network Function Virtualization (NFV), distributed RAN units and/or RAN clouds, and the like. Additional example use cases for Edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to Edge computing configurations provided within Multi-Access Edge Computing (MEC) and 5G network implementations. However, many other standards and network implementations are applicable to the Edge and service management concepts discussed herein. Additionally or alternatively, many other Edge computing/networking technologies in various combinations and layouts of devices located at the Edge of a network may be used. Examples of such other Edge computing/networking technologies include Content Delivery Networks (CDNs) (also referred to as "Content Distribution Networks" or the like); Mobility Service Provider (MSP) Edge computing and/or Mobility as a Service (MaaS) provider systems (e.g., used in AECC architectures); Nebula Edge-cloud systems; Fog computing systems; Cloudlet Edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT Edge network systems and configurations, and other intermediate processing entities and architectures may also be used.

FIG. 28 illustrates a MEC system reference architecture (or MEC architecture) 2800 providing functionalities in accordance with ETSI GS MEC 003 v2.1.1 (2019 January) ("[MEC003]"); ETSI GS MEC 009 V2.1.1 (2019 January) ("[MEC009]"); ETSI GS MEC 011 V1.1.1 (2017 July) ("[MEC011]"); ETSI GS MEC 012 V2.1.1 (2019 December) ("[MEC012]"); ETSI GS MEC 013 v2.1.1 (2019 September) ("[MEC013]"); ETSI GS MEC 014 V1.1.1 (2018 Febuary) ("[MEC014]"); ETSI GS MEC 015 v2.1.1 (2020 June) ("[MEC015]"); ETSI GS MEC 028 v2.1.1 (2020 June) ("[MEC028]"); ETSI GS MEC 029 v2.1.1 (2019 July) ("[MEC029]"); ETSI MEC GS 030 v2.1.1 (2020 April) ("[MEC030]"); among many other ETSI MEC standards. MEC offers application developers and content providers cloud-computing capabilities and an IT service environment at the Edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP C-V2X based protocols) need to exchange data, provide data to aggregation points and access to data in databases which provide an overview of the local situation derived from a multitude of sensors (by various cars, roadside units, etc.).

The MEC architecture 2800 includes MEC hosts 2802, a virtualization infrastructure manager (VIM) 2808, an MEC platform manager 2806, an MEC orchestrator 2810, an operations support system (OSS) 2812, a user app proxy 2814, a UE app 2818 running on UE 2820, and CFS portal 2816. The MEC host 2802 can include a MEC platform 2832 with filtering rules control component 2840, a DNS handling component 2842, a service registry 2838, and MEC services 2836. The MEC services 2836 can include at least one scheduler, which can be used to select resources for instantiating MEC apps (or NFVs) 2826 upon virtualization infrastructure (VI) 2822. The MEC apps 2826 can be configured to provide services 2830, which can include processing network communications traffic of different types associated with one or more wireless connections (e.g., connections to one or more RANs or core network functions) and/or some other services such as those discussed herein. The other MEC host 2802 may have a same or similar configuration/implementation as the MEC host 2802, and the other MEC app 2826 instantiated within other MEC host 2802 can be similar to the MEC apps 2826 instantiated within MEC host 2802. The VI 2822 includes a data plane 2824 coupled to the MEC platform 2822 via an MP2 interface. Additional interfaces between various network entities of the MEC architecture 2800 are illustrated in FIG. 28.

The MEC system 2800 includes three groups of reference points, including "Mp" reference points regarding the MEC platform functionality; "Mm" reference points, which are management reference points; and "Mx" reference points, which connect MEC entities to external entities. The interfaces/reference points in the MEC system 2800 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces.

The logical connections between various entities of the MEC architecture 2800 may be access-agnostic and not dependent on a particular deployment. MEC enables implementation of MEC apps 2826 as software-only entities that run on top of a VI 2822, which is located in or close to the network Edge. A MEC app 2826 is an application that can be instantiated on a MEC host 2802 within the MEC system 2800 and can potentially provide or consume MEC services 2836.

The MEC entities depicted by FIG. 28 can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE 2820, and is discussed in more detail infra. The MEC host level includes one or more MEC hosts 2802, 2804 and MEC management entities, which provide functionality to run MEC Apps 2826 within an operator network or a subset of an operator network. The MEC management entities include various components that handle the management of the MEC-specific functionality of a particular MEC platform 2832, MEC host 2802, and the MEC Apps 2826 to be run.

The MEC platform manager 2806 is a MEC management entity including MEC platform element management component 2844, MEC app rules and requirements management component 2846, and MEC app lifecycle management component 2848. The various entities within the MEC architecture 2800 can perform functionalities as discussed in [MEC003]. The remote app 2850 is configured to communicate with the MEC host 2802 (e.g., with the MEC apps 2826) via the MEC orchestrator 2810 and the MEC platform manager 2806.

The MEC host 2802 is an entity that contains an MEC platform 2832 and VI 2822 which provides compute, storage, and network resources for the purpose of running MEC Apps 2826. The VI 2822 includes a data plane (DP) 2824 that executes traffic rules 2840 received by the MEC platform 2832, and routes the traffic among MEC Apps 2826, MEC services 2836, DNS server/proxy (see e.g., via DNS handling entity 2842), 3GPP network, local networks, and external networks. The MEC DP 2824 may be connected with the (R)AN nodes and the 3GPP core network, and/or may be connected with an access point via a wider network, such as the internet, an enterprise network, or the like.

The MEC platform 2832 is a collection of essential functionality required to run MEC Apps 2826 on a particular VI 2822 and enable them to provide and consume MEC services 2836, and that can provide itself a number of MEC services 937a. The MEC platform 2832 can also provide various services and/or functions, such as offering an environment where the MEC Apps 2826 can discover, advertise, consume and offer MEC services 2836 (discussed infra), including MEC services 2836 available via other platforms when supported. The MEC platform 2832 may be able to allow authorized MEC Apps 2826 to communicate with third party servers located in external networks. The MEC platform 2832 may receive traffic rules from the MEC platform manager 2806, applications, or services, and instruct the data plane accordingly (see e.g., Traffic Rules Control 2840). The MEC platform 2832 may send instructions to the DP 2824 within the VI 2822 via the Mp2 reference point. The Mp2 reference point between the MEC platform 2832 and the DP 2824 of the VI 2822 may be used to instruct the DP 2834 on how to route traffic among applications, networks, services, etc. The MEC platform 2832 may translate tokens representing UEs 2820, UE apps, individual sessions, and/or individual flows within a session in the traffic rules into specific network addresses (e.g., IP addresses or the like). The MEC platform 2832 also receives DNS records from the MEC platform manager 2806 and configures a DNS proxy/server accordingly. The MEC platform 2832 hosts MEC services 2836 including the multi-access Edge services discussed infra, and provide access to persistent storage and time of day information. Furthermore, the MEC platform 2832 may communicate with other MEC platforms 2832 of other MEC servers 2802 via the Mp3 reference point. Upon receipt of update, activation or deactivation of traffic rules from the MEC platform manager 2806, apps, or services, the MEC platform 2832 instructs the data plane 2824 accordingly. The MEC platform 2832 also receives DNS records from the MEC platform manager 2806 and uses them to configure a DNS proxy/server 2842. The traffic rules control 2840 allows the MEC platform 2832 to perform traffic routing including traffic rules update, activation, and deactivation. Additionally or alternatively, the traffic rules control 2840 allows the MEC platform 2832 to perform traffic steering, for example, by directing data packets over one or more access network connections in a multi-access environment comprising multiple access networks, each of which may have multiple access network connections and/or may implement different access technologies.

The VI 2822 represents the totality of all hardware and software components which build up the environment in which MEC Apps 2826 and/or MEC platform 2832 are deployed, managed and executed. The VI 2822 may span across several locations, and the network providing connectivity between these locations is regarded to be part of the VI 2822. The physical hardware resources of the VI 2822 includes computing, storage and network resources that provide processing, storage and connectivity to MEC Apps 2826 and/or MEC platform 2832 through a virtualization layer (e.g., a hypervisor, VM monitor (VMM), or the like). The virtualization layer may abstract and/or logically partition the physical hardware resources of the MEC server 2802 as a hardware abstraction layer. The virtualization layer may also enable the software that implements the MEC Apps 2826 and/or MEC platform 2832 to use the underlying VI 2822, and may provide virtualized resources to the MEC Apps 2826 and/or MEC platform 2832, so that the MEC Apps 2826 and/or MEC platform 2832 can be executed.

The MEC Apps 2826 are applications that can be instantiated on a MEC host/server 2802 within the MEC system 2800 and can potentially provide or consume MEC services 2836. The term "MEC service" refers to a service provided via a MEC platform 2832 either by the MEC platform 2832 itself or by a MEC App 2826. MEC Apps 2826 may run as a VM on top of the VI 2822 provided by the MEC server 2802, and can interact with the MEC platform 2832 to consume and provide the MEC services 2836. The Mp1 reference point between the MEC platform 2832 and the MEC Apps 2826 is used for consuming and providing service specific functionality. Mp1 provides service registration 2838, service discovery, and communication support for various services, such as the MEC services 2836 provided by MEC host 2802. Mp1 may also provide application availability, session state relocation support procedures, traffic rules and DNS rules activation, access to persistent storage and time of day information, and/or the like. Additionally or alternatively, the MEC Apps 2826 may communicate with the MEC platform 2832 using the MEC APIs discussed in ETSI GS MEC 011 V2.1.1 (2019 November).

The MEC Apps 2826 are instantiated on the VI 2822 of the MEC server 2802 based on configuration or requests validated by the MEC management (e.g., MEC platform manager 2806). The MEC Apps 2826 can also interact with the MEC platform 2832 to perform certain support procedures related to the lifecycle of the MEC Apps 2826, such as indicating availability, preparing relocation of user state, etc. The MEC Apps 2826 may have a certain number of rules and requirements associated to them, such as required resources, maximum latency, required or useful services, etc. These requirements may be validated by the MEC management, and can be assigned to default values if missing. MEC services 2836 are services provided and/or consumed either by the MEC platform 2832 and/or MEC Apps 2826. The service consumers (e.g., MEC Apps 2826 and/or MEC platform 2832) may communicate with particular MEC services 2836 over individual APIs (including MEC V2X API and the other MEC APIs discussed herein). When provided by an application, a MEC service 2836 can be registered in a list of services in the service registries 2838 to the MEC platform 2832 over the Mp1 reference point. Additionally, a MEC App 2826 can subscribe to one or more services 2830/2836 for which it is authorized over the Mp1 reference point.

Examples of MEC services 2836 include V2X information services (VIS), RNIS (see e.g., [MEC012], Location Services [MEC013], UE identity services [MEC014], Traffic Management Services (TMS) and BWMS [MEC015], WLAN Access Information (WAI) services [MEC028], Fixed Access Information (FAI) services [MEC029], and/or other MEC services. The RNIS, when available, provides authorized MEC Apps 2826 with radio network related information, and expose appropriate up-to-date radio network information to the MEC Apps 2826. The RNI may include, inter alia, radio network conditions, measurement and statistics information related to the UP, information related to UEs 2820 served by the radio node(s) associated with the MEC host 2802 (e.g., UE context and radio access bearers), changes on information related to UEs 2820 served by the radio node(s) associated with the MEC host XE136, and/or the like. The RNI may be provided at the relevant granularity (e.g., per UE 2820, per cell, per period of time).

The service consumers (e.g., MEC Apps 2826, MEC platform 2832, etc.) may communicate with the RNIS over an RNI API to obtain contextual information from a corresponding RAN. RNI may be provided to the service consumers via a NAN (e.g., (R)AN node, RRH, AP, etc.). The RNI API may support both query and subscription (e.g., a pub/sub) based mechanisms that are used over a Representational State Transfer (RESTful) API or over a message broker of the MEC platform 2832 (not shown). A MEC App 2826 may query information on a message broker via a transport information query procedure, wherein the transport information may be pre-provisioned to the MEC App 2826 via a suitable configuration mechanism. The various messages communicated via the RNI API may be in XML, JSON, Protobuf, or some other suitable format.

The VIS provides supports various V2X applications including the journey-aware QoS predictions among many others. The RNI may be used by MEC Apps 2826 and MEC platform 2832 to optimize the existing services and to provide new types of services that are based on up to date information on radio conditions. As an example, a MEC App 2826 may use RNI to optimize current services such as video throughput guidance. In throughput guidance, a radio analytics MEC App 2826 may use MEC services to provide a backend video server with a near real-time indication on the throughput estimated to be available at the radio DL interface in a next time instant. The throughput guidance radio analytics application computes throughput guidance based on the required radio network information it obtains from a multi-access Edge service running on the MEC server 2802. RNI may be also used by the MEC platform 2832 to optimize the mobility procedures required to support service continuity, such as when a certain MEC App 2826 requests a single piece of information using a simple request-response model (e.g., using RESTful mechanisms) while other MEC Apps 2826 subscribe to multiple different notifications regarding information changes (e.g., using a pub/sub mechanism and/or message broker mechanisms).

The LS, when available, may provide authorized MEC Apps 2826 with location-related information, and expose such information to the MEC Apps 2826. With location related information, the MEC platform 2832 or one or more MEC Apps 2826 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 2820 currently served by the radio node(s) associated with the MEC server 2802, information about the location of all UEs 2820 currently served by the radio node(s) associated with the MEC server XE136, information about the location of a certain category of UEs 2820 currently served by the radio node(s) associated with the MEC server XE136, a list of UEs 2820 in a particular location, information about the location of all radio nodes currently associated with the MEC host 2802, and/or the like. The location information may be in the form of a geolocation, a Global Navigation Satellite Service (GNSS)

coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 2802, or a subset thereof, according to a desired deployment. In this regard, the OMA Zonal Presence API provides means for MEC Apps 2826 to retrieve information about a zone, the access points associated to the zones and the users that are connected to the access points. In addition, the OMA Zonal Presence API, allows authorized application to subscribe to a notification mechanism, reporting about user activities within a zone. A MEC server 2802 may access location information or zonal presence information of individual UEs 2820 using the OMA Zonal Presence API to identify the relative location or positions of the UEs 2820.

The TMS allows Edge applications to get informed of various traffic management capabilities and multi-access network connection information, and allows Edge applications to provide requirements, e.g. delay, throughput, loss, for influencing traffic management operations. In some implementations, the TMS includes Multi-Access Traffic Steering (MTS), which seamlessly performs steering, splitting, and duplication of application data traffic across multiple access network connections. The BWMS provides for the allocation of bandwidth to certain traffic routed to and from MEC Apps 2826, and specify static/dynamic up/down bandwidth resources, including bandwidth size and bandwidth priority. MEC Apps 2826 may use the BWMS to update/receive bandwidth information to/from the MEC platform 2832. Different MEC Apps 2826 running in parallel on the same MEC server 2802 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism. The BWM service is for allocating/adjusting BW resources for MEC apps, and allows MEC apps to provide their BW requirements.

Different MEC applications (apps) running in parallel on the same MEC host may require specific static/dynamic up/down bandwidth (BW) resources, including BW size and BW priority. In some cases different sessions running in parallel on the same app may each have specific BW requirements. In addition, sessions driven by Apps running from closer to end users (e.g., shorter RTT) may receive unfair advantage over session driven by apps running from distant locations (e.g., outside the RAN). To resolve potential resource conflicts between such competing applications, BWM and/or Multi-access Traffic Steering (MTS) services may be used.

The MTS services may be provided as part of the BWMS or separately from the BWMS. The MTS service is for seamlessly steering/splitting/duplicating app data traffic across multiple access network connections. The MTS service allows apps/MEC apps to get informed of various MTS capabilities and MX network connection info. The MTS also allows MEC apps to provide requirements (e.g., delay, throughput, loss, etc.) for influencing traffic management operations. The specific session or app/MEC app may be identified using a set of filters and/or identifiers (IDs) within the resource request.

The purpose of the UE Identity feature is to allow UE specific traffic rules in the MEC system 2800. When the MEC system 2800 supports the UE Identity feature, the MEC platform 2832 provides the functionality (e.g., UE Identity API) for a MEC App 2826 to register a tag representing a UE 2820 or a list of tags representing respective UEs 2820. Each tag is mapped into a specific UE 2820 in the MNO's system, and the MEC platform 2832 is provided with the mapping information. The UE Identity tag registration triggers the MEC platform 2832 to activate the corresponding traffic rule(s) 2840 linked to the tag. The MEC platform 2832 also provides the functionality (e.g., UE Identity API) for a MEC App 2826 to invoke a de-registration procedure to disable or otherwise stop using the traffic rule for that user.

The WAIS is a service that provides WLAN access related information to service consumers within the MEC System 2800. The WAIS is available for authorized MEC Apps 2826 and is discovered over the Mp1 reference point. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System 2800. The FAIS is available for the authorized MEC Apps 2826 and is discovered over the Mp1 reference point. The FAI may be used by MEC Apps 2826 and the MEC platform 2832 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 2826 and the MEC platform 2832 may consume the FAIS; and both the MEC platform 2832 and the MEC Apps 2826 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 2806 and the VI manager (VIM) 2808, and handles the management of MEC-specific functionality of a particular MEC server 2802 and the applications running on it. In some implementations, some or all of the multi-access Edge management components may be implemented by one or more servers located in one or more data centers, and may use virtualization infrastructure that is connected with NFV infrastructure used to virtualize NFs, or using the same hardware as the NFV infrastructure.

The MEC platform manager 2806 is responsible for managing the life cycle of applications including informing the MEC orchestrator (MEC-O) 2810 of relevant application related events. The MEC platform manager 2806 may also provide MEC Platform Element management functions 2844 to the MEC platform 2832, manage MEC App rules and requirements 2846 including service authorizations, traffic rules, DNS configuration and resolving conflicts, and manage MEC App lifecycles mgmt 2848. The MEC platform manager 2806 may also receive virtualized resources, fault reports, and performance measurements from the VIM 2808 for further processing. The Mm5 reference point between the MEC platform manager 2806 and the MEC platform 2832 is used to perform platform configuration, configuration of the MEC Platform element mgmt 2844, MEC App rules and reqts 2846, MEC App lifecycles mgmt 2848, and management of application relocation.

The VIM 2808 may be an entity that allocates, manages and releases virtualized (compute, storage and networking) resources of the VI 2822, and prepares the VI 2822 to run a software image. To do so, the VIM 2808 may communicate with the VI 2822 over the Mm7 reference point between the VIM 2808 and the VI 2822. Preparing the VI 2822 may include configuring the VI 2822, and receiving/storing the software image. When supported, the VIM 2808 may provide rapid provisioning of applications, such as described in "Openstack++ for Cloudlet Deployments", available at http://reports-archive.adm.cs.cmu.edu/anon/2015/CMU-CS-15-123.pdf. The VIM 2808 may also collect and report performance and fault information about the virtualized resources, and perform application relocation when supported. For application relocation from/to external cloud environments, the VIM 2808 may interact with an external cloud manager to perform the application relocation, for example using the mechanism described in "Adaptive VM Handoff Across Cloudlets", and/or possibly through a proxy. Furthermore, the VIM 2808 may communicate with the MEC platform manager 2806 via the Mm6 reference point, which may be used to manage virtualized resources, for example, to realize the application lifecycle management. Moreover, the VIM 2808 may communicate with the MEC-O 2810 via the Mm4 reference point, which may be used to manage virtualized resources of the MEC server 2802, and to manage application images. Managing the virtualized resources may include tracking available resource capacity, etc.

The MEC system level management includes the MEC-O 2810, which has an overview of the complete MEC system 2800. The MEC-O 2810 may maintain an overall view of the MEC system 2800 based on deployed MEC hosts 2802, available resources, available MEC services 2836, and topology. The Mm3 reference point between the MEC-O 2810 and the MEC platform manager 2806 may be used for the management of the application lifecycle, application rules and requirements and keeping track of available MEC services 2836. The MEC-O 2810 may communicate with the user application lifecycle management proxy (UALMP) 2814 via the Mm9 reference point in order to manage MEC Apps 2826 requested by UE app 2818.

The MEC-O 2810 may also be responsible for on-boarding of application packages, including checking the integrity and authenticity of the packages, validating application rules and requirements and if necessary adjusting them to comply with operator policies, keeping a record of on-boarded packages, and preparing the VIM(s) 2808 to handle the applications. The MEC-O 2810 may select appropriate MEC host(s) 901 for application instantiation based on constraints, such as latency, available resources, and available services. The MEC-O 2810 may also trigger application instantiation and termination, as well as trigger application relocation as needed and when supported.

The Operations Support System (OSS) 2812 is the OSS of an operator that receives requests via the Customer Facing Service (CFS) portal 2816 over the Mx1 reference point and from UE apps 2818 for instantiation or termination of MEC Apps 2826. The OSS 2812 decides on the granting of these requests. The CFS portal 2816 (and the Mx1 interface) may be used by third-parties to request the MEC system 2800 to run apps 2818 in the MEC system 2800. Granted requests may be forwarded to the MEC-O 2810 for further processing. When supported, the OSS 2812 also receives requests from UE apps 2818 for relocating applications between external clouds and the MEC system 2800. The Mm2 reference point between the OSS 2812 and the MEC platform manager 2806 is used for the MEC platform manager 2806 configuration, fault and performance management. The Mm1 reference point between the MEC-O 2810 and the OSS 2812 is used for triggering the instantiation and the termination of MEC Apps 2826 in the MEC system 2800.

The UE app(s) 2818 (also referred to as "device applications" or the like) is one or more apps running in a device 2820 that has the capability to interact with the MEC system 2800 via the user application lifecycle management proxy 2814. The UE app(s) 2818 may be, include, or interact with one or more client applications, which in the context of MEC, is application software running on the device 2818 that utilizes functionality provided by one or more specific MEC Apps 2826. The user app LCM proxy 2814 may authorize requests from UE apps 2818 in the UE 2820 and interacts with the OSS 2812 and the MEC-O 2810 for further processing of these requests. The term "lifecycle management," in the context of MEC, refers to a set of functions required to manage the instantiation, maintenance and termination of a MEC App 2826 instance. The user app LCM proxy 2814 may interact with the OSS 2812 via the Mm8 reference point, and is used to handle UE 2818 requests for running applications in the MEC system 2800. A user app may be an MEC App 2826 that is instantiated in the MEC system 2800 in response to a request of a user via an application running in the UE 2820 (e.g., UE App 2818). The user app LCM proxy 2814 allows UE apps 2818 to request on-boarding, instantiation, termination of user applications and when supported, relocation of user applications in and out of the MEC system 2800. It also allows informing the user apps about the state of the user apps. The user app LCM proxy 2814 is only accessible from within the mobile network, and may only be available when supported by the MEC system 2800. A UE app 2818 may use the Mx2 reference point between the user app LCM proxy 2814 and the UE app 2818 to request the MEC system 2800 to run an application in the MEC system 2800, or to move an application in or out of the MEC system 2800. The Mx2 reference point may only be accessible within the mobile network and may only be available when supported by the MEC system 2800.

In order to run an MEC App 2826 in the MEC system 2800, the MEC-O 2810 receives requests triggered by the OSS 2812, a third-party, or a UE app 2818. In response to receipt of such requests, the MEC-O 2810 selects a MEC server/host 2802 to host the MEC App 2826 for computational offloading, etc. These requests may include information about the application to be run, and possibly other information, such as the location where the application needs to be active, other application rules and requirements, as well as the location of the application image if it is not yet on-boarded in the MEC system 2800.

The MEC-O 2810 may select one or more MEC servers 2802 for computational intensive tasks. The selected one or more MEC servers XE136 may offload computational tasks of a UE app 2818 based on various operational parameters, such as network capabilities and conditions, computational capabilities and conditions, application requirements, and/or other like operational parameters. The application requirements may be rules and requirements associated to/with one or more MEC Apps 2826, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access Edge services that are required and/or useful for the MEC Apps 2826 to be able to run; multi-access Edge services that the MEC Apps 2826 can take advantage of, if available; connectivity or mobility support/requirements (e.g., application state relocation, application instance relocation); required multi-access Edge features, such as VM relocation support or UE identity; required network connectivity (e.g., connectivity to applications within the MEC system 2800, connectivity to local networks, or to the Internet); information on the operator's MEC system 2800 deployment or mobile network deployment (e.g., topology, cost); requirements on access to user traffic; requirements on persistent storage; traffic rules 2840; DNS rules 2842; etc.

The MEC-O 2810 considers the requirements and information listed above and information on the resources currently available in the MEC system 2800 to select one or several MEC servers 2802 to host MEC Apps 2826 and/or for computational offloading. After one or more MEC servers XE136 are selected, the MEC-O 2810 requests the selected MEC host(s) 2802 to instantiate the application(s) or application tasks. The actual algorithm used to select the MEC servers 2802 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 2810 may decide to select one or more new MEC hosts 2802 to act as a primary/source node, and initiates the transfer of an application instance or application-related state information from the one or more source MEC hosts 2802 to the one or more target MEC hosts 2802.

In a first implementation, a UPF of the 5GS is mapped into the MEC architecture 2800 as the MEC data plane 2824. In this implementation, the UPF handles the UP path of PDU sessions. Additionally, the UPF provides the interface to a data network (e.g., DN 175 and/or local service 170 in FIGS. 1A-1B) and supports the functionality of a PDU session anchor.

In a second implementation, an application function (AF) of the 5GS is mapped into the MEC architecture 2800 as the MEC platform 2832. In these implementations, the AF is configurable or operable to perform application influence on traffic routing, access network capability exposure, and interact with the policy framework for policy control. The second implementation may be combined with the first implementation, or may be a standalone implementation. In the first and/or second implementations, since user traffic is routed to the local DN, MEC apps 2826, 2827, and/or 2828 can be mapped in or to the DN of the 5GS.

In a third implementation, the RAN of 5GS can be a virtual RAN based on a VNF, and the UPF is configurable or operable to function as the MEC data plane 2824 within an NF virtualization infrastructure (NFVI) (e.g., VI 2822). In these implementations, the AF can be configured as MEC platform VNF with MEC APIs, MEC app enablement functionality (see e.g., [MEC009]), and API principles functionality (see e.g., [MEC009]). Additionally, the local DN an include MEC apps 2826, 2827, and/or 2828 instantiated as VNFs. This implementation can be configured to provide functionalities in accordance with [MEC003] and/or ETSI GR MEC 017 V1.1.1 (2018 February) ("[MEC017]"). The third implementation may be combined with the first implementation and/or the second implementation, or may be a standalone implementation.

Additionally or alternatively, the access level Edge (e.g., the various NANs and/or (R)ANs discussed herein) can use one or more APIs to communicate with local/regional level Edge networks. The local/regional level Edge networks can include network nodes using corresponding applications to communicate with a national level Edge network. The national level Edge can include various NANs that use applications for accessing one or more remote clouds within the global level Edge. The NANs are also configurable or operable for vertical segment management and SLA compliance. Additionally or alternatively, MEC deployment can be based on the definition of "Edge" to provide degrees of freedom to MNOs, especially when deploying MEC in an NFV environment (e.g., MEC entities can be instantiated as Virtualized NFs (VNFs), thus with high flexibility in terms of deployment for the operator).

Additionally or alternatively, MEC system 2800 can be flexibly deployed depending on the use case/vertical segment/information to be processed. Some components of the MEC system 2800 can be co-located with other elements of the system. As an example, in certain use cases (e.g., enterprise), a MEC app 2826 may need to consume a MEC service locally, and it may be efficient to deploy a MEC host locally equipped with the needed set of APIs. In another example, deploying a MEC server 2802 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. Additionally or alternatively, a bandwidth management API may be present both at the access level Edge and also in more remote Edge locations, in order to set up transport networks (e.g., for CDN-based services).

Figure 29:
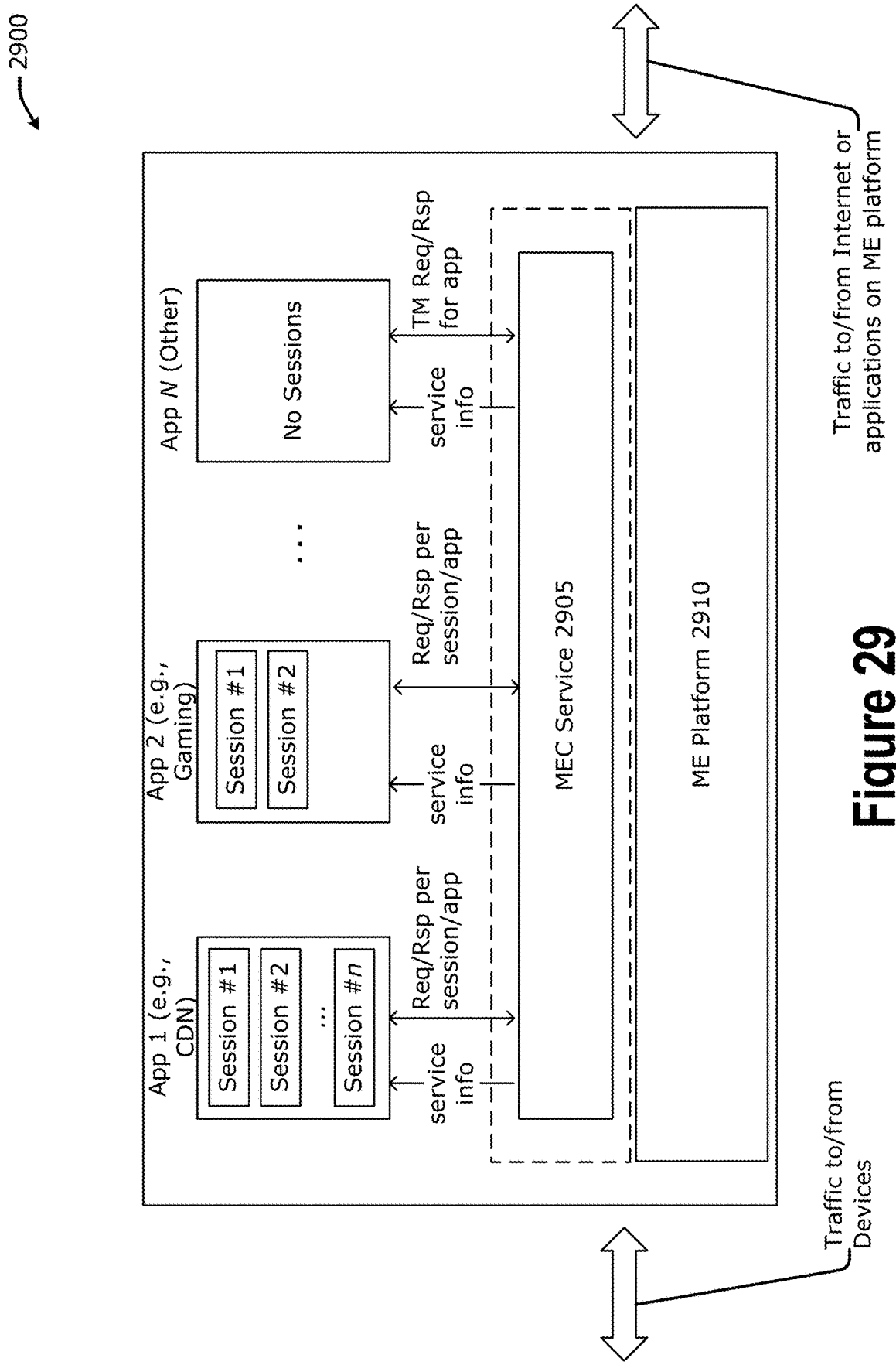
FIG. 29 illustrates an example MEC service architecture.

FIG. 29 illustrates an example MEC service architecture 2900. MEC service architecture 2900 includes the MEC service 2905, ME platform 2910 (corresponding to MEC platform 2832), and applications (Apps) 1 to N (where N is a number). As an example, the App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform 2910) and consumers (e.g., UEs 101, user apps instantiated by individual UEs 101, other servers/services, network functions, application functions, etc.). Each session represents an interactive information exchange between two or more elements, such as a client-side app and its corresponding server-side app, a user app instantiated by a UE 101 and a MEC app instantiated by the ME platform 2910, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE 101 and a DN that provides a PDU connectivity service, which is a service that provides for the exchange of PDUs between a UE 101 and a Data Network 170, 175. An MA PDU session is a PDU Session that provides a PDU connectivity service, which can use one access network at a time, or simultaneously a 3GPP access network 110A and a non-3GPP access network 110B. Furthermore, each session may be associated with a session identifier (ID) which is data the uniquely identifies a session, and each App (or App instance) may be associated with an App ID (or App instance ID) which is data the uniquely identifies an App (or App instance).

The MEC service 2905 provides one or more MEC services 2836 to MEC service consumers (e.g., Apps 1 to N). The MEC service 2905 may optionally run as part of the platform (e.g., ME platform 2910) or as an application (e.g., ME app). Different Apps 1 to N, whether managing a single instance or several sessions (e.g., CDN), may request specific service info per their requirements for the whole application instance or different requirements per session. The MEC service 2905 may aggregate all the requests and act in a manner that will help optimize the BW usage and improve Quality of Experience (QoE) for applications.

The MEC service 2905 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource." Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of ETSI GS MEC 009 V2.1.1 (2019 January) ("[MEC009]")). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure:

{apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry 2838 in FIG. 28). It includes the scheme ("http" or "https"), host and optional port, and an optional prefix string. For the a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

3. Hardware Components, Configurations, and Arrangements

Figure 31:
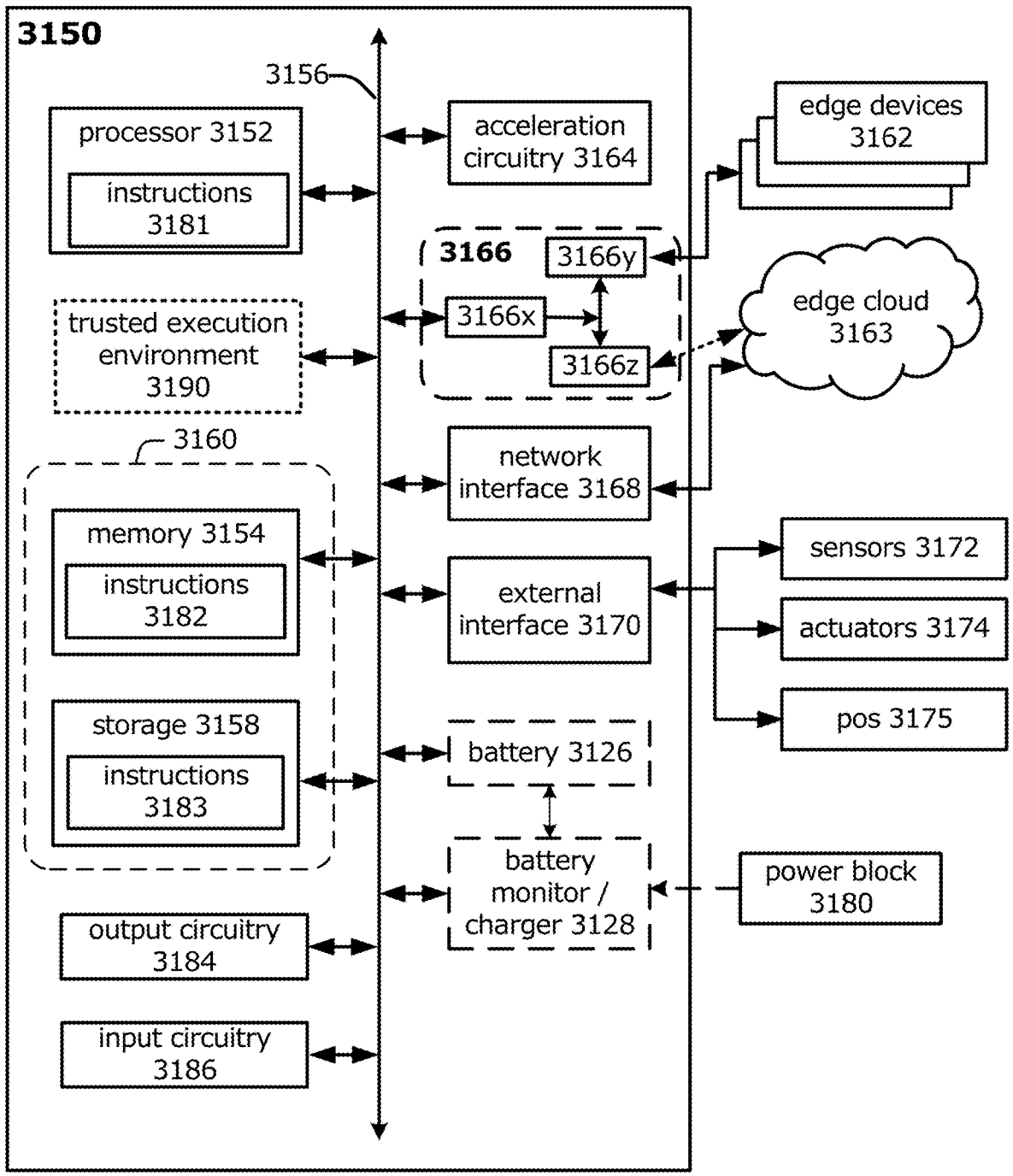
FIGS. 30 and 31 depict example components of various compute nodes in Edge computing system(s).
Figure 30:
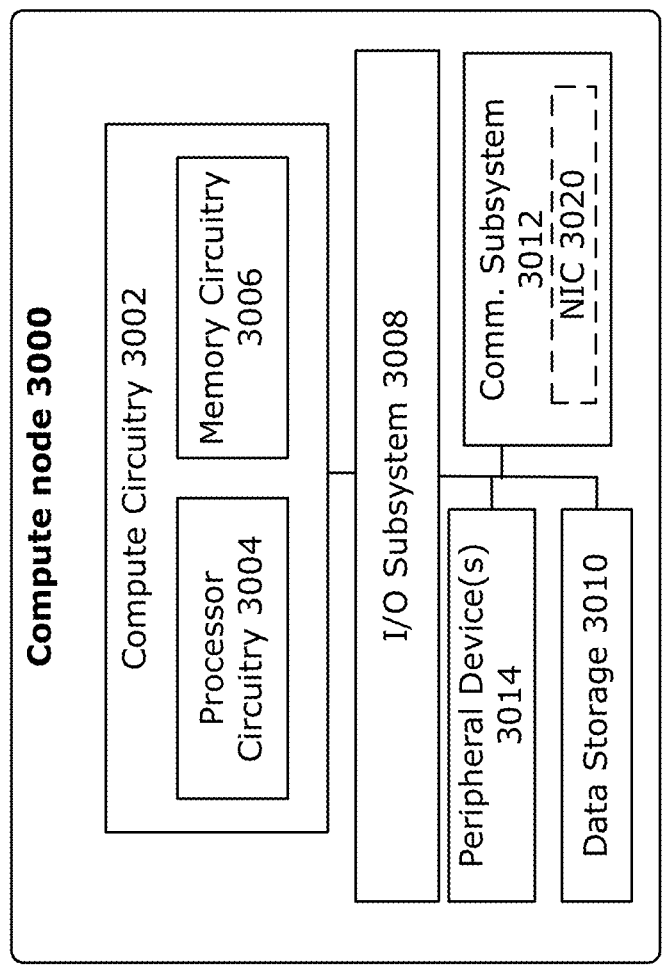

FIGS. 30 and 31 depict further examples of Edge computing systems and environments that may fulfill any of the compute nodes or devices discussed herein. Respective Edge compute nodes may be embodied as a type of device, appliance, computer, or other "thing" capable of communicating with other Edge, networking, or endpoint components. For example, an Edge compute device may be embodied as a smartphone, a mobile compute device, a smart appliance, an in-vehicle compute system (e.g., a navigation system), or other device or system capable of performing the described functions.

In FIG. 30, an Edge compute node 3000 includes a compute engine (also referred to herein as "compute circuitry") 3002, an input/output (I/O) subsystem 3008, data storage 3010, a communication circuitry subsystem 3012, and, optionally, one or more peripheral devices 3014. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 3000 may be embodied as any type of engine, device, or collection of devices capable of performing various compute functions. In some examples, the compute node 3000 may be embodied as a single device such as an integrated circuit, an embedded system, an FPGA, a System-on-Chip (SoC), or other integrated system or device. The compute node 3000 includes or is embodied as a processor 3004 and a memory 3006. The processor 3004 may be embodied as any type of processor capable of performing the functions described herein (e.g., executing an application). For example, the processor 3004 may be embodied as a multi-core processor(s), a microcontroller, or other processor or processing/controlling circuit.

In some examples, the processor 3004 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 3004 may work in coordination with each other to execute many types of operations and instructions within and on behalf of the compute node 3000.

The memory 3006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies (for example, Single-Level Cell (SLC), Multi-Level Cell (MLC), Quad-Level Cell (QLC), Tri-Level Cell (TLC), or some other NAND). Additionally or alternatively, the memory device includes a byte-addressable write-in-place three dimensional crosspoint memory device, or other byte addressable write-in-place non-volatile memory (NVM) devices, such as single or multi-level Phase-Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a combination of any of the above, or other suitable memory. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 3006 may be integrated into the processor 3004. The main memory 3006 may store various software and data used during operation such as one or more applications, data operated on by the application(s), libraries, and drivers.

Additionally or alternatively, resistor-based and/or transistor-less memory architectures include nanometer scale PCM devices in which a volume of phase-change material resides between at least two electrodes. Portions of the example phase-change material exhibit varying degrees of crystalline phases and amorphous phases, in which varying degrees of resistance between the at least two electrodes can be measured. Additionally or alternatively, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

Additionally or alternatively, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 3002 is communicatively coupled to other components of the compute node 3000 via the I/O subsystem 3008, which may be embodied as circuitry and/or components to facilitate input/output operations with the compute circuitry 3002 (e.g., with the processor 3004 and/or the main memory 3006) and other components of the compute circuitry 3002. For example, the I/O subsystem 3008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 3008 may form a portion of an SoC and be incorporated, along with one or more of the processor 3004, the main memory 3006, and other components of the compute circuitry 3002, into the compute circuitry 3002.

The one or more illustrative data storage devices/disks 3010 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 3010 may include a system partition that stores data and firmware code for the data storage device/disk 3010. Individual data storage devices/disks 3010 may also include one or more operating system partitions that store data files and executables for operating systems depending on, for example, the type of compute node 3000.

The communication circuitry 3012 may be embodied as any communication circuit, device, or collection thereof, capable of enabling communications over a network between the compute circuitry 3002 and another compute device (e.g., an Edge gateway node or the like). The communication circuitry 3012 may be configured to use any one or more communication technology (e.g., wired or wireless communications) and associated protocols (e.g., a cellular networking protocol such a 3GPP 4G or 5G standard, a wireless local area network protocol such as IEEE 802.11/WiFi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 3012 includes a network interface controller (NIC) 3020, which may also be referred to as a host fabric interface (HFI). The NIC 3020 may be embodied as one or more add-in-boards, daughter cards, network interface cards, controller chips, chipsets, or other devices that may be used by the compute node 3000 to connect with another compute device. In some examples, the NIC 3020 may be embodied as part of a system-on-a-chip (SoC) that includes one or more processors, or included on a multichip package that also contains one or more processors. In some examples, the NIC 3020 may include a local processor (not shown) and/or a local memory (not shown) that are both local to the NIC 3020. In such examples, the local processor of the NIC 3020 may be capable of performing one or more of the functions of the compute circuitry 3002 described herein. Additionally, or alternatively, in such examples, the local memory of the NIC 3020 may be integrated into one or more components of the client compute node at the board level, socket level, chip level, and/or other levels.

Additionally, in some examples, a respective compute node 3000 may include one or more peripheral devices 3014. Such peripheral devices 3014 may include any type of peripheral device found in a compute device or server such as audio input devices, a display, other input/output devices, interface devices, and/or other peripheral devices, depending on the particular type of the compute node 3000. In further examples, the compute node 3000 may be embodied by a respective Edge compute node in an Edge computing system (e.g., client compute node, Edge gateway node, Edge aggregation node, V-ITS-Ss discussed previous, etc.) or like forms of appliances, computers, subsystems, circuitry, or other components.

FIG. 31 illustrates an example of components that may be present in an Edge computing node 3150 for implementing the techniques (e.g., operations, processes, methods, and methodologies) described herein. This Edge computing node 3150 provides a closer view of the respective components of node 3150 when implemented as or as part of a computing device (e.g., as a mobile device, a base station, server, gateway, etc.). The Edge computing node 3150 may include any combinations of the hardware or logical components referenced herein, and it may include or couple with any device usable with an Edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the Edge computing node 3150, or as components otherwise incorporated within a chassis of a larger system.

The Edge computing node 3150 includes processing circuitry in the form of one or more processors 3152, which may be the same or similar as processor(s) 3052. The processor circuitry 3152 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. The processor circuitry 3152 may include one or more hardware accelerators (e.g., same or similar to acceleration circuitry 3164), which may be microprocessors, programmable processing devices (e.g., FPGA, ASIC, etc.), or the like. The one or more accelerators may include, for example, computer vision and/or deep learning accelerators. In some implementations, the processor circuitry 3152 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 3152 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, an xPU/DPU/IPU/NPU, special purpose processing unit, specialized processing unit, or any other known processing elements, or any suitable combination thereof. The processors (or cores) 3152 may be coupled with or may include memory/storage and may be configured to execute instructions stored in the memory/storage to enable various applications or operating systems to run on the platform 3150. The processors (or cores) 3152 is configured to operate application software to provide a specific service to a user of the platform 3150. Additionally or alternatively, the processor(s) 3152 may be a special-purpose processor(s)/controller (s) configured (or configurable) to operate according to the elements, features, and implementations discussed herein.

As examples, the processor(s) 3152 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 3152 may be a part of a system on a chip (SoC), System-in-Package (SiP), a multi-chip package (MCP), and/or the like, in which the processor(s) 3152 and other components are formed into a single integrated circuit, or a single package, such as the Edison™ or Galileo™ SoC boards from Intel® Corporation. Other examples of the processor(s) 3152 are mentioned elsewhere in the present disclosure.

The processor(s) 3152 may communicate with system memory 3154 over an interconnect (IX) 3156. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 3158 may also couple to the processor 3152 via the IX 3156. In an example, the storage 3158 may be implemented via a solid-state disk drive (SSDD) and/or high-speed electrically erasable memory (commonly referred to as "flash memory"). Other devices that may be used for the storage 3158 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 3154 and/or storage circuitry 3158 may also incorporate three-dimensional (3D) cross-point (XPOINT) memories from Intel® and Micron®.

In low power implementations, the storage 3158 may be on-die memory or registers associated with the processor 3152. However, in some examples, the storage 3058 may be implemented using a micro hard disk drive (HDD). Further, any number of new technologies may be used for the storage 3158 in addition to, or instead of, the technologies described, such resistance change memories, phase change memories, holographic memories, or chemical memories, among others.

The components of Edge computing device 3150 may communicate over an interconnect (IX) 3156. The IX 3156 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 3156 may be a proprietary bus, for example, used in a SoC based system.

The IX 3156 couples the processor 3152 to communication circuitry 3166 for communications with other devices, such as remote server(s) (not shown), an Edge cloud 3163, and/or the connected Edge devices 3162. The communication circuitry 3166 is a hardware element, or collection of hardware elements, used to communicate over one or more networks (e.g., cloud 3163) and/or with other devices (e.g., Edge devices 3162). Communication circuitry 3166 includes modem circuitry 3166x may interface with application circuitry of system 800 (e.g., a combination of processor circuitry 802 and CRM 860) for generation and processing of baseband signals and for controlling operations of the TRx 812. The modem circuitry 3166x may handle various radio control functions that enable communication with one or more (R)ANs via the transceivers (TRx) 3166y and 3166z according to one or more wireless communication protocols and/or RATs. The modem circuitry 3166x may include circuitry such as, but not limited to, one or more single-core or multi-core processors (e.g., one or more baseband processors) or control logic to process baseband signals received from a receive signal path of the TRxs 3166y, 3166z, and to generate baseband signals to be provided to the TRxs 3166y, 3166z via a transmit signal path. The modem circuitry 3166x may implement a real-time OS (RTOS) to manage resources of the modem circuitry 3166x, schedule tasks, perform the various radio control functions, process the transmit/receive signal paths, and the like.

The TRx 3166y may use any number of frequencies and protocols for communicating with the connected Edge devices 3162, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 3162. For example, a wireless local area network (WLAN) unit may be used to implement WiFi® communications in accordance with an Institute of Electrical and Electronics Engineers (IEEE) 802.11 standard. In addition, wireless wide area communications, e.g., according to a cellular or other wireless wide area protocol, may occur via a wireless wide area network (WWAN) unit. The TRx 3166y (or multiple transceivers 3166y) may communicate using multiple standards or radios for communications at a different range. For example, the Edge computing node 3150 may communicate with relatively close devices (e.g., within about 10 meters) using a local transceiver based on BLE, or another low power radio, to save power. More distant connected Edge devices 3162, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A TRx 3166z may be included to communicate with devices or services in the Edge cloud 3163 via WLAN, wireless wide area network (WWAN), and/or cellular protocols. The TRx 3166z may be an LPWA transceiver that follows the IEEE 802.15.4, or IEEE 802.15.4g standards, among others. The Edge computing node 3163 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used. Any number of other radio communications and protocols may be used in addition to the systems mentioned for the TRx 3166z, as described herein. For example, the TRx 3166z may include a cellular transceiver that uses spread spectrum (SPA/SAS) communications for implementing high-speed communications. Further, any number of other protocols may be used, such as WiFi® networks for medium speed communications and provision of network communications. The TRx 3166z may include radios that are compatible with any number of 3GPP specifications, such as LTE and 5G/NR communication systems.

A network interface controller (NIC) 3168 may be included to provide a wired communication to nodes of the Edge cloud 3163 or to other devices, such as the connected Edge devices 3162 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 3168 may be included to enable connecting to a second network, for example, a first NIC 3168 providing communications to the cloud over Ethernet, and a second NIC 3168 providing communications to other devices over another type of network.

Given the variety of types of applicable communications from the device to another component or network, applicable communications circuitry used by the device may include or be embodied by any one or more of components 3164, 3166, 3168, or 3170. Accordingly, in various examples, applicable means for communicating (e.g., receiving, transmitting, etc.) may be embodied by such communications circuitry.

The Edge computing node 3150 may include or be coupled to acceleration circuitry 3164, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like.

In FPGA-based implementations, the acceleration circuitry 3164 may comprise logic blocks or logic fabric and other interconnected resources that may be programmed (configured) to perform various functions, such as the procedures, methods, functions, etc. discussed herein. In such implementations, the acceleration circuitry 3164 may also include memory cells (e.g., EPROM, EEPROM, flash memory, static memory (e.g., SRAM, anti-fuses, etc.) used to store logic blocks, logic fabric, data, etc. in LUTs and the like.

The IX 3156 also couples the processor 3152 to a sensor hub or external interface 3170 that is used to connect additional devices or subsystems. The additional/external devices may include sensors 3172, actuators 3174, and positioning circuitry 3175.

The sensor circuitry 3172 includes devices, modules, or subsystems whose purpose is to detect events or changes in its environment and send the information (sensor data) about the detected events to some other a device, module, subsystem, etc. Examples of such sensors 3172 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 3174, allow platform 3150 to change its state, position, and/or orientation, or move or control a mechanism or system. The actuators 3174 comprise electrical and/or mechanical devices for moving or controlling a mechanism or system, and converts energy (e.g., electric current or moving air and/or liquid) into some kind of motion. The actuators 3174 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 3174 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 3150 may be configured to operate one or more actuators 3174 based on one or more captured events and/or instructions or control signals received from a service provider and/or various client systems The positioning circuitry (POS) 3175 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The POS 3175 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the POS 3175 may include a Micro-Technology for Positioning, Navigation, and Timing (Micro-PNT) IC that uses a master timing clock to perform position tracking/estimation without GNSS assistance. The POS 3175 may also be part of, or interact with, the communication circuitry 3166 to communicate with the nodes and components of the positioning network. The POS 3175 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the POS 3175 is, or includes an INS, which is a system or device that uses sensor circuitry 3172 (e.g., motion sensors such as accelerometers, rotation sensors such as gyroscopes, and altimeters (altimimeters), magnetic sensors, and/or the like to continuously calculate (e.g., using dead by dead reckoning, triangulation, or the like) a position, orientation, and/or velocity (including direction and speed of movement) of the platform 3150 without the need for external references.

In some optional examples, various input/output (I/O) devices may be present within or connected to, the Edge computing node 3150, which are referred to as input circuitry 3186 and output circuitry 3184 in FIG. 31. The input circuitry 3186 and output circuitry 3184 include one or more user interfaces designed to enable user interaction with the platform 3150 and/or peripheral component interfaces designed to enable peripheral component interaction with the platform 3150. Input circuitry 3186 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 3184 may be included to show information or otherwise convey information, such as sensor readings, actuator position(s), or other like information. Data and/or graphics may be displayed on one or more user interface components of the output circuitry 3184. Output circuitry 3184 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 3150. The output circuitry 3184 may also include speakers or other audio emitting devices, printer(s), and/or the like. Additionally or alternatively, the sensor circuitry 3172 may be used as the input circuitry 3186 (e.g., an image capture device, motion capture device, or the like) and one or more actuators 3174 may be used as the output device circuitry 3184 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 3176 may power the Edge computing node 3150, although, in examples in which the Edge computing node 3150 is mounted in a fixed location, it may have a power supply coupled to an electrical grid, or the battery may be used as a backup or for temporary capabilities. The battery 3176 may be a lithium ion battery, or a metal-air battery, such as a zinc-air battery, an aluminum-air battery, a lithium-air battery, and the like.

A battery monitor/charger 3178 may be included in the Edge computing node 3150 to track the state of charge (SoCh) of the battery 3176, if included. The battery monitor/charger 3178 may be used to monitor other parameters of the battery 3176 to provide failure predictions, such as the state of health (SoH) and the state of function (SoF) of the battery 3176. The battery monitor/charger 3178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 3178 may communicate the information on the battery 3176 to the processor 3152 over the IX 3156. The battery monitor/charger 3178 may also include an analog-to-digital (ADC) converter that enables the processor 3152 to directly monitor the voltage of the battery 3176 or the current flow from the battery 3176. The battery parameters may be used to determine actions that the Edge computing node 3150 may perform, such as transmission frequency, mesh network operation, sensing frequency, and the like.

A power block 3180, or other power supply coupled to a grid, may be coupled with the battery monitor/charger 3178 to charge the battery 3176. In some examples, the power block 3180 may be replaced with a wireless power receiver to obtain the power wirelessly, for example, through a loop antenna in the Edge computing node 3150. A wireless battery charging circuit, such as an LTC4020 chip from Linear Technologies of Milpitas, California, among others, may be included in the battery monitor/charger 3178. The specific charging circuits may be selected based on the size of the battery 3176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The memory 3154 and storage 3158 may include instructions 3182 and 3183 in the form of software, firmware, or hardware commands to implement the techniques described herein. Although such instructions 3182, 3183 are shown as code blocks included in the memory 3154 and the storage 3158, any of the code blocks may be replaced with hard-wired circuits, for example, built into a ASIC, FPGA, acceleration circuitry 3164, and/or the like.

In an example, the instructions 3181, 3182, 3183 provided via the memory 3154, the storage 3158, or the processor 3152 may be embodied as a non-transitory machine-readable medium 3160 (or non-transitory computer-readable media (NTCRM) 3160) including code to direct the processor 3152 to perform electronic operations in the Edge computing node 3150. The processor 3152 may access the NTCRM 3160 over the IX 3156. For instance, the NTCRM 3160 may be embodied by devices described for the storage 3158 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTCRM 3160 may include instructions to direct the processor 3152 to perform a specific sequence or flow of actions, for example, as described with respect to the flowchart(s) and block diagram(s) of operations and functionality depicted above.

As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media. Additionally or alternatively, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 30 and 31 are intended to depict a high-level view of components of a varying device, subsystem, or arrangement of an Edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 30 and 31 may support multiple Edge instances (e.g., Edge clusters) by use of tenant containers running on a single compute platform. Likewise, multiple Edge nodes may exist as subnodes running on tenants within the same compute platform. Accordingly, based on available resource partitioning, a single system or compute platform may be partitioned or divided into supporting multiple tenants and Edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

FIGS. 30 and 31 depict examples of Edge computing systems and environments that may fulfill any of the compute nodes or devices discussed herein. Respective Edge compute nodes may be embodied as a type of device, appliance, computer, or other "thing" capable of communicating with other Edge, networking, or endpoint components. For example, an Edge compute device may be embodied as a smartphone, a mobile compute device, a smart appliance, an in-vehicle compute system (e.g., a navigation system), or other device or system capable of performing the described functions.

Figure 32:
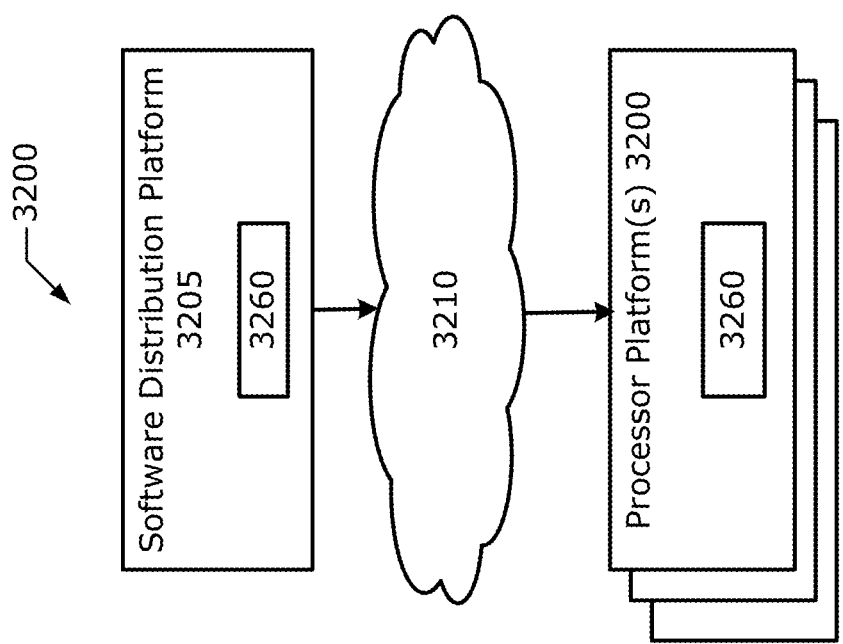
FIG. 32 illustrates an example software distribution platform.

FIG. 32 illustrates an example software distribution platform 3205 to distribute software 3260, such as the example computer readable instructions 3181, 3182, 3183 of FIG. 31, to one or more devices, such as example processor platform(s) 3200 and/or example connected Edge devices 3162 (see e.g., FIG. 31) and/or any of the other computing systems/devices discussed herein. The example software distribution platform 3205 may be implemented by any computer server, data facility, cloud service, etc., capable of storing and transmitting software to other computing devices (e.g., third parties, the example connected Edge devices 3162 of FIG. 31). Example connected Edge devices may be customers, clients, managing devices (e.g., servers), third parties (e.g., customers of an entity owning and/or operating the software distribution platform 3205). Example connected Edge devices may operate in commercial and/or home automation environments. Additionally or alternatively, a third party is a developer, a seller, and/or a licensor of software such as the example computer readable instructions 3181, 3182, 3183 of FIG. 31. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected Edge devices) geographically and/or logically separated from each other (e.g., physically separated IoT devices chartered with the responsibility of water distribution control (e.g., pumps), electricity distribution control (e.g., relays), etc.).

In FIG. 32, the software distribution platform 3205 includes one or more servers and one or more storage devices. The storage devices store the computer readable instructions 3260, which may correspond to the example computer readable instructions 3181, 3182, 3183 of FIG. 31, as described above. The one or more servers of the example software distribution platform 3205 are in communication with a network 3210, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 3260 from the software distribution platform 3205. For example, the software 3260, which may correspond to the example computer readable instructions 3181, 3182, 3183 of FIG. 31, may be downloaded to the example processor platform(s) 3200, which is/are to execute the computer readable instructions 3260 to implement Radio apps.

In some examples, one or more servers of the software distribution platform 3205 are communicatively connected to one or more security domains and/or security devices through which requests and transmissions of the example computer readable instructions 3260 must pass. In some examples, one or more servers of the software distribution platform 3205 periodically offer, transmit, and/or force updates to the software (e.g., the example computer readable instructions 3181, 3182, 3183 of FIG. 31) to ensure improvements, patches, updates, etc. are distributed and applied to the software at the end user devices.

In FIG. 32, the computer readable instructions 3260 are stored on storage devices of the software distribution platform 3205 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions D182 stored in the software distribution platform 3205 are in a first format when transmitted to the example processor platform(s)

3200. In some examples, the first format is an executable binary in which particular types of the processor platform(s) 3200 can execute. However, in some examples, the first format is uncompiled code that requires one or more preparation tasks to transform the first format to a second format to enable execution on the example processor platform(s) 3200. For instance, the receiving processor platform(s) 3200 may need to compile the computer readable instructions 3260 in the first format to generate executable code in a second format that is capable of being executed on the processor platform(s) 3200. In still other examples, the first format is interpreted code that, upon reaching the processor platform(s) 3200, is interpreted by an interpreter to facilitate execution of instructions.

4. Example Implementations

Additional examples of the presently described systems, devices, and methods include the following, non-limiting example implementations. Each of the following non-limiting examples may stand on its own or may be combined in any permutation or combination with any one or more of the other examples provided below or throughout the present disclosure.

- Example A01 includes a method for managing traffic multi-access communication in an multi-access communication environment, the method comprising: when a packet for transmission is stored in a transmission queue prior to the transmission, receiving, by a convergence layer entity, a traffic splitting ratio (TSR) message from a radio layer entity indicating a change in a radio parameter; and adjusting, by the convergence layer entity, a TSR based on the TSR message, the TSR defining an amount of data packets that are sent over individual links of a plurality of communication links.

- Example A02 includes the method of example A01 and/or some other example(s) herein, wherein the radio parameter is a transmission queue size (TQS), wherein the TQS is a size of the transmission queue based on a number of packets stored in the transmission queue, and wherein: the receiving comprises receiving, by the convergence layer entity, the TSR message from a radio layer entity when the TQS is less than a TQS limit, the TSR message requesting to increase a TSR; and the adjusting comprises increasing, by the convergence layer entity after receipt of the TSR message, the TSR based on a TSR value.

- Example A03 includes the method of example A02 and/or some other example(s) herein, wherein the TSR message is a first TSR message, the TQS limit is a first TQS limit, and wherein: the receiving comprises receiving, by the convergence layer entity, a second TSR message from the radio layer entity when the TQS is more than the second TQS limit, the second TSR message requesting to decrease the TSR; and the adjusting comprises decreasing, by the convergence layer entity after receipt of the second TSR message, the TSR based on the TSR value.

- Example A04 includes the method of example A03 and/or some other example(s) herein, wherein: the receiving comprises receiving, by the convergence layer entity, a third TSR message from the radio layer entity when the TQS is more than the first TQS limit and less than the second TQS limit, the third TSR message requesting to maintain the TSR; and the adjusting comprises resetting, after receipt of the third TSR message, the TSR to a previously used TSR.

- Example A05 includes the method of examples A02-A04 and/or some other example(s) herein, wherein the TQS limit is based on a target queuing delay (TQD) and an estimated throughput of a primary link of the plurality of communication links.

- Example A06 includes the method of example A01 and/or some other example(s) herein, wherein the radio parameter is a queuing delay of the packet stored in the transmission queue, and wherein: the receiving comprises receiving, by the convergence layer entity, the TSR message from a radio layer entity when the queuing delay is less than a TQD, the TSR message requesting to increase a TSR; and the adjusting comprises increasing, by the convergence layer entity after receipt of the TSR message, the TSR based on a TSR value.

- Example A07 includes the method of example A06 and/or some other example(s) herein, wherein the TSR message is a first TSR message, the TQD is a first TQD, and wherein: the receiving comprises receiving, by the convergence layer entity, a second TSR message from the radio layer entity when the queuing delay is more than the second TQD, the second TSR message requesting to decrease the TSR; and the adjusting comprises decreasing, by the convergence layer entity after receipt of the second TSR message, the TSR based on the TSR value.

- Example A08 includes the method of example A07 and/or some other example(s) herein, wherein: the receiving comprises receiving, by the convergence layer entity, a third TSR message from the radio layer entity when the queuing delay is more than the first TQD and less than the second TQD, the third TSR message requesting to maintain the TSR; and the adjusting comprises resetting, after receipt of the third TSR message, the TSR to a previously used TSR.

- Example A09 includes the method of example A03 or A08 and/or some other example(s) herein, wherein decreasing the TSR comprises: subtracting the TSR value from the TSR during each interval of a set of intervals taking place until another TSR message is received by the convergence layer entity.

- Example A10 includes the method of example A09 and/or some other example(s) herein, wherein increasing the TSR comprises: adding the TSR value to the TSR during each interval of the set of intervals taking place until another TSR message is received by the convergence layer entity.

- Example A11 includes the method of example A10 and/or some other example(s) herein, wherein each interval of the set of intervals is a greater one of an average transmission time interval or a minimum interval to observe a stable input rate.

- Example A12 includes the method of examples A09-A11 and/or some other example(s) herein, further comprising: increasing, by the convergence layer, the TSR value by a predefined value when another first TSR message or another second TSR message is received more than a threshold number of intervals after receipt of the third TSR message.

- Example A13 includes the method of example A12 and/or some other example(s) herein, further comprising: decreasing, by the convergence layer, the TSR value by the predefined value when the other first TSR message or the other second TSR message is received with the threshold number of intervals after receipt of the third TSR message.

Example A14 includes the method of examples A01-A13 and/or some other example(s) herein, wherein the transmission queue is a transmission queue for a first link of the plurality of communication links, and the method further comprises: receiving, by a convergence layer entity, retransmission message from the radio layer entity indicating a number of packets in the transmission queue that has remained in the transmission queue longer than a retransmission threshold; and causing, by the convergence layer entity, the number of packets to be transmitted over a second link of the plurality of communication links.

Example A15 includes the method of example A14 and/or some other example(s) herein, wherein the retransmission threshold is a first retransmission threshold of a plurality of retransmission thresholds, and the method further comprises: identifying, by the convergence layer entity, each expired packet in the transmission queue, wherein each expired packet has a queuing delay higher than the first retransmission threshold and lower than a second threshold of the plurality of retransmission thresholds; and causing, by the convergence layer entity, each expired packet to be retransmitted over the second link according to respective sequence numbers of each expired packet.

Example A16 includes the method of example A15 and/or some other example(s) herein, further comprising: identifying, by the convergence layer entity, individual packets in the transmission queue having a queuing delay higher than the second retransmission; and causing, by the convergence layer entity, immediate retransmission of the individual packets.

Example A17 includes the method of examples A01-A16 and/or some other example(s) herein, further comprising: selecting, by the convergence layer, a link of the plurality of communication links in a free state for transmission of a set of packets stored in the transmission queue; and disabling, by the convergence layer, a packet duplication process after selecting the link.

Example A18 includes the method of example A17 and/or some other example(s) herein, further comprising: enabling, by the convergence layer, the packet duplication process when the selected link transitions from the free state to a busy state.

Example A19 includes the method of example A18 and/or some other example(s) herein, further comprising: disabling, by the convergence layer, the packet duplication process when the selected link transitions from the busy state back to the free state within a predefined amount of time.

Example A20 includes the method of example A19 and/or some other example(s) herein, further comprising: when the selected link does not transition from the busy state back to the free state within the predefined amount of time, selecting, by the convergence layer, another link of the plurality of communication links in the free state for transmission of the set of packets; and disabling, by the convergence layer, the packet duplication process after selecting the other link.

Example A21 includes the method of examples A17-A20 and/or some other example(s) herein, further comprising: generating, by the convergence layer, a convergence header including a bitmap, wherein each bit in the bitmap corresponds to a link of the plurality of links, and the bitmap in the convergence header includes an active bit corresponding to the selected link.

Example A22 includes the method of examples A18-A21 and/or some other example(s) herein, further comprising: determining, by the convergence layer, that the link of the plurality of links is in the busy state when a predefined percentage of transmissions over the link have a measured transmission time that is higher than a target delay threshold.

Example A23 includes the method of example A22 and/or some other example(s) herein, further comprising: determining, by the convergence layer, that the link of the plurality of links is in an overloaded state when more than the predefined percentage of transmissions over the link have a measured transmission time that is higher than the target delay threshold.

Example A24 includes the method of examples A17-A23 and/or some other example(s) herein, further comprising: determining, by the convergence layer, that the link of the plurality of links is in the free state when the measured transmission time of the link is less than a target delay threshold.

Example A25 includes the method of examples A01-A24 and/or some other example(s) herein, wherein the multi-access communication environment is a Multi-Access Management Services (MAMS) communication environment.

Example A26 includes the method of example A25 and/or some other example(s) herein, wherein the MAMS communication environment comprises a Multi-Access Management Services (MAMS) framework.

Example A27 includes the method of example A25 or A26 and/or some other example(s) herein, wherein the convergence layer is a multi-access (MX) convergence layer.

Example A28 includes the method of example A27 and/or some other example(s) herein, wherein the MX convergence layer implements an MX convergence method, wherein the MX convergence method includes one of Generic Multi-Access (GMA), MultiPath Transmission Control Protocol (MPTCP) Proxy, Generic Routing Encapsulation (GRE) Aggregation Proxy, or MultiPath MPQUIC.

Example A29 includes the method of example A27 or A28 and/or some other example(s) herein, wherein the convergence layer receives the first, second, and third TSR messages and the retransmission messages over a cross-layer interface between the convergence layer and the radio layer.

Example A30 includes the method of example A29 and/or some other example(s) herein, wherein the MX convergence layer is part of a MAMS protocol stack implemented by a client device.

Example A31 includes the method of example A30 and/or some other example(s) herein, wherein the cross-layer interface is an uplink cross-layer interface that is between the MX convergence layer and the radio layer is internal to the client device.

Example A32 includes the method of example A32 and/or some other example(s) herein, wherein the radio layer comprises a plurality of radio communication interfaces, and each of the plurality of radio communication interfaces implements a different radio access technology than other ones of the plurality of radio communication interfaces.

Example A33 includes the method of examples A30-A32 and/or some other example(s) herein, wherein the MX convergence layer implements the GMA entity when the MX convergence method is the GMA convergence method.

Example A34 includes the method of example A33 and/or some other example(s) herein, wherein the GMA entity is a GMA client (Gc) entity.

Example A35 includes the method of example A34 and/or some other example(s) herein, wherein the client device further comprises a Client Connection Manager (CCM) communicatively coupled with the Gc entity.

Example A36 includes the method of example A35 and/or some other example(s) herein, wherein the client device is a desktop computer, a workstation, a smartphone, a tablet computer, a wearable device, an Internet of Things (IoT) device, or a smart appliance.

Example A37 includes the method of example A29 and/or some other example(s) herein, wherein the MX convergence layer is part of a MAMS protocol stack implemented by a server.

Example A38 includes the method of example A37 and/or some other example(s) herein, wherein the cross-layer interface is a downlink cross-layer interface that is between the MX convergence layer in the server and the radio layer is external to the server Example A39 includes the method of example A38 and/or some other example(s) herein, wherein the radio layer comprises a plurality of radio access networks, wherein each radio access network of the plurality of radio access networks implements a different radio access technology than other ones of the plurality of radio access networks.

Example A40 includes the method of examples A37-A39 and/or some other example(s) herein, wherein the MX convergence layer implements the GMA entity when the MX convergence method is the GMA convergence method.

Example A41 includes the method of example A40 and/or some other example(s) herein, wherein the GMA entity is a GMA server (Gs) entity.

Example A42 includes the method of examples A40-A41 and/or some other example(s) herein, wherein the server further comprises a Network Connection Manager (NCM) communicatively coupled with the Gc entity.

Example A43 includes the method of example A42 and/or some other example(s) herein, wherein the server is a gateway device, a radio access network node, a network appliance, a network function within a core network, an application server, an Edge server of an Edge computing network, or a server of a cloud computing service.

Example A44 includes the method of examples A28-A43 and/or some other example(s) herein, wherein the MX convergence method includes MX convergence method parameters.

Example A45 includes the method of example A44 and/or some other example(s) herein, wherein the MX convergence method parameters include a convergence proxy Internet Protocol (IP) address, a convergence proxy port, and a client key.

Example B01 includes a method of reordering packets received over each of at least two access network connections (ANCs) in a multi-access (MA) network including multiple access networks, the method comprising: reordering packets received out-of-order according to a sequence number (SN) of each received packet and an ANC identifier (ID) of received packet.

Example B02 includes the method of example B01 and/or some other example(s) herein, further comprising: storing the packets received out-of-order in a reordering queue.

Example B03 includes the method of example B02 and/or some other example(s) herein, further comprising: releasing all packets stored in the reordering queue when a reordering timer expires.

Example B04 includes the method of example B02 and/or some other example(s) herein, further comprising: releasing all packets stored in the reordering queue when the reordering queue is determined to be full.

Example B05 includes the method of examples B01-B04 and/or some other example(s) herein, wherein the SN is a flow SN.

Example B06 includes the method of example B05 and/or some other example(s) herein, further comprising: releasing in-order packets and the out-of-order packets with flow SNs up to a smallest one of a maximum flow SNs of packets received over each of the at least two ANCs.

Example B07 includes the method of examples B05-B06 and/or some other example(s) herein, further comprising: after releasing the packets from the reordering queue, updating a Next-SN parameter to be Last-Queue-SN+1, wherein the Next-SN parameter is a next in-order flow SN, and the Last-Queue-SN parameter is a flow SN of a last packet in the reordering queue.

Example B08 includes the method of example B07 and/or some other example(s) herein, further comprising: dropping a last received packet when a Last-SN parameter is less than the Next-SN, wherein the Last-SN parameter is a flow SN of the last received packet.

Example B09 includes the method of example B08 and/or some other example(s) herein, further comprising: when the Last-SN equals the Next-SN, releasing the last received packet and all in-order packets in the reordering queue, and updating the Next-SN accordingly.

Example B10 includes the method of example B09 and/or some other example(s) herein, further comprising: restarting the reordering timer when the Last-SN equals the Next-SN, and the reordering queue is not empty.

Example B11 includes the method of example B10 and/or some other example(s) herein, further comprising: when the Last-SN is larger than the Next-SN and the reordering queue is empty, adding the last received packet to reordering queue; and starting reordering timer.

Example B12 includes the method of example B11 and/or some other example(s) herein, further comprising: adding the last received packet to the tail of reordering queue when the Last-SN is larger than the Next-SN and a delivery connection ID of the packets in the reordering queue (x) is equal to a delivery connection ID of the last received packet (y).

Example B12 includes the method of example B11 and/or some other example(s) herein, further comprising: when the Last-SN is less than the Last-Queue-SN: releasing the packets in reordering queue having an SN smaller than the Last-SN and the last received packet; updating the Next-SN to be the Last-SN+1; releasing all in-order packets in the reordering queue and updating the Next-SN accordingly; and restarting the reordering timer if the reordering queue is not empty.

Example B13 includes the method of example B12 and/or some other example(s) herein, further comprising:

when the Last-SN equals the Last-Queue-SN+1: releasing all packets in the reordering queue and the last received packet; and updating the Next-SN to the Last-SN+1.

Example B14 includes the method of example B13 and/or some other example(s) herein, further comprising: when the Last-SN is greater than the Last-Queue-SN+1: releasing all packets in the reordering queue; updating the Next-SN to the Last-Queue-SN+1; placing the last received packet into the reordering queue; and restarting the reordering timer.

Example B15 includes the method of examples B01-B04 and/or some other example(s) herein, wherein the SN is a local delivery SN (LSN).

Example B16 includes the method of example B15 and/or some other example(s) herein, further comprising: releasing in-order packets and the out-of-order packets having a flow SN up to a smallest one of a flow SN or LSN of packet received from over each of the at least two ANCs.

Example B17 includes the method of examples B15-B16 and/or some other example(s) herein, further comprising: declaring a packet to be received in-order when a flow SN of a packet is a same SN as a Next-SN.

Example B18 includes the method of examples B15-B17 and/or some other example(s) herein, further comprising: declaring a packet to be received in-order when: $Wait(s)=s-s^*-(Lsn(s)-Lsn(s^*))-m=0$, wherein s is the flow SN of packet A; $s^*$ indicates the flow SN of a packet received before packet A and over a same ANC as packet A; Lsn(indicates an LSN of a packet which takes a flow SN of a packet as an input parameter; Wait(s) is a number of packets that must be received successfully from a different ANC than the ANC over which packet A was received before a packet in the reordering queue can be considered as "in-order" and released; and m is a number of packets received successfully from the different ANC and with a flow SN in a range of $(s^*, s)$.

Example B19 includes the method of examples B17-B18 and/or some other example(s) herein, further comprising: if reordering timer timeouts or reordering queue is full, releasing all packets in the reordering queue and updating a Next-SN to be Last-Queue-SN+1, wherein the Next-SN is a next in-order flow SN, and the Last-Queue-SN is a flow SN of a last packet in the reordering queue.

Example B20 includes the method of example B19 and/or some other example(s) herein, further comprising: Wait(Last-SN) equals (Last-SN−Next-SN+1)−(Last-LSN−$2^{nd}$Last-LSN), wherein the Last-SN is a flow SN of the last received packet, the Last-LSN is an LSN of the last received packet, and the $2^{nd}$Last-LSN is an LSN of a second-to-last received packet on a same ANC on which the last packet is received.

Example B21 includes the method of example B20 and/or some other example(s) herein, further comprising: dropping a last received packet when the Last-SN is smaller than the Next-SN.

Example B22 includes the method of example B21 and/or some other example(s) herein, further comprising: when the Last-SN equals the Next-SN: releasing the last received packet and all in-order packets in the reordering queue; and updating the Next-SN; and restarting the reordering timer when the reordering queue is not empty.

Example B23 includes the method of example B22 and/or some other example(s) herein, further comprising: when the reordering queue is empty: releasing the last received packet and updating the Next-SN to be the Last-SN+1 when Wait(Last-SN) is greater than or equal to 0.

Example B24 includes the method of example B23 and/or some other example(s) herein, further comprising: when the reordering queue is not empty: adding a tag of Wait(Last-SN) to the last received packet and placing the last received packet into the reordering queue; and starting the reordering timer.

Example B24 includes the method of example B23 and/or some other example(s) herein, further comprising: when a delivery connection ID of the packets in the reordering queue (x) is equal to a delivery connection ID of the last received packet (y): adding a tag of Wait(Last-SN) to the last received packet and put it to the tail of reordering queue.

Example B25 includes the method of example B24 and/or some other example(s) herein, further comprising: when the Last-SN is less than the Last-Queue-SN: releasing the packets in the reordering queue having a flow SN smaller than the Last-SN; releasing the last received packet; updating Wait(First-Queue-SN) to Wait(First-Queue-SN)−1; updating Next-SN to Last-SN+1; releasing the in-order packets in the reordering queue, and updating Next-SN accordingly; restarting the reordering timer if the reordering queue is not empty.

Example B26 includes the method of examples B24-B25 and/or some other example(s) herein, further comprising: when x does not equal y, and the Last-SN is less than the Last-Queue-SN: releasing the packets in the reordering queue having a flow SN smaller than the Last-SN; releasing the last received packet; updating Wait(First-Queue-SN) to Wait(First-Queue-SN)−1; updating Next-SN to Last-SN+1; releasing the in-order packets in the reordering queue, and updating Next-SN accordingly; restarting the reordering timer if the reordering queue is not empty.

Example B27 includes the method of examples B25-B26 and/or some other example(s) herein, further comprising: when the Last-SN is not less than the Last-Queue-SN: updating Wait(Last-SN) to Wait(Last-SN)−n, where n is a number of packets in the reordering queue; and releasing all packets in the reordering queue.

Example B28 includes the method of example B27 and/or some other example(s) herein, further comprising: when Wait(Last-SN) less than or equal to 0: releasing the last received packet; and updating the Next-SN to be Last-SN+1.

Example B29 includes the method of example B28 and/or some other example(s) herein, further comprising: when Wait(Last-SN) is not less than or equal to 0: updating the Next-SN to be the Last-Queue-SN+1; adding a tag of Wait(Last-SN) to the last received packet and put it to reordering queue; and restarting the reordering timer.

Example B30 includes the method of examples B01-B29 and/or some other example(s) herein, wherein each received packet is a Generic Multi-Access (GMA) Protocol Data Unit (PDU) encapsulating an Internet Protocol (IP) packet or a non-IP packet, and each GMA PDU includes a GMA header or a GMA trailer.

Example B31 includes the method of examples B15-B30 and/or some other example(s) herein, wherein the LSN is included in a Delivery SN field of the GMA header or the GMA trailer, or the LSN is included in a new LSN field of the GMA header or the GMA trailer.

Example B32 includes the method of examples B01-B31 and/or some other example(s) herein, wherein each received packet includes a Generic Multi-Access (GMA) header or a GMA trailer, and a flow SN of each received packet is included in a Flow SN field in the GMA header or the GMA trailer.

Example B33 includes the method of examples B01-B32 and/or some other example(s) herein, wherein a transmitter entity (Tx) schedules traffic to be sent over individual ones of the at least two ANCs.

Example B34 includes the method of example B33 and/or some other example(s) herein wherein the method is performed by a client device and the Tx is a multi-access server.

Example B35 includes the method of example B34 and/or some other example(s) herein wherein the method is performed by a multi-access server and the Tx is a client device.

Example B36 includes a multi-link reordering algorithm using flow sequence number and connection ID.

Example B37 includes a multi-link reordering algorithm using flow sequence number, connection ID, and packet loss count.

Example B38 includes a method to count packet loss using local delivery sequence number.

Example B39 includes a new field in a convergence header to indicate the local delivery sequence number (LSN).

Example B40 includes the field of example B44 and/or some other examples herein, wherein the convergence header is a Generic Multi-Access (GMA) header in a GMA Protocol Data Unit (PDU).

Example B41 includes an apparatus configurable to operate any one or more of the methods or algorithms in examples B36-B41 and/or the method of examples B01-B35.

Example B42 includes the method of any one or more of examples A01-A45, wherein the convergence layer is configurable or operable to perform the method of any one or more of examples B01-B41.

Example Z01 includes one or more computer readable media comprising instructions, wherein execution of the instructions by processor circuitry is to cause the processor circuitry to perform the method of any one of examples A01-A45, B01-B42.

Example Z02 includes a computer program comprising the instructions of example Z01.

Example Z03 includes an Application Programming Interface defining functions, methods, variables, data structures, and/or protocols for the computer program of example Z02.

Example Z04 includes an apparatus comprising circuitry loaded with the instructions of example Z01.

Example Z05 includes an apparatus comprising circuitry operable to run the instructions of example Z01.

Example Z06 includes an integrated circuit comprising one or more of the processor circuitry of example Z01 and the one or more computer readable media of example Z01.

Example Z03 includes a computing system comprising the one or more computer readable media and the processor circuitry of example Z01.

Example Z04 includes an apparatus comprising means for executing the instructions of example Z01.

Example Z05 includes a signal generated as a result of executing the instructions of example Z01.

Example Z06 includes a data unit generated as a result of executing the instructions of example Z01.

Example Z07 includes the data unit of example Z06, wherein the data unit is a datagram, network packet, data frame, data segment, a PDU, a service data unit (SDU), a message, or a database object.

Example Z08 includes a signal encoded with the data unit of example Z06 or Z07.

Example Z09 includes an electromagnetic signal carrying the instructions of example Z01.

Example Z10 includes an apparatus comprising means for performing the method of any one of examples A01-A45 and/or B01-B42.

An example implementation is an Edge computing system, including respective Edge processing devices and nodes to invoke or perform the operations of examples A01-A45, B01-B42, or other subject matter described herein. Another example implementation is a client endpoint node, operable to invoke or perform the operations of examples A01-A45, B01-B42, or other subject matter described herein. Another example implementation is an aggregation node, network hub node, gateway node, or core data processing node, within or coupled to an Edge computing system, operable to invoke or perform the operations of examples A01-A45, B01-B42, or other subject matter described herein. Another example implementation is an access point, base station, road-side unit, street-side unit, or on-premise unit, within or coupled to an Edge computing system, operable to invoke or perform the operations of examples A01-A45, B01-B42, or other subject matter described herein. Another example implementation is an Edge provisioning node, service orchestration node, application orchestration node, or multi-tenant management node, within or coupled to an Edge computing system, operable to invoke or perform the operations of examples A01-A45, B01-B42, or other subject matter described herein.

Another example implementation is an Edge node operating an Edge provisioning service, application or service orchestration service, virtual machine deployment, container deployment, function deployment, and compute management, within or coupled to an Edge computing system, operable to invoke or perform the operations of examples A01-A45, B01-B42, or other subject matter described herein. Another example implementation is an Edge computing system operable as an Edge mesh, as an Edge mesh with side car loading, or with mesh-to-mesh communications, operable to invoke or perform the operations of examples A01-A45, B01-B42, or other subject matter described herein. Another example implementation is an Edge computing system including aspects of network functions, acceleration functions, acceleration hardware, storage hardware, or computation hardware resources, operable to invoke or perform the use cases discussed herein, with use of examples A01-A45, B01-B42, or other subject matter described herein. Another example implementation is an Edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples A01-A45, B01-B42, or other subject matter described herein. Another example implementation is an Edge computing system adapted for mobile wireless communications, including configurations according to an 3GPP 4G/LTE or 5G network capabilities, operable to invoke or perform the use cases discussed herein, with use of examples A01-A45, B01-B42, or other subject matter described herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "Edge computing" encompasses many implementations of distributed computing that move processing activities and resources (e.g., compute, storage, acceleration resources) towards the "Edge" of the network, in an effort to reduce latency and increase throughput for endpoint users (client devices, user equipment, etc.). Such Edge computing implementations typically involve the offering of such activities and resources in cloud-like services, functions, applications, and subsystems, from one or multiple locations accessible via wireless networks. Thus, the references to an "Edge" of a network, cluster, domain, system or computing arrangement used herein are groups or groupings of functional distributed compute elements and, therefore, generally unrelated to "Edges" (links or connections) as used in graph theory. Specific arrangements of Edge computing applications and services accessible via mobile wireless networks (e.g., cellular and WiFi data networks) may be referred to as "mobile Edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of Edge computing operations, whether part of a larger system, distributed collection of systems, or a standalone apparatus. In some examples, a compute node may be referred to as a "Edge node", "Edge device", "Edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and Edge data center (e.g., smallest).

As used herein, the term "access Edge layer" indicates the sub-layer of infrastructure Edge closest to the end user or device. For example, such layer may be fulfilled by an Edge data center deployed at a cellular network site. The access Edge layer functions as the front line of the infrastructure Edge and may connect to an aggregation Edge layer higher in the hierarchy.

As used herein, the term "aggregation Edge layer" indicates the layer of infrastructure Edge one hop away from the access Edge layer. This layer can exist as either a medium-scale data center in a single location or may be formed from multiple interconnected micro data centers to form a hierarchical topology with the access Edge to allow for greater collaboration, workload failover, and scalability than access Edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

As used herein, the term "virtualized NF" (or VNF) indicates a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

As used herein, the term "Edge compute node" refers to a real-world, logical, or virtualized implementation of a compute-capable element in the form of a device, gateway, bridge, system or subsystem, component, whether operating in a server, client, endpoint, or peer mode, and whether located at an "Edge" of a network or at a connected location further within the network. References to a "node" used herein are generally interchangeable with a "device", "component", and "sub-system"; however, references to an "Edge computing system" generally refer to a distributed architecture, organization, or collection of multiple nodes and devices, and which is organized to accomplish or offer some aspect of services or resources in an Edge computing setting.

As used herein, the term "cluster" refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The "RAT type" identifies the transmission technology used in an access network, for example, new radio (NR), narrowband IoT (NB-IOT), Untrusted Non-3GPP, Trusted Non-3GPP, Trusted IEEE 802.11, Non-3GPP access, Wireline, Wireline-Cable, Wireline Broadband Forum (wireline-BBF), etc.

The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "session" refers to a temporary and interactive information interchange between two or more communicating devices, two or more application instances, between a computer and user, or between any two or more entities or elements.

The term "Data Network" or "DN" refers to a network hosting data-centric services such as, for example, operator services, the internet, third-party services, or enterprise networks. Additionally or alternatively, a DN refers to service networks that belong to an operator or third party, which are offered as a service to a client or user equipment (UE). DNs are sometimes referred to as "Packet Data Networks" or "PDNs". The term "Local Area Data Network" or "LADN" refers to a DN that is accessible by the UE only in specific locations, that provides connectivity to a specific DNN, and whose availability is provided to the UE.

The term "PDU Connectivity Service" refers to a service that provides exchange of protocol data units (PDUs) between a UE and a DN. The term "PDU Session" refers to an association between a UE and a DN that provides a PDU connectivity service. A PDU Session type can be IPv4, IPv6, IPv4v6, Ethernet, Unstructured, or any other network/connection type, such as those discussed herein. The term "MA PDU Session" refers to a PDU Session that provides a PDU connectivity service, which can use one access network at a time or multiple access networks simultaneously.

The term "core" as used herein refers to a functional element that anchors a client network address (e.g., IP address) used for communication with applications via the network. The term "anchor connection" as used herein refers to the network path from a network element (e.g., an N-MADP) to a UP gateway (e.g., IP anchor) that has assigned a network address (e.g., IP address) to a client. The term "delivery connection" as used herein refers a network path from a network element (e.g., an N-MADP) to a client.

The term "traffic shaping" refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" refers to the regulation of traffic flow into or out of a network, or into or out of a specific device or element.

The term "network address" refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof. The term "application identifier", "application ID", or "app ID" refers to an identifier that can be mapped to a specific application or application instance; in the context of 3GPP 5G/NR systems, an "application identifier" may refer to an identifier that can be mapped to a specific application traffic detection rule. An "endpoint address" may refer to an address used to determine the host/authority part of a target URI, where the target URI is used to access an NF service (e.g., to invoke service operations) of an NF service producer or for notifications to an NF service consumer. The term "CAG-ID" refers to an identifier of a Closed Access Group (CAG), and the term "closed access group" or "CAG" refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "port" as used herein (e.g., in the context of computer networks) refers to a communication endpoint, a virtual data connection between two or more entities, and/or a virtual point where network connections start and end; additionally or alternatively, a "port" is associated with a specific process or service.

The term "subnetwork" or "subnet" refers to a logical subdivision of a network, such as an IP network. The practice of dividing a network into two or more networks is called "subnetting." The term "netmask" or "subnet mask" refers to a bitmask applied by bitwise AND operations to a network address (e.g., an IP address in an IP network) to yield a routing prefix, and/or is a 32-bit "mask" used to divide an IP address into subnets and specify the network's available hosts.

The term "Residential Gateway" or "RG" refers to a device providing, for example, voice, data, broadcast video, video on demand, to other devices in customer premises. The term "Wireline 5G Access Network" or "W-5GAN" refers to a wireline AN that connects to a 5GC via N2 and N3 reference points. The W-5GAN can be either a W-5GBAN or W-5GCAN. The term "Wireline 5G Cable Access Network" or "W-5GCAN" refers to an Access Network defined in/by CableLabs. The term "Wireline BBF Access Network" or "W-5GBAN" refers to an Access Network defined in/by the Broadband Forum (BBF). The term "Wireline Access Gateway Function" or "W-AGF" refers to a Network function in W-5GAN that provides connectivity to a 3GPP 5G Core network (5GC) to 5G-RG and/or FN-RG. The term "5G-RG" refers to an RG capable of connecting to a 5GC playing the role of a user equipment with regard to the 5GC; it supports secure element and exchanges N1 signaling with 5GC. The 5G-RG can be either a 5G-BRG or 5G-CRG.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.).

Although these implementations have been described with reference to specific examples, it will be evident that various modifications and changes may be made to these aspects without departing from the broader scope of the present disclosure. Many of the arrangements and processes described herein can be used in combination or in parallel implementations to provide greater bandwidth/throughput and to support Edge services selections that can be made available to the Edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

We claim:

1. An apparatus for managing traffic multi-access communication in an multi-access communication environment, the apparatus comprising:
    memory to store packets in a transmission queue; and
    processing circuitry coupled to the memory to:
    execute a radio layer comprising a plurality of radio communication interfaces, wherein each radio communication interface of the plurality of radio communication interfaces implements a respective radio access technology (RAT) different than other RATs implemented by other radio communication interfaces of the plurality of radio communication interfaces; and
    execute a convergence layer communicatively coupled with the radio layer via a cross-layer interface, wherein the convergence layer comprises a convergence layer entity to:
        receive a traffic splitting ratio (TSR) message from the radio layer over the cross-layer interface when a packet for transmission is stored in the transmission queue, wherein the TSR message indicates a change in a transmission queue size (TQS), wherein the TQS is a size of the transmission queue based on a number of packets stored in the transmission queue, and
        adjust a TSR based on the TSR message, the TSR defining an amount of data packets that are sent over individual links of a plurality of communication links.

2. The apparatus of claim 1, wherein the convergence layer entity is to:
    receive the TSR message from a radio layer when the TQS is less than a TQS limit, the TSR message requesting to increase a TSR; and
    increase the TSR based on a TSR value after receipt of the TSR message.

3. The apparatus of claim 2, wherein the TSR message is a first TSR message, the TQS limit is a first TQS limit, and wherein the convergence layer entity is to:
    receive a second TSR message from the radio layer when the TQS is more than the second TQS limit, the second TSR message requesting to decrease the TSR; and
    decrease the TSR based on the TSR value after receipt of the second TSR message.

4. The apparatus of claim 3, wherein the convergence layer entity is to:
    receive a third TSR message from the radio layer when the TQS is more than the first TQS limit and less than the second TQS limit, the third TSR message requesting to maintain the TSR; and
    reset the TSR to a previously used TSR after receipt of the third TSR message.

5. The apparatus of claim 4, wherein the TQS limit is based on a target queuing delay (TQD) and an estimated throughput of a primary link of the plurality of communication links.

6. The apparatus of claim 4, wherein, to decrease the TSR, the convergence layer entity is to:
    subtract the TSR value from the TSR during each interval of a set of intervals taking place until another TSR message is received by the convergence layer entity.

7. The apparatus of claim 6, wherein, to increase the TSR, the convergence layer entity is to:
    add the TSR value to the TSR during each interval of the set of intervals taking place until another TSR message is received by the convergence layer entity.

8. The apparatus of claim 7, wherein each interval of the set of intervals is a greater one of an average transmission time interval or a minimum interval to observe a stable input rate.

9. The apparatus of claim 6, wherein the convergence layer entity is to:
    increase the TSR value by a predefined value when another first TSR message or another second TSR message is received more than a threshold number of intervals after receipt of the third TSR message.

10. The apparatus of claim 9, wherein the convergence layer entity is to:
    decrease the TSR value by the predefined value when the other first TSR message or the other second TSR message is received with the threshold number of intervals after receipt of the third TSR message.

11. One or more non-transitory computer-readable media (NTCRM) comprising instructions for operating a convergence layer entity, wherein execution of the instructions by one or more processors of a computing device is to cause the computing device to:
    when a packet for transmission is stored in a transmission queue, receive a traffic splitting ratio (TSR) message from a radio layer of the computing device via a cross-layer interface that communicatively couples the radio layer with the convergence layer entity, wherein the TSR message indicates a change in a target queuing delay (TQD) of the packet stored in the transmission queue; and
    adjust a TSR based on the TSR message, the TSR defines an amount of data packets that are sent over individual links of a plurality of communication links.

12. The one or more NTCRM of claim 11, wherein execution of the instructions is to further cause the computing device to:
    receive the TSR message from the radio layer when the queuing delay is less than the TQD, the TSR message requesting to increase a TSR; and
    increase the TSR based on a TSR value after receipt of the TSR message.

13. The one or more NTCRM of claim 12, wherein the TSR message is a first TSR message, the TQD is a first TQD, and wherein execution of the instructions is to further cause the computing device to:
    receive a second TSR message from the radio layer when the queuing delay is more than the second TQD, the second TSR message requesting to decrease the TSR; and decrease the TSR based on the TSR value after receipt of the second TSR message.

14. The one or more NTCRM of claim 13, wherein execution of the instructions is to further cause the computing device to:

receive a third TSR message from the radio layer when the queuing delay is more than the first TQD and less than the second TQD, the third TSR message requesting to maintain the TSR; and reset the TSR to a previously used TSR after receipt of the third TSR message.

15. The one or more NTCRM of claim 14, wherein, to decrease the TSR, execution of the instructions is to further cause the computing device to:

subtract the TSR value from the TSR during each interval of a set of intervals taking place until another TSR message is received by the convergence layer entity.

16. The one or more NTCRM of claim 15, wherein, to increase the TSR, execution of the instructions is to further cause the computing device to:

add the TSR value to the TSR during each interval of the set of intervals taking place until another TSR message is received by the convergence layer entity.

17. The one or more NTCRM of claim 16, wherein each interval of the set of intervals is a greater one of an average transmission time interval or a minimum interval to observe a stable input rate.

18. The one or more NTCRM of claim 17, wherein execution of the instructions is to further cause the computing device to:

increase the TSR value by a predefined value when another first TSR message or another second TSR message is received more than a threshold number of intervals after receipt of the third TSR message.

19. The one or more NTCRM of claim 18, wherein execution of the instructions is to further cause the computing device to:

decrease the TSR value by the predefined value when the other first TSR message or the other second TSR message is received with the threshold number of intervals after receipt of the third TSR message.

20. The one or more NTCRM of claim 16, wherein the radio layer comprises a plurality of radio communication interfaces, wherein each radio communication interface of the plurality of radio communication interfaces implements a respective radio access technology (RAT) different than other RATs implemented by other radio communication interfaces of the plurality of radio communication interfaces.

* * * * *